US008701862B2

(12) United States Patent
Takasawa et al.

(10) Patent No.: US 8,701,862 B2
(45) Date of Patent: Apr. 22, 2014

(54) DISK TRANSPORTATION DEVICE AND DISK STORAGE SYSTEM

(75) Inventors: Takeharu Takasawa, Kanagawa (JP); Takeshi Kubo, Kanagawa (JP); Naofumi Goto, Kanagawa (JP); Akira Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 13/460,902

(22) Filed: May 1, 2012

(65) Prior Publication Data

US 2012/0292158 A1 Nov. 22, 2012

(30) Foreign Application Priority Data

May 17, 2011 (JP) ................................. 2011-110141

(51) Int. Cl.
 *B65G 1/00* (2006.01)
 *B65G 49/07* (2006.01)
 *B65H 1/00* (2006.01)

(52) U.S. Cl.
 USPC .................. 198/347.3; 198/346.2; 198/463.2; 414/222.07; 414/226.02; 414/937; 414/941

(58) Field of Classification Search
 USPC ........ 198/346.2, 347.3, 347.4, 463.2, 468.01, 198/468.2; 414/222.07, 226.02, 419, 937, 414/941
 See application file for complete search history.

(56) References Cited

U.S. PATENT DOCUMENTS

| 5,333,986 | A  | * | 8/1994  | Mizukami et al. ............ 414/217 |
| 6,024,532 | A  | * | 2/2000  | Ashby ......................... 414/798.1 |
| 6,168,667 | B1 | * | 1/2001  | Yoshioka ...................... 118/715 |
| 6,206,974 | B1 | * | 3/2001  | Iida et al. ..................... 118/719 |
| 6,464,789 | B1 | * | 10/2002 | Akimoto ....................... 118/666 |
| 6,568,038 | B2 | * | 5/2003  | Patelli et al. ................ 19/159 A |
| 6,572,320 | B2 | * | 6/2003  | Davis ............................ 414/217 |
| 6,691,995 | B2 | * | 2/2004  | Held ............................... 270/47 |
| 6,748,293 | B1 | * | 6/2004  | Larsen ........................... 700/218 |
| 7,201,078 | B2 | * | 4/2007  | Byun ........................... 74/490.03 |
| 7,396,199 | B2 | * | 7/2008  | Koyama et al. .......... 414/222.01 |
| 8,297,293 | B2 | * | 10/2012 | Hwang et al. ................. 134/137 |
| 8,529,314 | B2 | * | 9/2013  | Segawa et al. .................. 451/41 |
| 8,585,112 | B2 | * | 11/2013 | Kawakami et al. ........ 294/119.1 |

FOREIGN PATENT DOCUMENTS

| JP | 08-241552 A | 9/1996 |
| JP | 09-106607 A | 4/1997 |

* cited by examiner

*Primary Examiner* — Douglas Hess
(74) *Attorney, Agent, or Firm* — Wolf, Greenfield & Sacks, P.C.

(57) ABSTRACT

A disk transportation device includes a pair of rotation arms that are rotatable respectively about a fulcrum shaft extending in the same direction as the axial direction of a center shaft of a disk-shaped recording medium in both sides thereof that pinch the transportation passage of the disk-shaped recording medium transported between a disk changer and a disk drive device; and four transportation rollers of which two at a time are rotatably supported on the pair of rotation arms respectively, wherein the four transportation rollers contact the outer peripheral surface of the disk-shaped recording medium respectively and the pair of rotation arms are rotated in opposite directions to each other in a state where one of the transportation rollers at a time is supported at the pair of rotation arms respectively contact the outer peripheral surface of the disk-shaped recording medium.

12 Claims, 43 Drawing Sheets

DISK TRANSPORTATION DEVICE AND DISK STORAGE SYSTEM

BACKGROUND

The present disclosure relates to a technical field of a disk transportation device and a disk storage system. Specifically, the present disclosure relates to a technical field in which a disk-shaped recording medium is transported by a pair of rotation arms and a plurality of transportation rollers so that a large transportation distance is secured and the transportation performance with respect to the disk-shaped recording medium is improved without a large load being applied to the disk-shaped recording medium.

A disk transportation device is known in which a disk-shaped recording medium, where image data or audio data are recorded, is transported. The disk transportation device, as described above, is disposed, for example, at a disk changer that stores a plurality of disk-shaped recording media and takes out a desired disk-shaped recording medium, a disk recording and reproduction device that performs recording or reproduction of an information signal with respect to the disk-shaped recording medium, or the like (for example, Japanese Unexamined Patent Application Publication No. 9-106607 and Japanese Unexamined Patent Application Publication No. 8-241552).

In the disk transportation device disclosed in Japanese Unexamined Patent Application Publication No. 9-106607 and Japanese Unexamined Patent Application Publication No. 8-241552, a pair of belts are arranged at both sides of the transportation passage of the disk-shaped recording medium and the disk-shaped recording medium is transported in a state where the pair of the belts contact the outer peripheral surface of the disk-shaped recording medium.

The disk-shaped recording medium is transported, for example, between an eject position and a reproduction position.

SUMMARY

However, in the disk transportation device handling the disk-shaped recording medium as described above, it is necessary to secure a large transportation distance of the disk-shaped recording medium and that the transportation to the transportation position of the disk-shaped recording medium be reliably performed.

However, in the disk transportation device disclosed in Japanese Unexamined Patent Application Publication No. 9-106607 and Japanese Unexamined Patent Application Publication No. 8-241552, the disk-shaped recording medium is held being pinched from both sides by a pair of belts between a state where the center of the disk-shaped recording medium is positioned between first ends of the belts and a state where the center of the disk-shaped recording medium is positioned between second ends of the belts.

Accordingly, in a state where the distance between the pair of belts is constant, since the transportation distance of the disk-shaped recording medium is the same length as the length of the belt, the transportation distance of the disk-shaped recording medium may not be sufficiently secured.

In addition, immediately before finishing of the transportation operation, the pair of the belts are close to each other and the disk-shaped recording medium is pushed out from between the pair of the belts so that the transportation distance can be long, however, in this case, the load with respect to the disk-shaped recording medium in the direction in which the disk-shaped recording medium is pinched is applied by the pair of the belts.

Accordingly, there is a concern that problems such as deformation, damage or the like of the disk-shaped recording medium occur.

Thus, it is desirable to provide a disk transportation device of the present disclosure that secures a large transportation distance and then improves the transportation performance with respect to the disk-shaped recording medium without a large load being applied to the disk-shaped recording medium.

A disk transportation device according to an embodiment of the present disclosure includes a pair of rotation arms that are rotatable respectively about a fulcrum shaft extending in the same direction as the axial direction of a center shaft of a disk-shaped recording medium in both sides thereof that pinch the transportation passage of the disk-shaped recording medium transported between a disk changer where a plurality of the disk-shaped recording media can be stored and a disk drive device where recording or reproduction of the information signal with respect to the disk-shaped recording medium can be performed; and four transportation rollers of which two at a time are rotatably supported on the pair of rotation arms respectively, wherein the four transportation rollers contact the outer peripheral surface of the disk-shaped recording medium respectively and thereby the disk-shaped recording medium is held, and the pair of rotation arms are rotated in opposite directions to each other in a state where one of the transportation rollers at a time is supported at the pair of the rotation arms respectively contact the outer peripheral surface of the disk-shaped recording medium and thereby the disk-shaped recording medium is transported between the disk changer and the disk drive device.

Accordingly, in the disk transportation device, the pair of rotation arms are rotated in opposite directions to each other at the time of transportation of the disk-shaped recording medium, so that the contact position of two transportation rollers is changed with respect to the outer peripheral surface of the disk-shaped recording medium.

In the disk transportation device according to the embodiment of the present disclosure, it is preferable that the rotation direction at the time of rotation of the rotation arm and the rotation direction of the transportation roller be the same direction as each other.

The rotation direction at the time of rotation of the rotation arm and the rotation direction of the transportation roller are the same direction as each other so that the transportation roller can be rolled on the outer peripheral surface of the disk-shaped recording medium according to the rotation of the rotation arm.

In the disk transportation device according to the embodiment of the present disclosure, it is preferable that the transportation roller be supported at a tip of the rotation arm, a driven gear be disposed at the transportation roller, a driving gear be disposed at the fulcrum shaft, and a plurality of intermediate gears, which are meshed with the driving gear and the driven gear between the fulcrum shaft and the transportation roller be rotatably supported at the rotation arm.

The plurality of intermediate gears, which is meshed with the driving gear and the driven gear between the fulcrum shaft and the transportation roller at the rotation arm, is rotatably supported so that the rotation force of the fulcrum shaft is transmitted to the transportation roller via the intermediate gears.

In the disk transportation device according to the embodiment of the present disclosure, it is preferable the transportation roller include the driven gear and a disk action section which is in contact with the outer peripheral surface of the disk-shaped recording medium so as to be rotatable, and the disk action section be formed of a rubber material.

The transportation roller includes the driven gear and a disk action section which is in contact with the outer peripheral surface of the disk-shaped recording medium so as to be rotatable, and the disk action section is formed of a rubber material so that the transportation roller is in close contact with the disk-shaped recording medium.

In the disk transportation device according to the embodiment of the present disclosure, it is preferable that a driving motor be disposed which rotates the fulcrum shaft in the rotation direction of the shaft, the rotation arm be rotatable with respect to the fulcrum shaft, and the rotation arm be rotated in the rotation direction of the fulcrum shaft by the friction force between the rotation arm and the fulcrum shaft when the fulcrum shaft is rotated by the driving force of the driving motor.

The rotation arm is rotated in the rotation direction of the fulcrum shaft by the friction force between the rotation arm and the fulcrum shaft when the fulcrum shaft is rotated by the driving force of the driving motor so that the rotation arm can be rotated in the opposite direction opposite the fulcrum shaft when the rotation force is applied to the rotation arm in the opposite direction opposite the rotation direction of the fulcrum shaft.

In the disk transportation device according to the embodiment of the present disclosure, it is preferable that the plurality of intermediate gears, which are meshed with the driving gear and the driven gear between the fulcrum shaft and the transportation roller at the rotation arm, be rotatably supported, a driving motor be disposed which rotates the fulcrum shaft in the rotation direction of the shaft, the rotation arm be rotatable with respect to the fulcrum shaft, and the rotation arm be rotated in the rotation direction of the fulcrum shaft by the friction force between the rotation arm and the fulcrum shaft when the fulcrum shaft is rotated by the driving force of the driving motor.

In the configuration where the plurality of the intermediate gears is supported, the rotation arm is rotated in the rotation direction of the fulcrum shaft by the friction force between the rotation arm and the fulcrum shaft when the fulcrum shaft is rotated by the driving force of the driving motor so that the rotation force of the fulcrum shaft is transmitted to the rotation arm and the intermediate gear.

In the disk transportation device according to the embodiment of the present disclosure, it is preferable that a driving motor be disposed which applies the rotation force to the pair of the rotation arms, and a pair of transmission mechanisms be disposed which transmits the driving force of the driving motor to a pair of rotation arms respectively.

The driving motor that applies the rotation force to the pair of the rotation arms, and the pair of transmission mechanisms, which transmits the driving force of the driving motor to the pair of rotation arms respectively, are disposed so that the driving force of the driving motor is simultaneously transmitted to the rotation arms via the pair of the transmission mechanism.

In the disk transportation device according to the embodiment of the present disclosure, it is preferable that the two transportation rollers contact the outer peripheral surface positioned at the transportation direction side from the center of the disk-shaped recording medium at the time of the start of the transportation of the disk-shaped recording medium, and the two transportation rollers be rolled on the outer peripheral surface of the disk-shaped recording medium and thereby the disk-shaped recording medium be transported.

The two transportation rollers contact the outer peripheral surface positioned at the transportation direction side from the center of the disk-shaped recording medium at the time of the start of the transportation of the disk-shaped recording medium, and the two transportation rollers are rolled on the outer peripheral surface of the disk-shaped recording medium and thereby the disk-shaped recording medium is transported so that the two transportation rollers are moved to the direction where the transportation rollers are separated from each other immediately after start of the transportation.

In the disk transportation device according to the embodiment of the present disclosure, it is preferable that the rotation arm be configured of a base extending in one direction, where the fulcrum shaft is connected at the center thereof, and a pair of projection-shaped sections projecting respectively from both ends of the base in a direction perpendicular to the axial direction of the fulcrum shaft, the rotation arm is formed in a shape symmetrical with respect to the fulcrum shaft, and the pair of the projection-shaped sections is formed so as to separate from each other according to the pair of projection-shaped sections separated from the base.

The rotation arm is formed in a shape symmetrical with respect to the fulcrum shaft, and the pair of the projection-shaped sections is formed so as to separate from each other according to the pair of projection-shaped sections separated from the base so that the force can be applied from the four transportation rollers to the center of the disk-shaped recording medium in a state where the disk-shaped recording medium is held.

In the disk transportation device according to the embodiment of the present disclosure, it is preferable that a plurality of the disk drive devices be arranged side by side in a predetermined direction, and the pair of the rotation arms is movable in the alignment direction of the plurality of the disk drive devices.

The plurality of the disk drive devices is arranged side by side in a predetermined direction, and the pair of the rotation arms is movable in the alignment direction of the plurality of the disk drive devices so that the pair of the rotation arms is positioned approaching each of the disk drive devices at the time of the transportation of the disk-shaped recording medium.

In the disk transportation device according to the embodiment of the present disclosure, it is preferable that the pair of the rotation arms be movable in the alignment direction of the disk changer and the disk drive device.

The pair of the rotation arms is movable in the alignment direction of the disk changer and the disk drive device so that the pair of the rotation arms is positioned approaching the disk changer or the disk drive device at the time of the transportation of the disk-shaped recording medium.

A disk storage system according to another embodiment of the present disclosure includes a disk changer where a plurality of disk-shaped recording media can be stored a disk drive device where recording or reproduction of the information signal with respect to the disk-shaped recording medium can be performed and a disk transportation device that transports the disk-shaped recording medium between the disk changer and the disk drive device, and the disk transportation device includes a pair of rotation arms that are rotatable respectively about a fulcrum shaft extending in the same direction as the axial direction of a center shaft of the disk-shaped recording medium in both sides thereof that pinch the transportation passage of the disk-shaped recording medium and four transportation rollers of which two at a time are rotatably supported on the pair of rotation arms respectively, wherein the four transportation rollers contact the outer peripheral surface of the disk-shaped recording medium respectively and thereby the disk-shaped recording medium is held, and wherein the pair of rotation arms are rotated in opposite directions to each other in a state where one of the transportation rollers at a time is supported at the pair of the rotation arms respectively contact the outer peripheral surface of the disk-shaped recording medium and thereby the disk-shaped recording medium is transported between the disk changer and the disk drive device.

Accordingly, in the disk storage system, the pair of rotation arms is rotated in the opposite direction opposite each other at the time of the transportation of the disk-shaped recording medium so that the contact position of two transportation rollers is changed with respect to the outer peripheral surface of the disk-shaped recording medium.

The disk transportation device according to an embodiment of the present disclosure includes a pair of rotation arms that are rotatable respectively about a fulcrum shaft as a fulcrum extending in the same direction as the axial direction of a center shaft of a disk-shaped recording medium in both sides thereof that pinch the transportation passage of the disk-shaped recording medium transported between a disk changer where a plurality of the disk-shaped recording media can be stored and a disk drive device where recording or reproduction of the information signal with respect to the disk-shaped recording medium can be performed and four transportation rollers of which two at a time are rotatably supported on the pair of rotation arms respectively, wherein the four transportation rollers contact the outer peripheral surface of the disk-shaped recording medium respectively and thereby the disk-shaped recording medium is held, and the pair of rotation arms are rotated in opposite directions to each other in a state where one of the transportation rollers at a time is supported at the pair of the rotation arms respectively contact the outer peripheral surface of the disk-shaped recording medium and thereby the disk-shaped recording medium is transported between the disk changer and the disk drive device.

Accordingly, since a large transportation distance for the disk-shaped recording medium can be secured without a large load being applied to the disk-shaped recording medium, the transportation performance can be improved with respect to the disk-shaped recording medium.

In the disk transportation device according to the embodiment of the present disclosure, the rotation direction at the time of rotation of the rotation arm and the rotation direction of the transportation roller are the same direction as each other.

Accordingly, the transportation roller can be rolled on the outer peripheral surface of the disk-shaped recording medium according to the rotation of the rotation arm and the transportation of the disk-shaped recording medium can be smoothly performed according to the rotation of the rotation arm.

In the disk transportation device according to the embodiment of the present disclosure, the transportation roller is supported at a tip of the rotation arm, a driven gear is disposed at the transportation roller, a driving gear is disposed at the fulcrum shaft, and a plurality of intermediate gears, which is meshed with the driving gear and the driven gear between the fulcrum shaft and the transportation roller are rotatably supported at the rotation arm.

Accordingly, the rotation mechanism to the same direction as the rotation arm and the transportation roller is configured by a simple structure and simplification of the mechanism in the disk transportation device can be achieved.

In the disk transportation device according to the embodiment of the present disclosure the transportation roller includes the driven gear and a disk action section which is in contact with the outer peripheral surface of the disk-shaped recording medium so as to be rotatable, and the disk action section is formed of a rubber material.

Accordingly, a good adhesion of the disk-shaped recording medium of the transportation roller is secured, and the disk-shaped recording medium can be smoothly transported.

In the disk transportation device according to the embodiment of the present disclosure, a driving motor is disposed which rotates the fulcrum shaft in the rotation direction of the shaft, the rotation arm is rotatable with respect to the fulcrum shaft, and the rotation arm is rotated in the rotation direction of the fulcrum shaft by the friction force between the rotation arm and the fulcrum shaft when the fulcrum shaft is rotated by the driving force of the driving motor.

Accordingly, the load applied from the transportation roller with respect to the disk-shaped recording medium is small and the load with respect to the disk-shaped recording medium is decreased and thereby the disk-shaped recording medium can be smoothly transported.

In the disk transportation device according to the embodiment of the present disclosure, a driving motor is disposed which rotates the fulcrum shaft in the rotation direction of the shaft, the rotation arm is rotatable with respect to the fulcrum shaft, and the rotation arm is rotated in the rotation direction of the fulcrum shaft by the friction force between the rotation arm and the fulcrum shaft when the fulcrum shaft is rotated by the driving force of the driving motor.

Accordingly, in the configuration in which the intermediate gear is meshed with the driven gear and the driving gear, the rotation arm is rotated in the rotation direction of the fulcrum shaft by the friction force between the rotation arm and the fulcrum shaft so that the rotation arm and transportation roller can be rotated by one driving motor, and the number of the parts of the disk transportation device is decreased and the mechanism can be simplified.

In the disk transportation device according to the embodiment of the present disclosure, a driving motor is disposed which applies the rotation force to the pair of the rotation arms, and a pair of transmission mechanisms is disposed which transmits the driving force of the driving motor to a pair of rotation arms respectively.

Accordingly, the rotation force is applied to the rotation arms by one driving motor respectively, the number of the parts is decreased and the mechanism can be simplified.

In the disk transportation device according to the embodiment of the present disclosure, the two transportation rollers contact the outer peripheral surface positioned at the transportation direction side from the center of the disk-shaped recording medium at the time of the start of the transportation of the disk-shaped recording medium, and two transportation rollers are rolled on the outer peripheral surface of the disk-shaped recording medium and thereby the disk-shaped recording medium is transported.

Accordingly, even though the projection amount of the disk-shaped recording medium from the disk changer or the disk drive device to the disk transportation device is small, the disk-shaped recording medium can be transported and the reliability in the transportation operation of the disk-shaped recording medium by the disk transportation device can be improved.

In the disk transportation device according to the embodiment of the present disclosure, the rotation arm is configured of a base extending in one direction, where the fulcrum shaft is connected at the center thereof, and a pair of projection-shaped sections projecting respectively from both ends of the base in a direction perpendicular to the axial direction of the fulcrum shaft, the rotation arm is formed in a shape symmetrical with respect to the fulcrum shaft, and the pair of the projection-shaped sections is formed so as to separate from each other according to the pair of projection-shaped sections separated from the base.

Accordingly, the rotation arm can be the optimal shape as a shape where the holding and transportation of the disk-shaped recording medium are performed, and good holding state of the disk-shaped recording medium and smooth transportation operation of the disk-shaped recording medium can be secured.

In the disk transportation device according to the embodiment of the present disclosure, a plurality of the disk drive devices is arranged side by side in a predetermined direction, and the pair of the rotation arms is movable in the alignment direction of the plurality of the disk drive devices.

Accordingly, the transportation of the disk-shaped recording medium can be smoothly performed with respect to the disk drive device.

In the disk transportation device according to the embodiment of the present disclosure, the pair of the rotation arms is movable in the alignment direction of the disk changer and the disk drive device.

Accordingly, the transportation distance of the disk-shaped recording medium can be increased and the disk-shaped recording medium can be reliably transported to the disk changer and the disk drive device.

A disk storage system according to another embodiment of the present disclosure includes a disk changer where a plurality of disk-shaped recording media can be stored a disk drive device where recording or reproduction of the information signal with respect to the disk-shaped recording medium can be performed and a disk transportation device that transports the disk-shaped recording medium between the disk changer and the disk drive device and the disk transportation device includes a pair of rotation arms that are rotatable respectively about a fulcrum shaft as a fulcrum extending in the same direction as the axial direction of a center shaft of the disk-shaped recording medium in both sides thereof that pinch the transportation passage of the disk-shaped recording medium and four transportation rollers of which two at a time are rotatably supported on the pair of rotation arms respectively, wherein the four transportation rollers contact the outer peripheral surface of the disk-shaped recording medium respectively and thereby the disk-shaped recording medium is held, and the pair of rotation arms are rotated in opposite directions to each other in a state where one of the transportation rollers at a time is supported at the pair of the rotation arms respectively contact the outer peripheral surface of the disk-shaped recording medium and thereby the disk-shaped recording medium is transported between the disk changer and the disk drive device.

Accordingly, since a large transportation distance for the disk-shaped recording medium can be secured without a large load being applied to the disk-shaped recording medium, the transportation performance can be improved with respect to the disk-shaped recording medium.

DETAILED DESCRIPTION OF EMBODIMENTS

Figure 1:
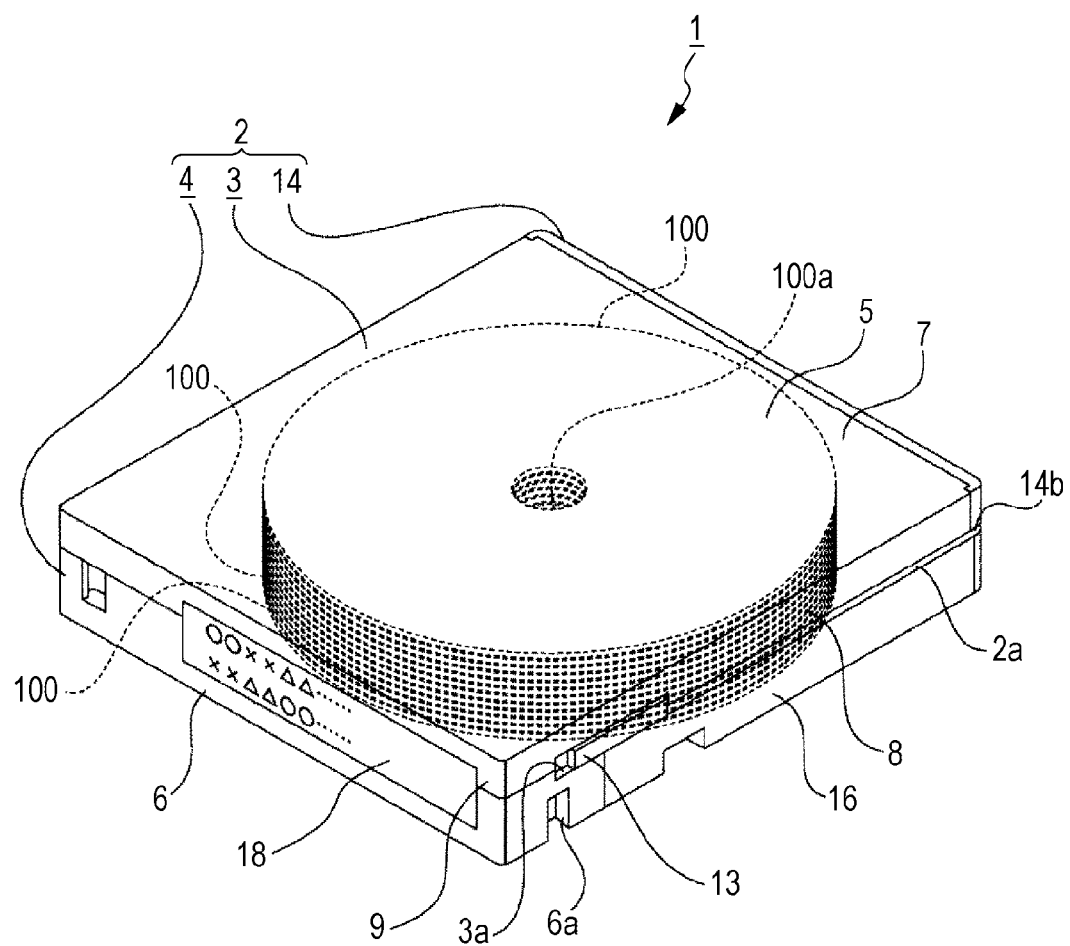
FIG. 1 is a view illustrating a disk transportation device according to an embodiment of the present disclosure with FIGS. 2 to 43, and is a perspective view of a disk cartridge in which a disk-shaped recording medium transported by the disk transportation device is stored.

Hereinafter, embodiments of a disk transportation device and a disk storage system of the present disclosure will be described with reference to drawings. In the disk storage system, the disk transportation device has a function transporting a disk-shaped recording medium between a disk changer and a disk drive device, and a disk cartridge in which a plurality of disk-shaped recording media can be stored is inserted in the disk changer.

In the description below, when the disk cartridge is inserted from an insertion port of the cartridge of the disk changer, the disk cartridge is moved from the rear side to the front side and thereby the longitudinal direction, the vertical direction and the lateral direction are illustrated.

In addition, the longitudinal direction, the vertical direction and the lateral direction described below are for the convenience of description and the embodiments of the present disclosure are not limited to the directions.

Configuration of Disk Cartridge

First, a configuration of a disk cartridge used in the disk storage system will be described (see, FIGS. 1 to 4).

The disk cartridge 1 is configured such that each necessary section is arranged inside of a case 2, and the case 2 has a first shell 3 and a second shell 4. A plurality of disk-shaped recording media 100, 100, . . . may be stored inside of the case 2 at equal distances in the vertical direction.

Figure 2:
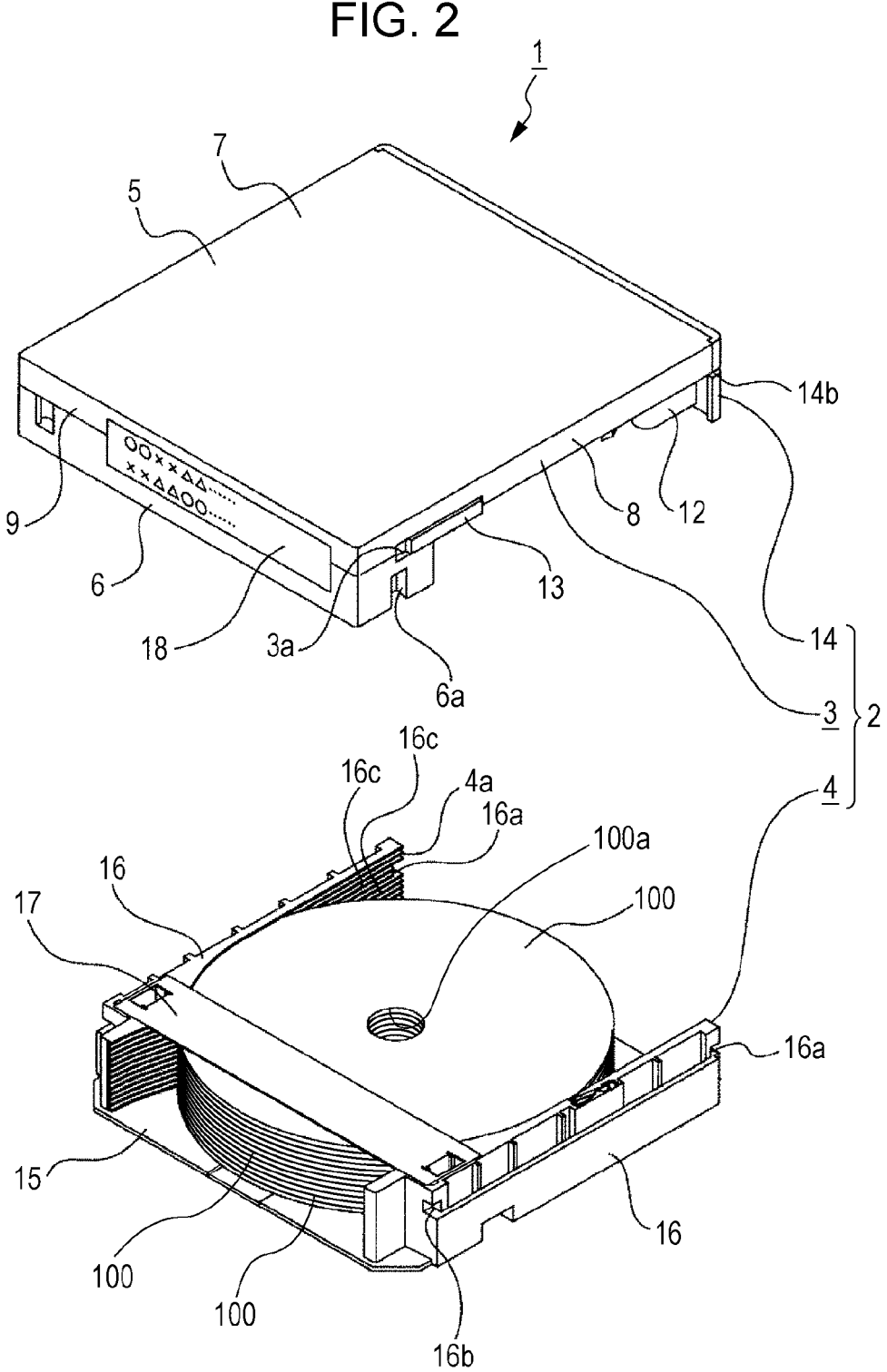
FIG. 2 is a perspective view of the disk cartridge illustrating a separated state of a first shell and a second shell.
Figure 3:
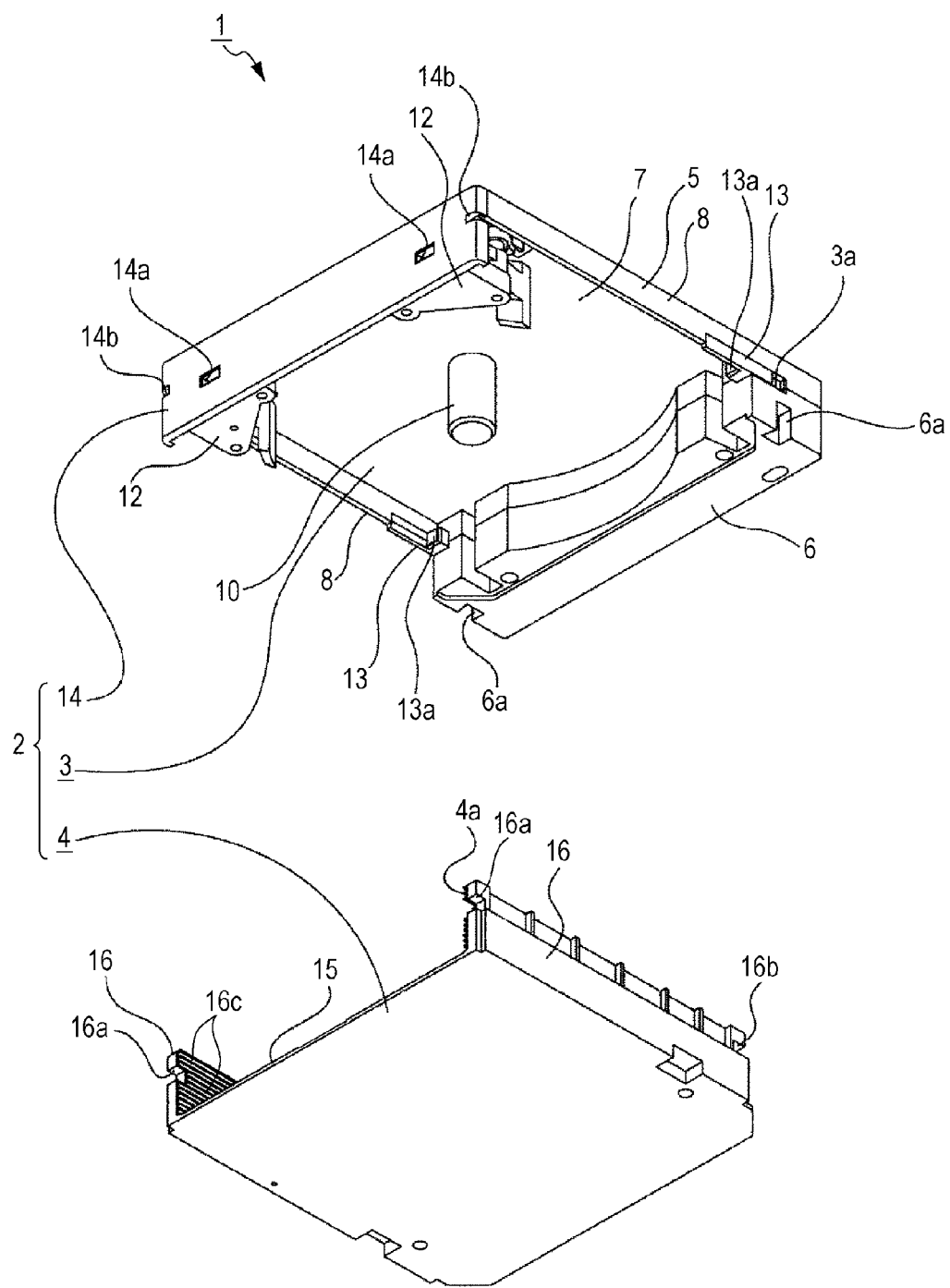
FIG. 3 is a perspective view of the disk cartridge illustrating the separated state of the first shell and the second shell seen from a different direction from FIG. 2.

The first shell 3 and the second shell 4 may be for example, combined or separated in the vertical direction (see FIGS. 1 to 3). In addition, if the case 2 is vertically long, the first shell 3 and the second shell 4 are combined or separated in the lateral direction.

The first shell 3 is configured such that a base 5 and an auxiliary base 6 installed at the rear end of the base 5 are combined in the vertical direction.

The base 5 has a base surface 7 directing in the vertical direction, side surfaces 8 and 8 projected from both the left and right ends of the base surface 7 downwards, and a rear surface 9 projecting from the rear end of the base surface 7 downwards.

A round shaft-shaped center pin 10 projected downward is disposed at a center portion of the base surface 7.

The support shafts 11 and 11 projected downward are disposed at a position close to a front end of the base surface 7 separated horizontally.

Groove-shaped grip sections 6a and 6a opened laterally side (outside) and the lower side respectively are formed at the lower end at both the left and right ends of the auxiliary base 6.

Slider support sections 3a and 3a are formed at positions close to the rear end at the left and right both lateral sides of the first shell 3.

Lock levers 12 and 12 are rotatably supported respectively at the support shafts 11 and 11 of the first shell 3.

Figure 4:
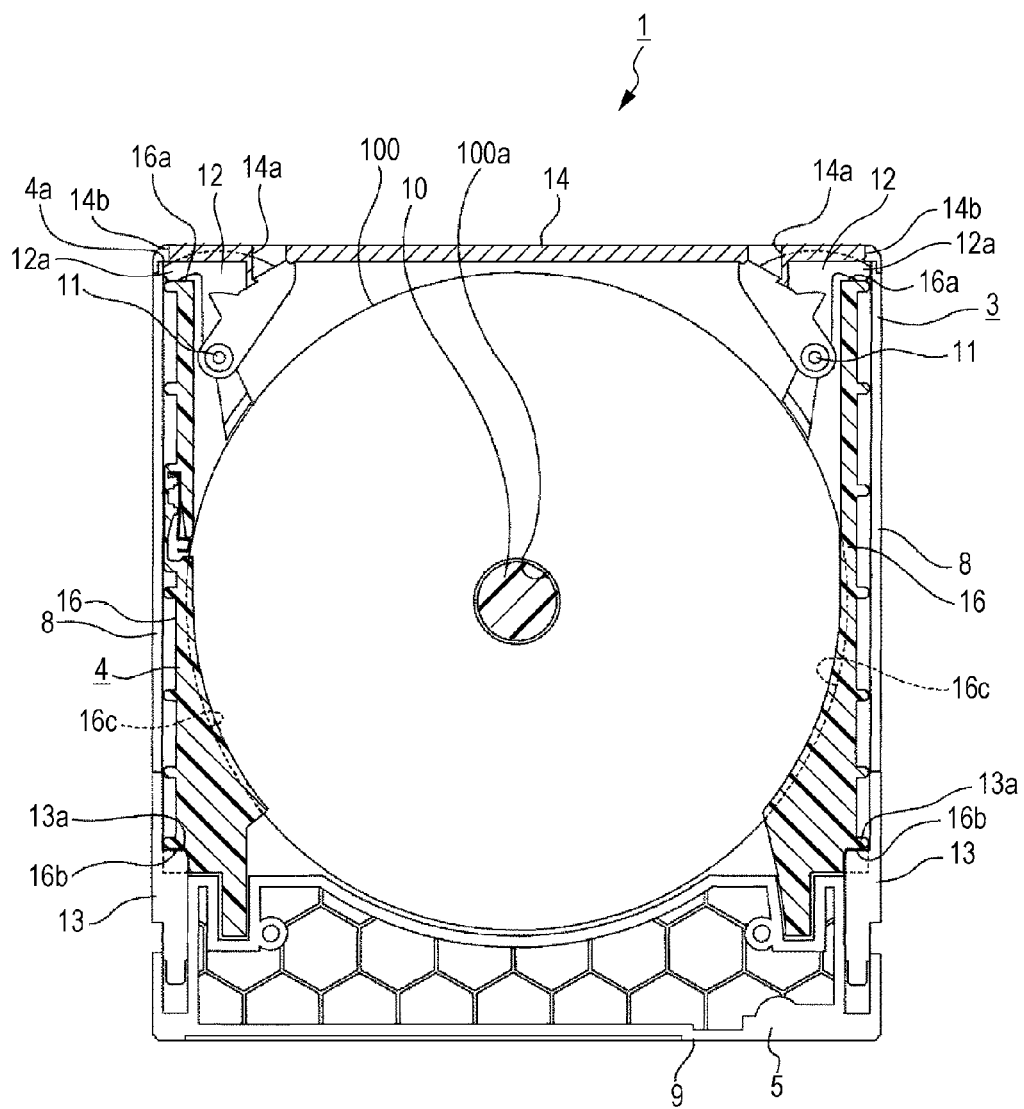
FIG. 4 is a cross-sectional view of the disk cartridge illustrating a state where the first shell and the second shell are locked by a lock slider.

A locking protrusion section 12a projected laterally side is disposed at the front end of the lock lever 12 (see FIG. 4). In a state where the lock levers 12 and 12 are supported at the support shafts 11 and 11, the locking protrusion sections 12a and 12a of the lock levers 12 and 12 are biased respectively close to the side surfaces 8 and 8 by a biasing spring (not shown).

Lock sliders 13 and 13 are slidably supported respectively in the longitudinal direction at the slider support sections 3a and 3a of the first shell 3 (see FIGS. 1 to 4). The lock sliders 13 and 13 are biased to front side by a coil spring (not shown). The lock sections 13a and 13a projected to the inside respectively are disposed respectively at a middle portion in the lock sliders 13 and 13 in the longitudinal direction (see FIGS. 3 and 4).

An openable and closable panel 14 is installed at the front end of the first shell 3 (see FIGS. 1 to 4). Insertion holes 14a and 14a are formed separated horizontally at the openable and closable panel 14. Inserting notches 14b and 14b opened to the outside are formed respectively at both the left and right ends of the openable and closable panel 14.

The second shell 4 is configured such that a base surface 15 directing in the vertical direction and side surfaces 16 and 16 projected respectively from both the left and right ends of the base surface 15 to the upper side are integrally formed.

In the side surface 16, a first locking recess 16a opened to the front side and penetrating in the left and right at the front end is formed and a second locking recess 16b opened backwards and the outside at a position close to the rear end is formed.

Holding grooves 16c, 16c, . . . are formed at the inside of the side surface 16, and the holding grooves 16c, 16c, . . . are positioned spaced at equal distances in the vertical direction.

A bridge member 17 is installed at a position close to the rear end between the side surfaces 16 and 16 of the second shell 4 (see FIG. 2).

An information input sheet 18 is attached, for example, to the rear surface of the case 2 as an information input unit in the disk cartridge 1 (see FIGS. 1 and 2). Predetermined information for example, information regarding the pitch between the disk-shaped recording media 100, 100, . . . stored the inside of the case 2 and the number of disk-shaped recording media 100, 100, . . . stored is input to the information input sheet 18.

In addition, the information input unit is not limited to the information input sheet 18 but can use for example, an appropriate unit such as printed information of bar code or the like printed at the case 2 or a recording chip or the like embedded in the case 2.

In the disk cartridge 1 configured as described above, the disk-shaped recording media 100, 100, . . . are held inside of the case 2 (see FIGS. 1 and 2). In a state where the first shell 3 and the second shell 4 are separated from each other, the outer peripheral portion of the disk-shaped recording medium 100 is inserted from the front side into the holding grooves 16c and 16c formed at the side surfaces 16 and 16 of the second shell 4 and thereby the disk-shaped recording medium 100 is held inside of the case 2. Accordingly, the opening positioned at the front end of the second shell 4 is formed as a disk insertion port 4a where the disk-shaped recording media 100, 100, . . . are inserted and taken out from the second shell 4.

In a state where the first shell 3 and the second shell 4 combined, the openable and closable panel 14 is installed at the first shell 3 and thereby the case 2 is configured, insertion grooves 2a and 2a extending in the forth and back respectively are formed at the left and right both lateral side sections (see FIG. 1). The rear ends of the insertion grooves 2a and 2a are connected to the slider support sections 3a and 3a of the first shell 3 respectively and the front ends thereof are connected to the inserting notches 14b and 14b formed at the openable and closable panel 14 respectively.

Combined State of Disk Cartridge

Hereinafter, the combined state of the disk cartridge 1 will be described (see FIG. 4).

The first shell 3 and the second shell 4 are combined in a state where the base surface 7 of the base 5 and the base surface 15 are facing upper and lower side.

The first shell 3 and the second shell 4 are locked by the lock levers 12 and 12 and the lock sliders 13 and 13 in a state where the first shell 3 and the second shell 4 are combined with each other.

The lock levers 12 and 12 are positioned at the rotation end in the direction (outside) which the locking protrusion sections 12a and 12a are separated from each other by the biasing force of the biasing spring, and the locking protrusion sections 12a and 12a are inserted respectively into the first locking recesses 16a and 16a formed at the side surfaces 16 and 16 of the second shell 4 so that the locking protrusion sections 12a and 12a are combined.

The lock sliders 13 and 13 are positioned at a movement end of the front side by the biasing force of the coil spring and the lock sections 13a and 13a are inserted respectively into the second locking recesses 16b and 16b formed at the side surfaces 16 and 16 of the second shell 4 so that the lock sections 13a and 13a are engaged.

In a state where the first shell 3 and the second shell 4 are combined with each other, the disk-shaped recording media 100, 100, . . . are configured such that the center pin 10 disposed at the first shell 3 is inserted into center holes 100a, 100a, . . . .

Overall Configuration of Disk Storage System

Next, the overall configuration of a disk storage system 20 will be described (see FIGS. 5 and 6).

In the disk storage system 20, a rack 21, a cartridge delivery device 22, a disk changer 23, a disk transportation device 24 and disk drive devices 25 and 25 are arranged in order to front side from the rear side.

The cartridge delivery device 22, the disk changer 23, the disk transportation device 24 and the disk drive devices 25 and 25 are arranged on a planar base 200 directing in the vertical direction. A guide section 201 extending in the lateral direction is formed at a position close to the front end of the base 200. Guide rails 202 and 202 extending in the lateral direction are formed spacing in the forth and back at the position close to the rear end of the base 200.

In the disk storage system 20, the cartridge delivery device 22 is guided with the guide rails 202 and 202 by a first movement mechanism (not shown) and then may be moved in the lateral direction, and the disk transportation device 24 is guided with the guide section 201 by a second movement mechanism (not shown) and then may be moved in the lateral direction.

A plurality of the storage sections 26, 26, . . . is formed at the rack 21 side by side in the vertical direction and the lateral direction, and the storage sections 26, 26, . . . are penetrated front to rear. In addition, the storage sections 26, 26, . . . may be formed side by side in at least one of the vertical direction or the lateral direction.

The rack 21 is installed at a planar cover 300, a rear surface of which is directed to the longitudinal direction. An opening 300a is formed at the cover 300 and the insertion and the taking out of the disk cartridge 1 to the rack 21 via opening 300a can be performed. Grips 301 and 301 are disposed at both the left and right ends of the cover 300 respectively.

The cartridge delivery device 22 has a function of delivering the disk cartridge 1 between the rack 21 and the disk changer 23.

Figure 5:
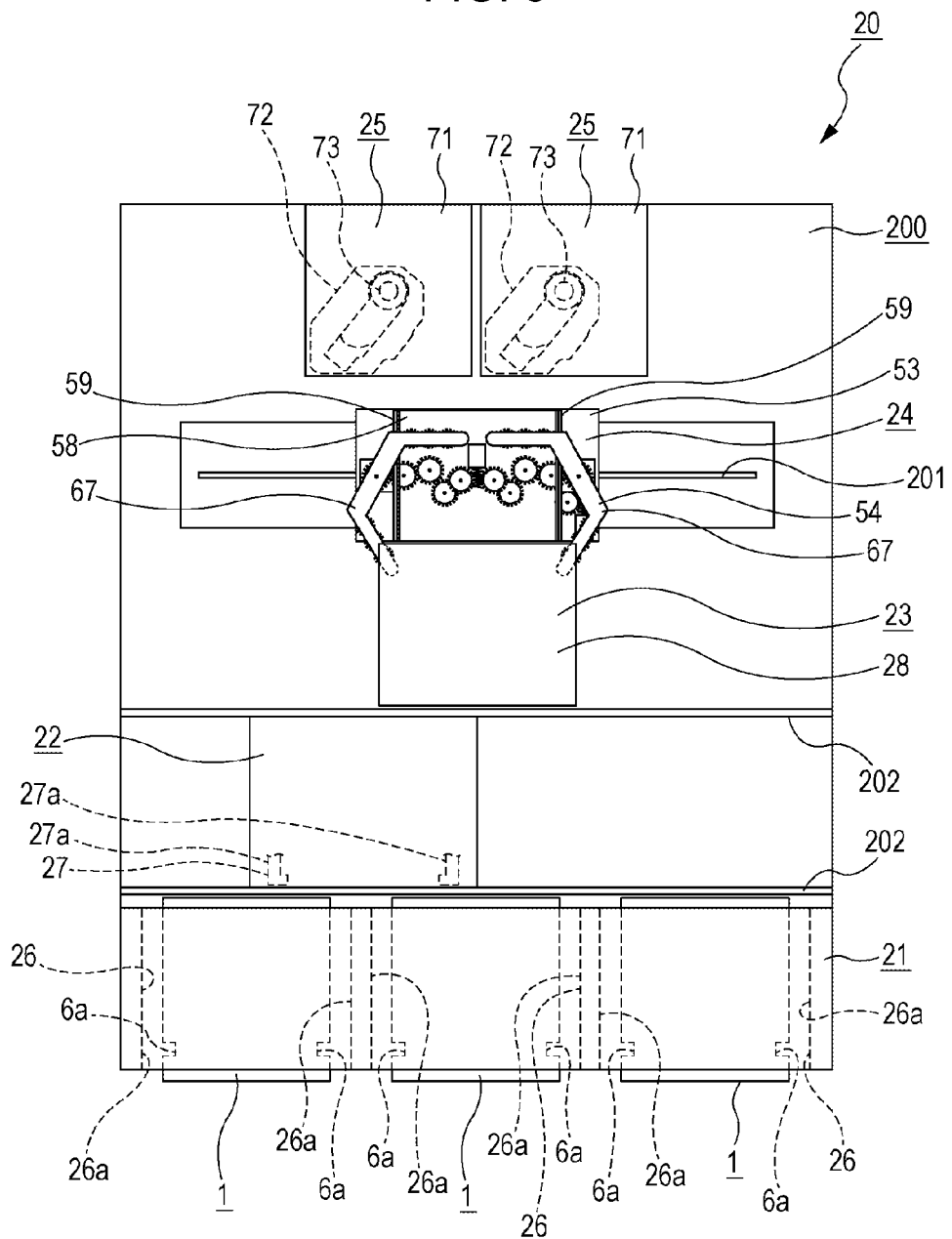
FIG. 5 is a schematic plan view of a disk storage system where the disk transportation device is disposed.
Figure 6:
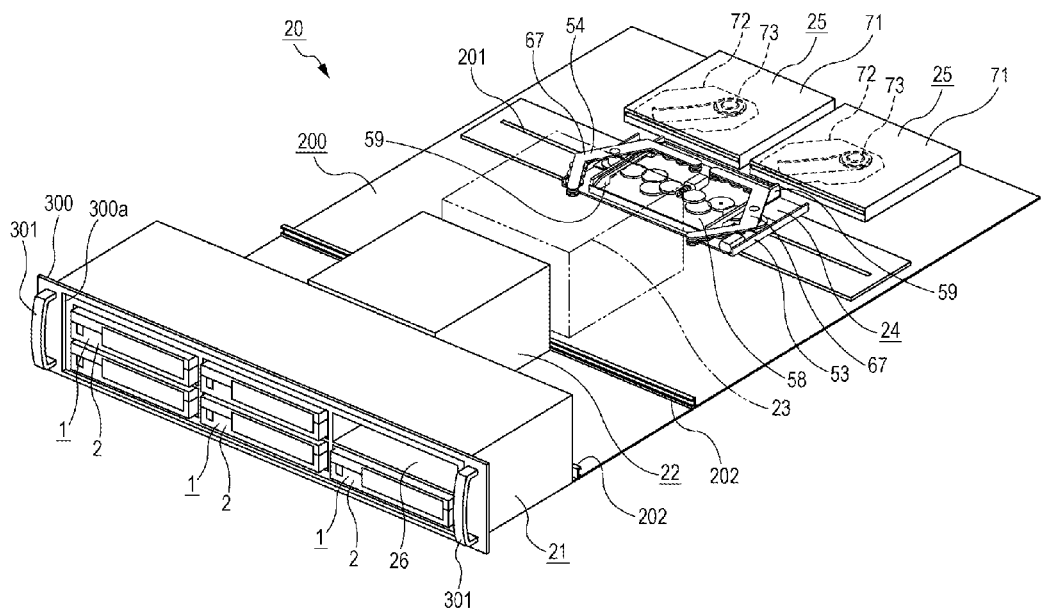
FIG. 6 is a schematic perspective view illustrating the disk storage system where the disk transportation device is disposed.

A disk grip mechanism 27 is disposed at the cartridge delivery device 22 (see FIG. 5). The disk grip mechanism 27 has, for example, a pair of the engaging claws 27a and 27a. The disk grip mechanism 27 may move in the vertical direction inside of the cartridge delivery device 22. Engaging claws 27a and 27a may be moved in the longitudinal direction and in the lateral direction.

In a state where the disk cartridge 1 is stored in a storage section 26 of the rack 21, for example, insertion spaces 26a and 26a are formed at both the left and right sides of the disk cartridge 1 respectively inside of the storage section 26, and the engaging claws 27a and 27a may be inserted into the insertion spaces 26a and 26a respectively.

Figure 7:
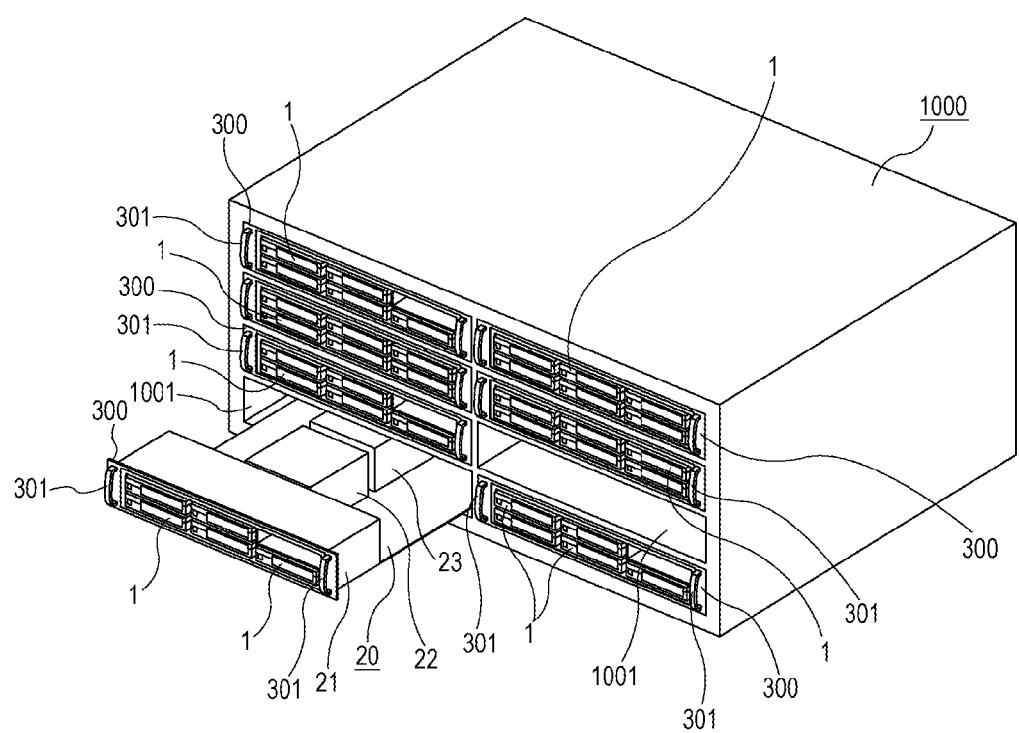
FIG. 7 is a perspective view illustrating a storage rack and the disk storage system which is stored in a recess for arranging of the storage rack.

The disk storage system 20 as described above, is handled for example, in a data center, and a storage rack 1000 in which a plurality of the storage systems 20, 20, . . . is stored is arranged in the data center or the like (see FIG. 7). The deployment recesses 1001, 1001, . . . opened side by side vertically and horizontally at the rear side are formed at the storage rack 1000. The disk storage systems 20, 20 . . . may be stored in the deployment recesses 1001, 1001, . . . respectively. A user grips the grips 301 and 301 of the cover 300, draws out the storage systems 20, 20, . . . installed at the cover 300 from the deployment recess 1001, and the storage systems 20, 20, . . . may be stored in another deployment recess 1001.

Specific Configuration of Each Section of Disk Storage System

Hereinafter, specific configuration of the disk changer 23, the disk transportation device 24 and a disk drive device 25 will be described (see FIGS. 8 to 16).

Configuration of Disk Changer

First, specific configuration of the disk changer 23 will be described (see FIGS. 8 to 12).

Figure 8:
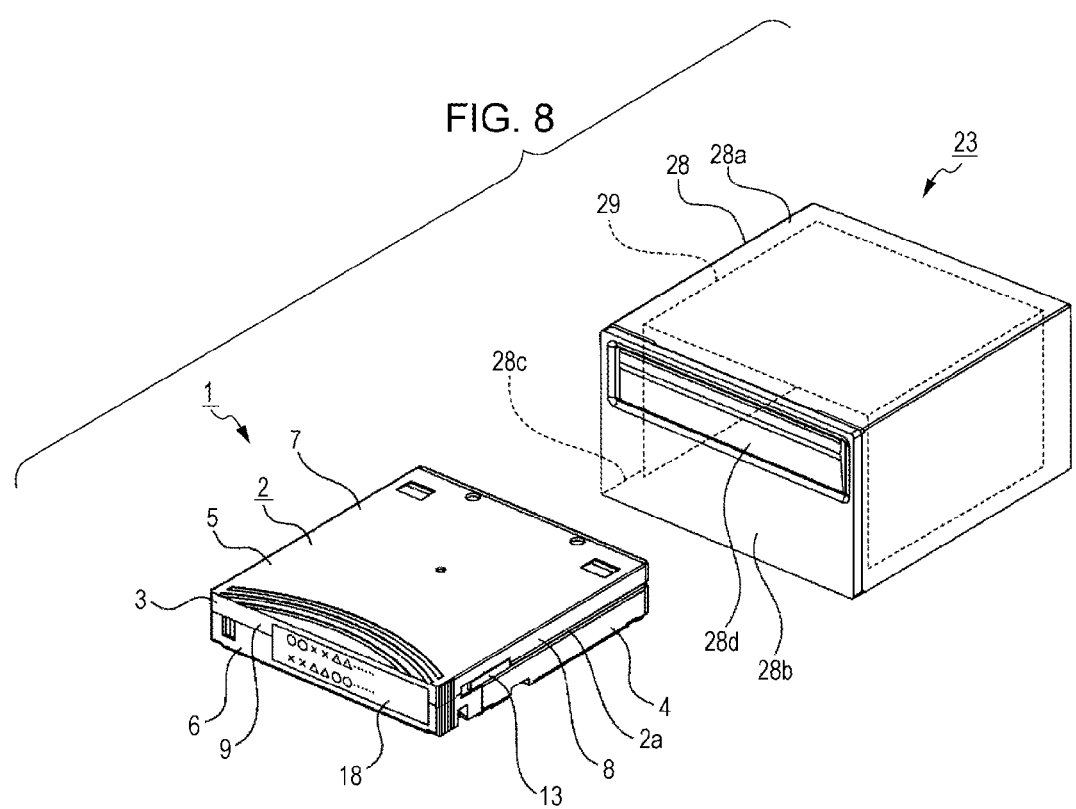
FIG. 8 is a perspective view illustrating a disk changer with the disk cartridge.

The disk changer 23 is configured such that each necessary section is arranged inside of an outer case 28 (see FIG. 8).

The outer case 28 is configured of an outer frame 28*a* opened forward and backwards, and downwards, a panel 28*b* installed at rear end of the outer frame 28*a* and directed to the longitudinal direction, and a base frame 28*c* installed at the lower end of the outer frame 28*a* and directed to the vertical direction.

A cartridge insertion port penetrating in the longitudinal direction is formed at the upper end of the panel 28*b* and the cartridge insertion port may be opened and closed by a shutter 28*d*.

A holder cover 29 is arranged inside of the outer case 28. The holder cover 29 has a top plate 30 and side plates 31 and 31 projected from both the left and right edges of the top plate 30 downwards respectively (see FIGS. 9 and 10).

A support hole 31*a* extending in the longitudinal direction is formed at the upper end of the side plate 31.

Cam support holes 32 and 32 separated in the longitudinal direction are formed at the side plate 31. The cam support hole 32 is configured of a horizontal section 32*a* extending in the longitudinal direction and a vertical section 32*b* extending in the vertical direction, and the front end of the horizontal section 32*a* and the upper end of the vertical section 32*b* are connected to each other.

Support projection pins 31*b* and 31*b* separated in the longitudinal direction and projected to the outside are disposed at the lower end of the side plate 31. Notches 31*c* and 31*c* opened forwards and upwards are respectively formed at the front end of the side plates 31 and 31 respectively. In addition, notches (not shown) are formed at the same positions as the notches 31*c* and 31*c* also in the outer case 28.

Figure 9:
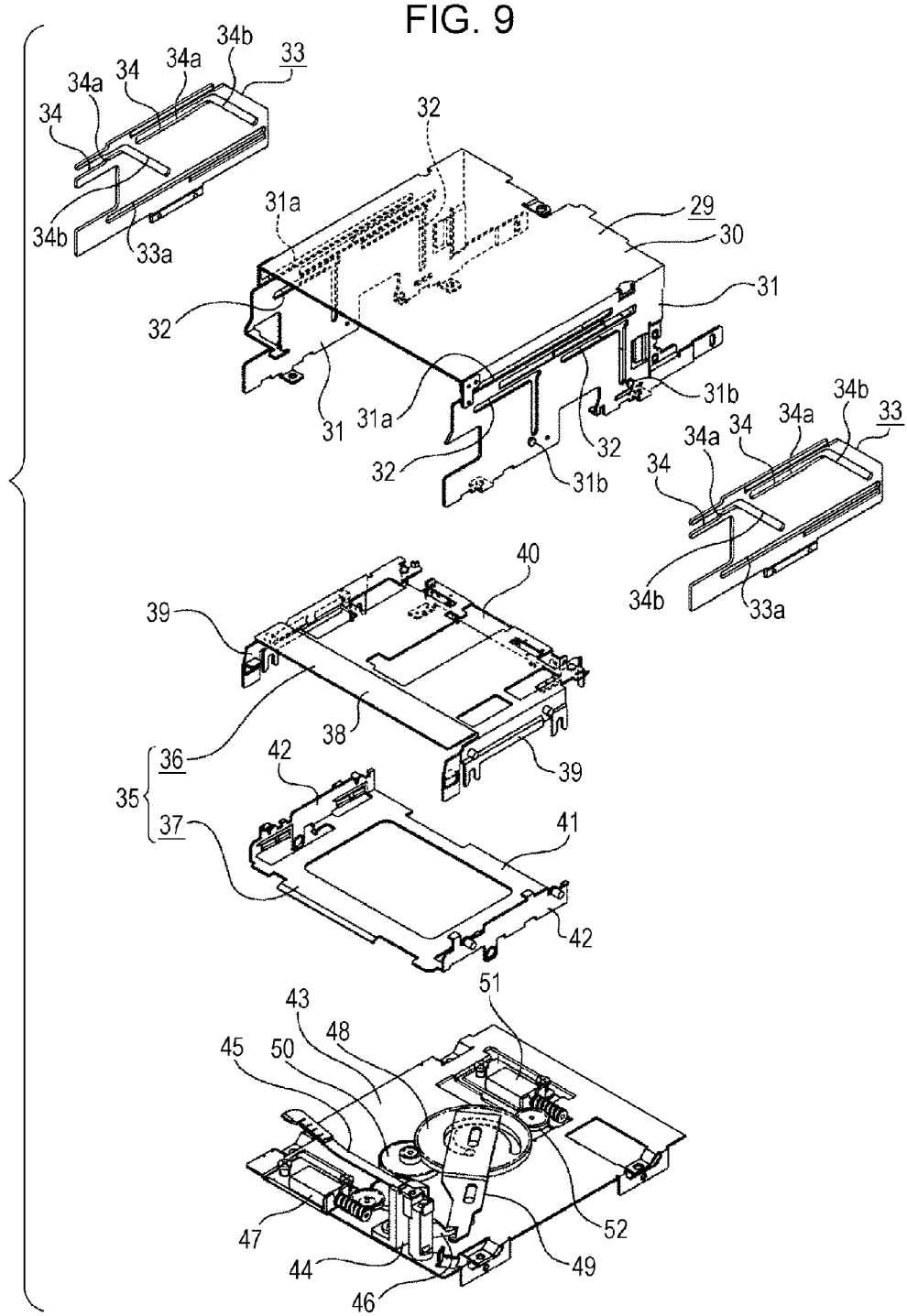
FIG. 9 is an exploded perspective view illustrating an inner structure of the disk changer.

Sliders 33 and 33 are movably supported in the longitudinal direction at an outer surface of the side plates 31 and 31 (see FIG. 9).

Cam holes 34 and 34 separated in the longitudinal direction are formed at the slider 33. The cam hole 34 has a linear section 34*a* extending in the longitudinal direction and a slope section 34*b* inclined so as to displace downwards according to the forward movement, and the front end of the linear section 34*a* and the upper end of the slope section 34*b* are connected. A supported hole 33*a* extending in the longitudinal direction is formed at the lower end of the slider 33.

The support projection pins 31*b* and 31*b* are slidably engaged in the supported hole 33*a* and thereby the slider 33 is movably supported at the side plate 31 of the holder cover 29 in the longitudinal direction.

A disk holder 35 is movably supported at the holder cover 29. The disk holder 35 is configured of an upper holder 36 and a lower holder 37 (see FIGS. 11 and 12).

The upper holder 36 is configured of an upper surface 38 directing in the vertical direction, side surfaces 39 and 39 projected from both the left and right edges of the upper surface 38 downwards respectively, and a front surface 40 projected from the front edge of the upper surface 38 downwards.

Sliding pins 39*a* and 39*a* projected laterally are disposed at the outer surface of the side surface 39 spacing in the forth and back. A releasing piece 39*b* projected inward is disposed at the rear end of the side surface 39. Connection grooves 39*c* and 39*c* opened downward are formed at the lower end of the side surface 39 spacing in the forth and back.

Lock releasing pieces 40*a* and 40*a* are disposed at the front surface 40 separated horizontally. The lock releasing pieces 40*a* and 40*a* are disposed in a projected state backwards.

Sliding pins 39*a*, 39*a*, . . . are inserted from the inner surface of the side plates 31 and 31 into the support holes 31*a* and 31*a* respectively and thereby the upper holder 36 movably supported at the holder cover 29 in the longitudinal direction.

The lower holder 37 is configured of a lower plate 41 directing in the vertical direction and side plates 42 and 42 projected from both the left and right edges of the lower plate 41 to the upper side respectively.

Sliding pins 42*a* and 42*a* projected laterally are disposed at the outer surface of the side plate 42 spacing in the forth and back. Holding pieces 42*b* and 42*b* projected inward are disposed at the upper end of the side plate 42 spacing in the forth and back.

Sliding pins 42*a*, 42*a*, . . . are inserted from the inner surface of the side plates 31 and 31 into the cam support holes 32, 32, . . . and the cam holes 34, 34, . . . respectively, and thereby the lower holder 37 is movably supported at the holder cover 29 and the sliders 33 and 33 in the longitudinal direction and the vertical direction.

Figure 11:
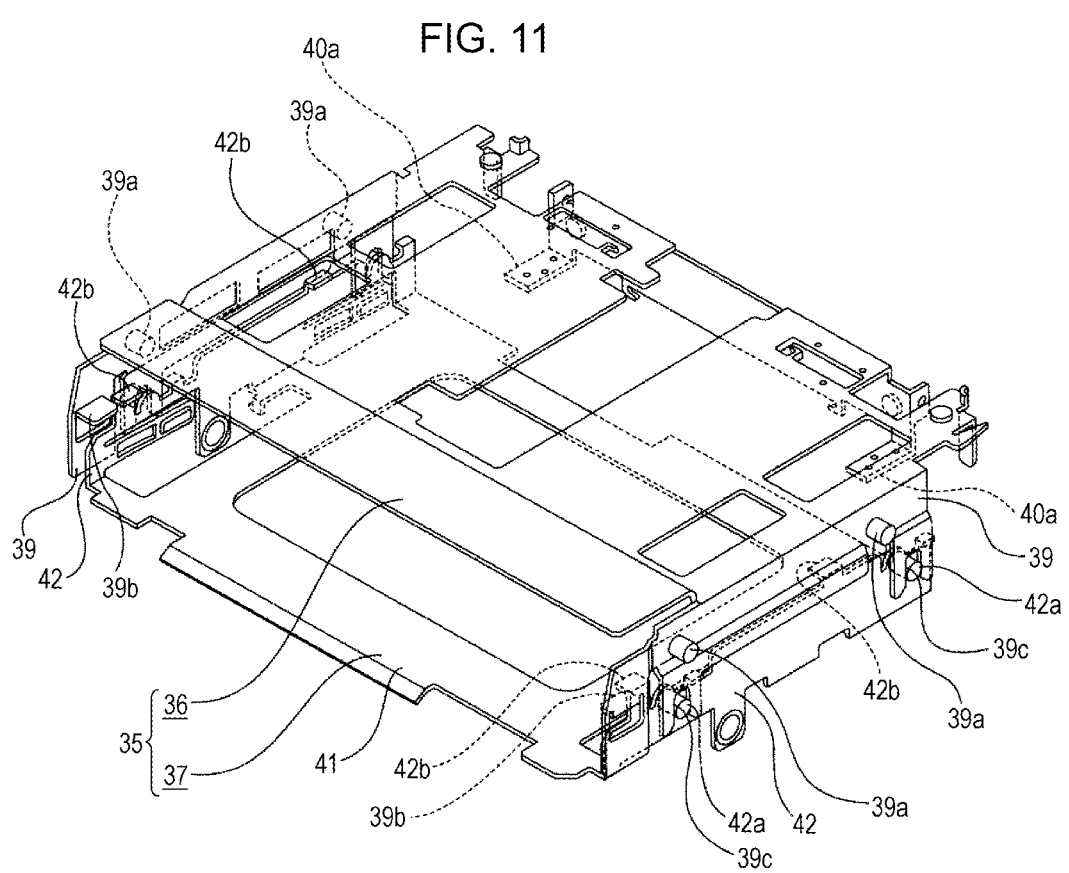
FIG. 11 is a perspective view of a disk holder.
Figure 12:
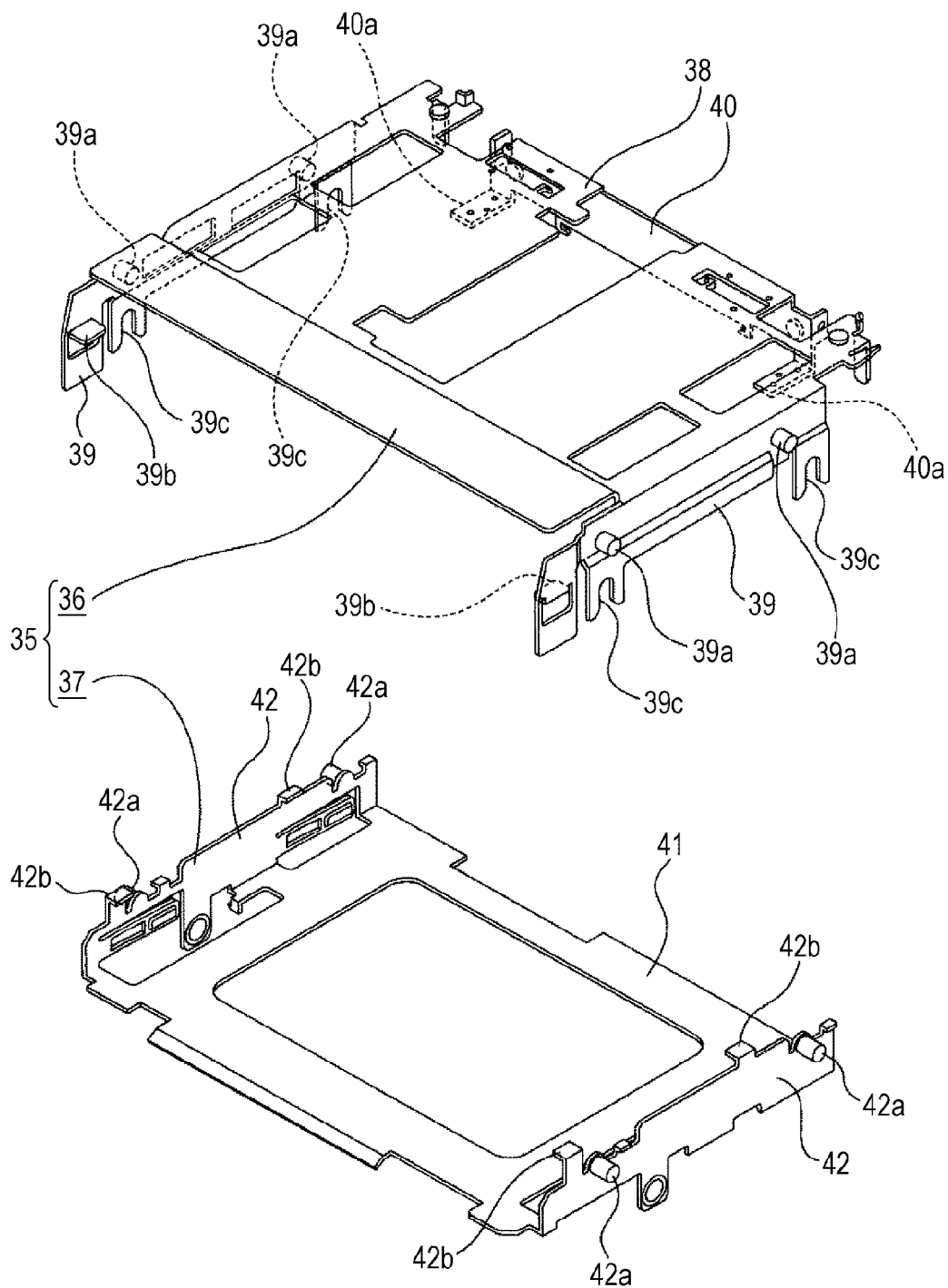
FIG. 12 is a perspective view illustrating the disk holder as separated.

Sliding pins 42*a*, 42*a*, . . . are engaged being inserted from the lower side into the connection grooves 39*c*, 39*c*, . . . respectively, and thereby the upper holder 36 and the lower holder 37 are combined in the vertical direction (see FIG. 11).

Figure 10:
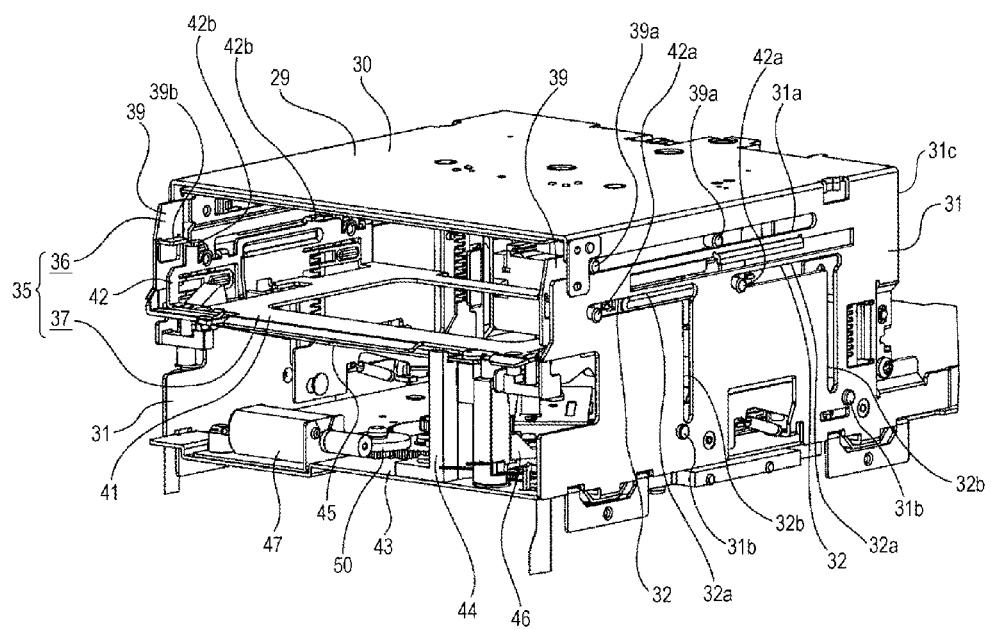
FIG. 10 is a perspective view illustrating the inner structure of the disk changer.

A chassis 43 is installed on the base frame 28*c* of the outer case 28 (see FIGS. 9 and 10).

A support member 44 projected to the upper side is installed on the rear end of the chassis 43 (see FIG. 9). A discharge lever 45 rotatable in the horizontal direction is supported at the upper end of the support member 44. An operated member 46 is connected to the discharge lever 45 and the lower end of the operated member 46 is positioned on the chassis 43.

A first actuation motor 47 is arranged on the chassis 43.

A rotation cam 48 is supported at the chassis 43 and an arm lever 49 is connected to the rotation cam 48. One end of the arm lever 49 is connected to the lower end of the operated member 46. A first reduction gear group 50 is supported on the chassis 43 and the first reduction gear group 50 is meshed with the rotation cam 48.

The driving force of the first actuation motor 47 is transmitted via the first reduction gear group 50 so that the rotation cam 48 is rotated and the arm lever 49 is operated by the rotation of the rotation cam 48. When the arm lever 49 is operated, the operated member 46 is operated and the discharge lever 45 is rotated with respect to the support member 44.

Rack gears (not shown) installed at the sliders 33 and 33 respectively are arranged at the bottom of the chassis 43.

A second actuation motor 51 is arranged on the chassis 43 to the front of the first actuation motor 47.

A second reduction gear group 52 is supported at the chassis 43 and the second reduction gear group 52 is supported at the lower surface of the chassis 43 except a portion thereof.

The second reduction gear group 52 is meshed with a rack gear installed at the sliders 33 and 33 respectively.

The driving force of the second actuation motor 51 is transmitted to the rack gear via second reduction gear group 52 so that the sliders 33 and 33 are moved in the longitudinal direction. When the sliders 33 and 33 are moved in the longitudinal direction, as described below, the lower holder 37 of the disk holder 35 is moved to the vertical direction and the second shell 4 of the disk cartridge 1 is separated from the first shell 3 or separated from the second shell 4 is combined with the first shell 3.

Accordingly, the second actuation motor 51, the second reduction gear group 52 and the sliders 33 and 33 move the lower holder 37 of the disk holder 35 in the vertical direction and thereby function as a shell driving mechanism performing the separation and the combination of the first shell 3 and the second shell 4. The shell driving mechanism has an encoder (not shown) and the stop position of the lower holder 37 in the vertical direction is determined based on the information input in the information input sheet 18 that functions as the information input unit attached at the disk cartridge 1 using the encoder.

A cartridge moving mechanism (not shown), which moves the disk holder 35 in the longitudinal direction in a state where the disk cartridge 1 is inserted in the disk holder 35, is disposed at the disk changer 23.

Configuration of Disk Transportation Device

Figure 13:
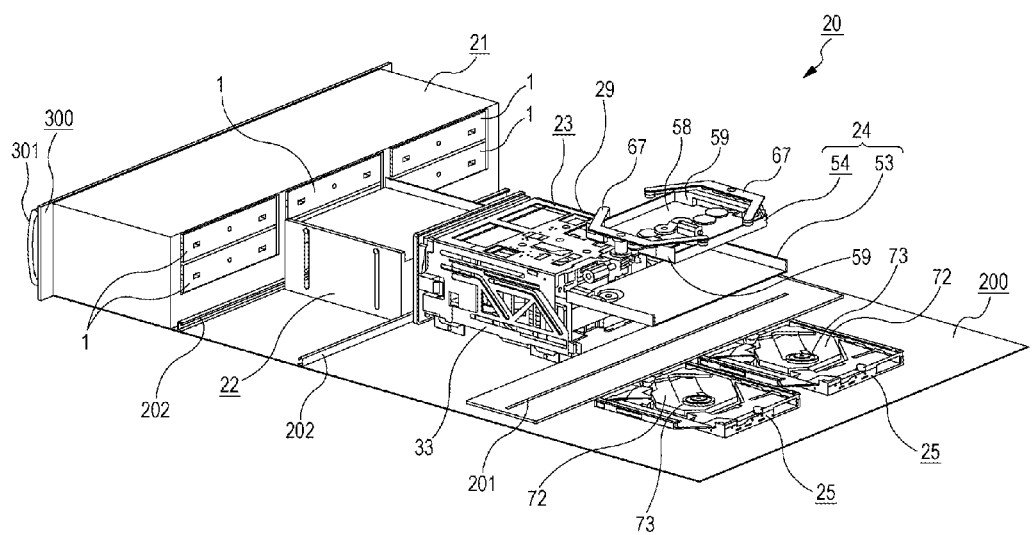
FIG. 13 is a perspective view illustrating the disk storage system as a portion of the disk transportation device is separated therefrom.
Figure 14:
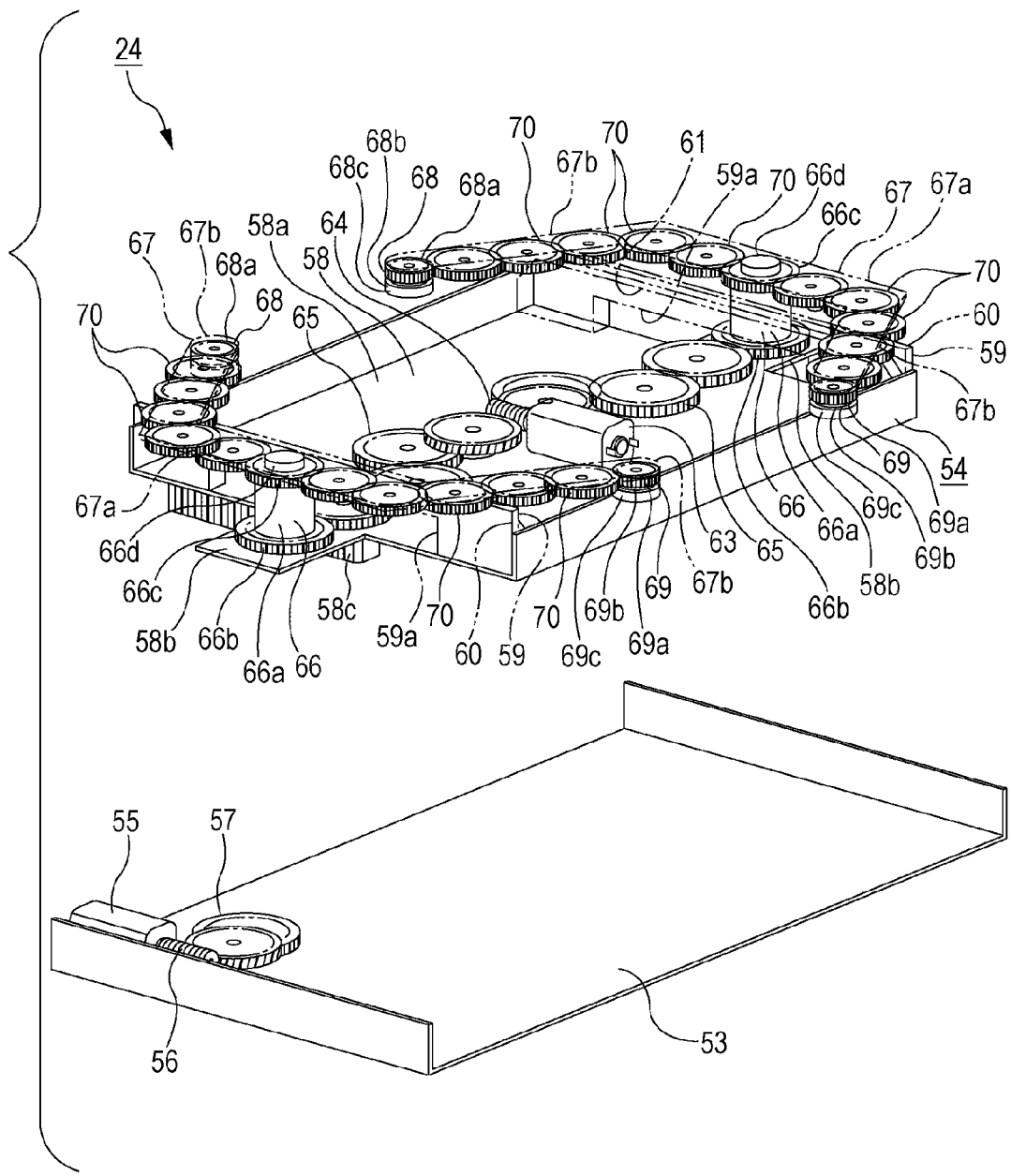
FIG. 14 is a perspective view illustrating the disk transportation device as a support base and a driving section are separated.
Figure 15:
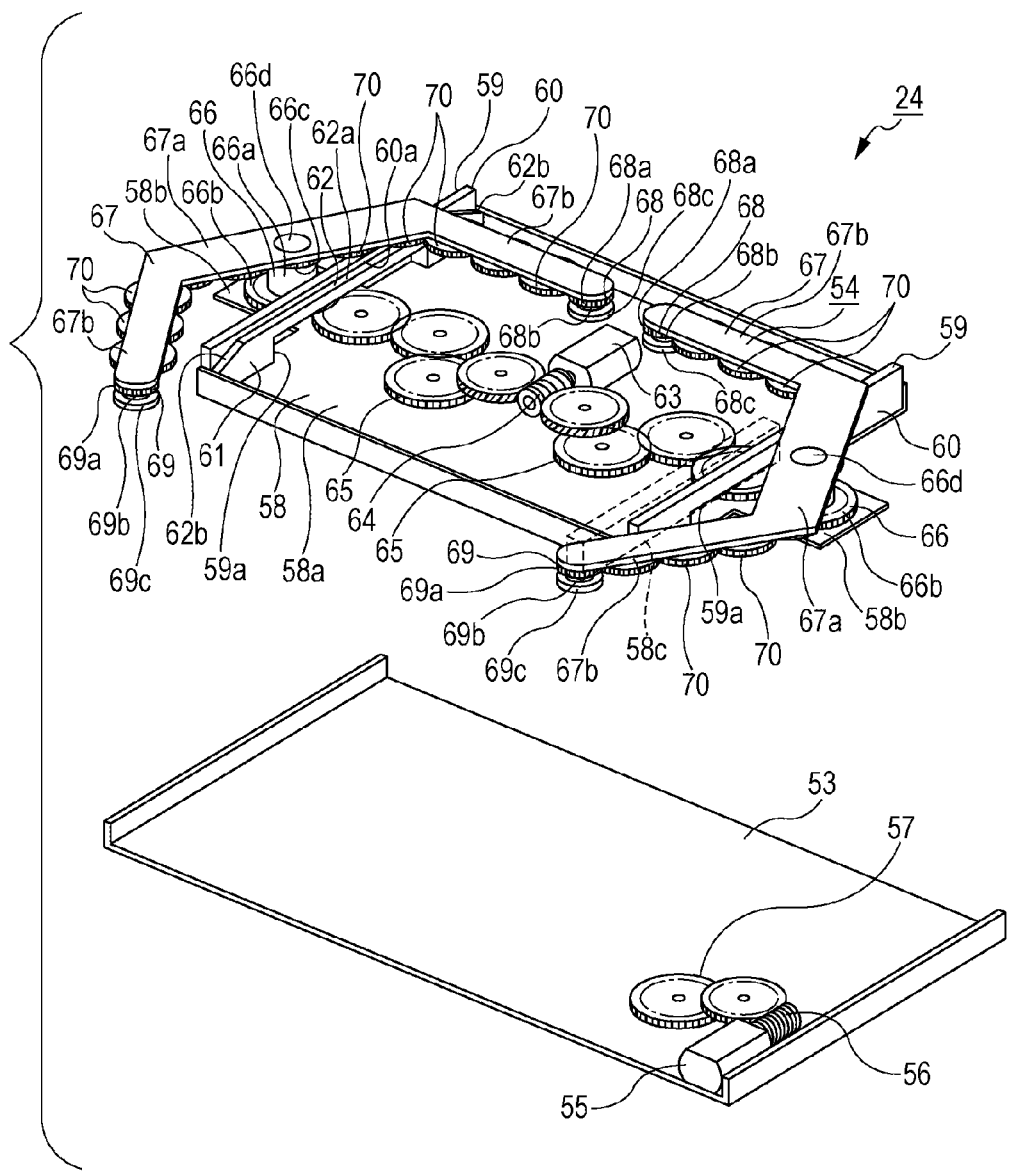
FIG. 15 is a perspective view illustrating the support base and the driving section as separated in a state that the disk transportation device is seen from a different direction from FIG. 14.

A specific configuration of the disk transportation device 24 will be described (see FIGS. 13 to 15).

The disk transportation device 24 has a support base 53 and a driving section 54 positioned at the upper side of the support base 53.

A motor 55 is arranged at one side of the support base 53 and a worm 56 is fixed at a motor shaft of the motor 55. A gear group 57 is supported on the support base 53 and the gear group 57 is meshed with the worm 56.

The driving section 54 is configured such that each necessary section is arranged at the base plate 58.

The base plate 58 has a rectangular-shaped support surface 58a directing in the vertical direction and projection surfaces 58b and 58b projected to the left and right respectively from the support surface 58a. A rack section 58c, which is extended forwards and backwards, is disposed at the side portion in one direction on the lower surface of the base plate 58.

Guide members 59 and 59 are installed at both the left and right ends in the upper surface of the base plate 58 respectively.

The guide member 59 is formed in a shape extending in the front and rear, and is configured of an outer section 60 and an inner section 61. The upper surface of the inner section 61 is lower than the upper surface of the outer section 60, the upper end in the inner surface of the outer section 60 is formed as a guide surface 60a and the upper surface of the inner section 61 is formed as a sliding surface 62. A portion except both the front and back ends of the sliding surface 62 is a plane 62a and directs to the upper side. Both the front and back ends of the sliding surface 62 are slope surfaces 62b and 62b inclined so as to displace to the upper side as close to the plane 62a.

A gear arrangement hole 59a, which penetrates horizontally, is formed at the guide member 59.

A driving motor 63 is arranged at the center of the support surface 58a of the base plate 58. A worm gear 64 is fixed at the motor shaft of the driving motor 63.

Transfer mechanisms 65 and 65, which are configured of a plurality of gears meshed with each other in this order, are disposed separated horizontally on the support surface 58a of the base plate 58, and are meshed with the worm gear 64 positioned innermost of the transfer mechanisms 65 and 65. The transfer mechanisms 65 and 65 have a function that delivers the driving force of the driving motor 63 to a pair of rotation arms (described below) respectively.

Fulcrum shafts 66 and 66 are rotatably supported on the projection surfaces 58b and 58b of the base plate 58 respectively. The fulcrum shaft 66 is configured of a shaft section 66a extending vertically, an interlocking gear 66b disposed at the lower end of the shaft section 66a, a driving gear 66c disposed at the upper end of the shaft section 66a and a support shaft section 66d projected from the driving gear 66c to the upper side.

Gears, which are positioned at the outermost of the transfer mechanisms 65 and 65 respectively, are meshed with interlocking gears 66b and 66b of the fulcrum shafts 66 and 66 via gear arrangement holes 59a and 59a of the guide members 59 and 59.

Rotation arms 67 and 67, which are formed by planar material directing in the vertical direction respectively, are rotatably supported at the fulcrum shafts 66 and 66 respectively. The rotation arm 67 is configured of a base 67a extending in one direction in the horizontal direction, and projection-shaped sections 67b and 67b projected from both ends in the longitudinal direction of the base 67a respectively.

The center of the base 67a of the rotation arm 67 is supported at the support shaft section 66d of the fulcrum shaft 66. The rotation arm 67 is formed in a shape symmetrical with respect to the fulcrum shaft 66, and projected from the base 67a so as to space to each other as the projection-shaped sections 67b and 67b are spaced from the base 67a in the horizontal direction.

In a state where the rotation arm 67 is supported at the fulcrum shaft 66, the upper surface of the driving gear 66c and a portion of the lower surface of the rotation arm 67 are contacted and constant friction force may be generated between them. Accordingly, when the fulcrum shaft 66 is rotated, the rotational force is generated to the rotation arm 67 by the friction force generated between the fulcrum shaft 66 and the rotation arm 67 in the same direction as the fulcrum shaft 66.

A first transportation roller 68 and a second transportation roller 69 are rotatably supported at the lower surface of the front end of the projection-shaped sections 67b and 67b in the rotation arm 67 respectively. The first transportation roller 68 and the second transportation roller 69 are configured of driven gears 68a and 69a, disk action sections 68b and 69b and the receiving sections 68c and 69c in this order from the upper side respectively, and the disk action sections 68b and 69b and receiving sections 68c and 69c are for example, configured of a rubber material. The outer diameters of the disk action sections 68b and 69b are smaller than the outer diameters of the driven gears 68a and 69a, and the receiving sections 68c and 69c.

A plurality of the intermediate gears 70, 70, . . . between the fulcrum shaft 66, the first transportation roller 68 and the second transportation roller 69 is supported at the lower surface of the rotation arm 67. The number of the intermediate gears 70, 70, . . . positioned between the fulcrum shaft 66 and the first transportation roller 68 and the number of the intermediate gears 70, 70, . . . positioned between the fulcrum shaft 66 and the second transportation roller 69 are any odd number.

When the driving motor 63 is rotated, the driving force thereof transmits to the worm gear 64, the transfer mechanisms 65 and 65, the fulcrum shafts 66 and 66, the intermediate gears 70, 70, . . . and the driven gears 68a, 68a, 69a and 69a in this order, and the first transportation rollers 68 and 68 and the second transportation rollers 69 and 69 are rotated in a direction according to the rotation direction of the driving motor 63. At this time, the driving force is transmitted from the fulcrum shafts 66 and 66 to the rotation arms 67 and 67 and the rotation arms 67 and 67 are rotated in the same direction as the fulcrum shafts 66 and 66. In addition, since the number of intermediate gears 70, 70, . . . is an odd number, the first transportation rollers 68 and 68 and the second transportation rollers 69 and 69 are rotated in the same direction as the rotation arms 67 and 67.

At this time, the pair of rotation arms 67 and 67 are rotated synchronized with each other in the opposite direction.

The driving section 54 is supported at the support base 53 in a state where the rack section 58*c* is meshed with the gear group 57 supported at the support base 53. Accordingly, when the motor 55 is rotated, the driving force thereof is transmitted to the worm 56, the gear group 57 and the rack section 58*c* in this order, and the driving section 54 moves in the longitudinal direction according to the rotation direction of the motor 55.

When the disk-shaped recording medium 100 is discharged from the disk cartridge 1 inserted in the disk changer 23 to the disk transportation device 24, the disk-shaped recording medium 100 is held by taking out from the disk cartridge 1 due to the disk transportation device 24, and the disk-shaped recording medium 100 is transported to the disk drive device 25 by the disk transportation device 24.

Conversely, when the disk-shaped recording medium 100 is discharged from the disk drive device 25 to the disk transportation device 24, the disk-shaped recording medium 100 is held by taking out from the disk drive device 25 due to the disk transportation device 24, and the disk-shaped recording medium 100 is transported to the disk cartridge 1 that is inserted into the disk changer 23 by the disk transportation device 24.

As described above, the disk-shaped recording medium 100 is transported between the disk changer 23 and the disk drive device 25 by the disk transportation device 24. At this time, the disk transportation device 24 is moved in the lateral direction so that the transportation of the disk-shaped recording medium 100 may be performed between the disk changer 23 and the disk drive devices 25 and 25 that are side by side in the lateral direction.

Configuration of Disk Drive Device

Figure 16:
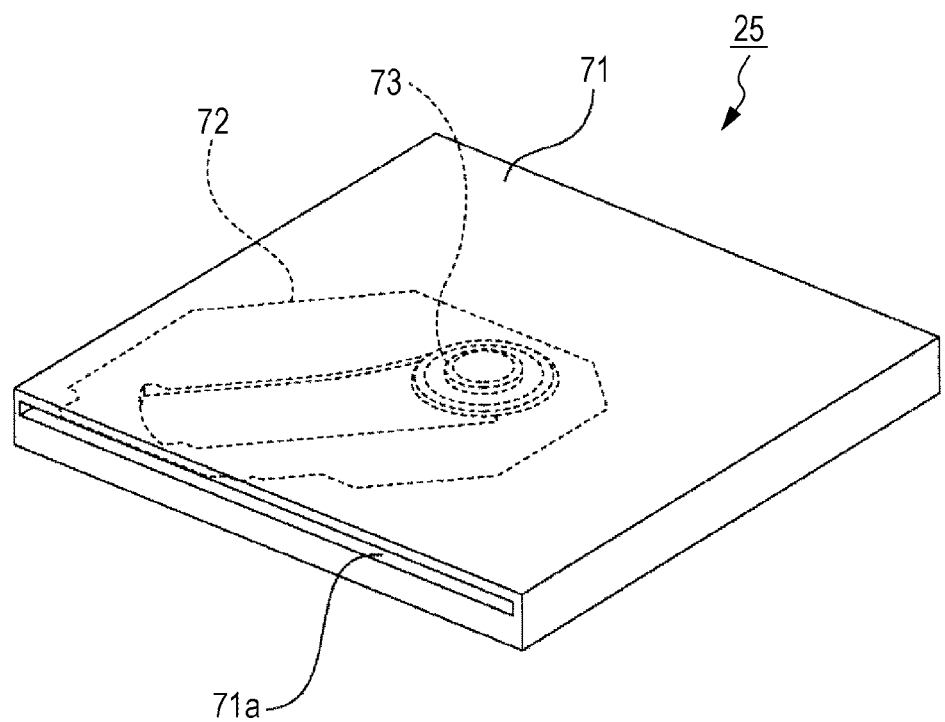
FIG. 16 is a perspective view of a disk drive device.

A specific configuration of the disk drive device 25 will be described (see FIG. 16).

The disk drive device 25 is configured of an outer case 71 formed in planar shape having thin thickness vertically, and each necessary section arranged the inside of the outer case 71. The disk drive device 25 is a so-called slot-in type in which the disk-shaped recording medium 100 is for example, automatically drawn in and loaded to the inside thereof and automatically discharged and ejected from the inside. The loading and the ejecting of the disk-shaped recording medium 100 is performed by an automatic transportation mechanism (not shown) disposed in the inside of the disk drive device 25 without using a disk tray.

A disk insertion hole 71*a* having a long slot laterally, which penetrates forward and backward, is formed at the rear surface of the outer case 71.

A pickup base 72 is arranged in the inside of the outer case 71 in a movable (ascendable) state in the vertical direction, and an optical pickup and a disk table 73 are attached at the pickup base 72.

The disk-shaped recording medium 100, which is transported to the disk drive device 25 by the disk transportation device 24, is inserted from the disk insertion hole 71*a* to the inside of the disk drive device 25, and is loaded by the automatic transportation mechanism disposed at the disk drive device 25.

When loading the disk-shaped recording medium 100, the pickup base 72 is held at the lower position and when finishing the loading operation, the pickup base 72 is ascended and thereby the disk-shaped recording medium 100 is mounted on the disk table 73.

When the disk-shaped recording medium 100 is mounted on the disk table 73 and then the loading is completed, the driving of the optical pickup is started while the disk table 73 is rotated and the recording or the reproduction of the information signal with respect to the disk-shaped recording medium 100 is performed.

When the recording or the reproduction of the information signal finishes, the driving of the optical pickup is finished while the rotation of the disk table 73 is stopped, the pickup base 72 is descended, and the mounting of the disk-shaped recording medium 100 with respect to the disk table 73 is released. When the mounting of the disk-shaped recording medium 100 with respect to the disk table 73 is released, the disk-shaped recording medium 100 is ejected by the automatic transportation mechanism and a portion thereof is projected from the disk insertion hole 71*a* to the disk transportation device 24.

When the disk-shaped recording medium 100 is ejected, a portion of the disk-shaped recording medium 100 is projected from the disk insertion hole 71*a* to the disk transportation device 24 and the disk-shaped recording medium 100 is transported to the disk changer 23 by the disk transportation device 24.

Operation of Disk Storage System

Hereinafter, the operation of the disk storage system 20 will be described (see FIGS. 17 to 43).

First, the cartridge delivery device 22 is moved laterally direction, the disk grip mechanism 27 is moved in the vertical direction inside the cartridge delivery device 22, and the cartridge delivery device 22 is positioned at the right front of the disk cartridge 1 that is to be taken out in the disk cartridges 1, 1, . . . stored in the storage sections 26, 26, . . . of the rack 21.

Next, the engaging claws 27*a* and 27*a* of the disk grip mechanism 27 are moved backwards and inserted from the front side into the insertion spaces 26*a* and 26*a* of the storage section 26 respectively. The movement of the engaging claws 27*a* and 27*a* inserted into the insertion spaces 26*a* and 26*a* respectively is stopped in the lateral of the grip sections 6*a* and 6*a* of the disk cartridge 1.

Figure 17:
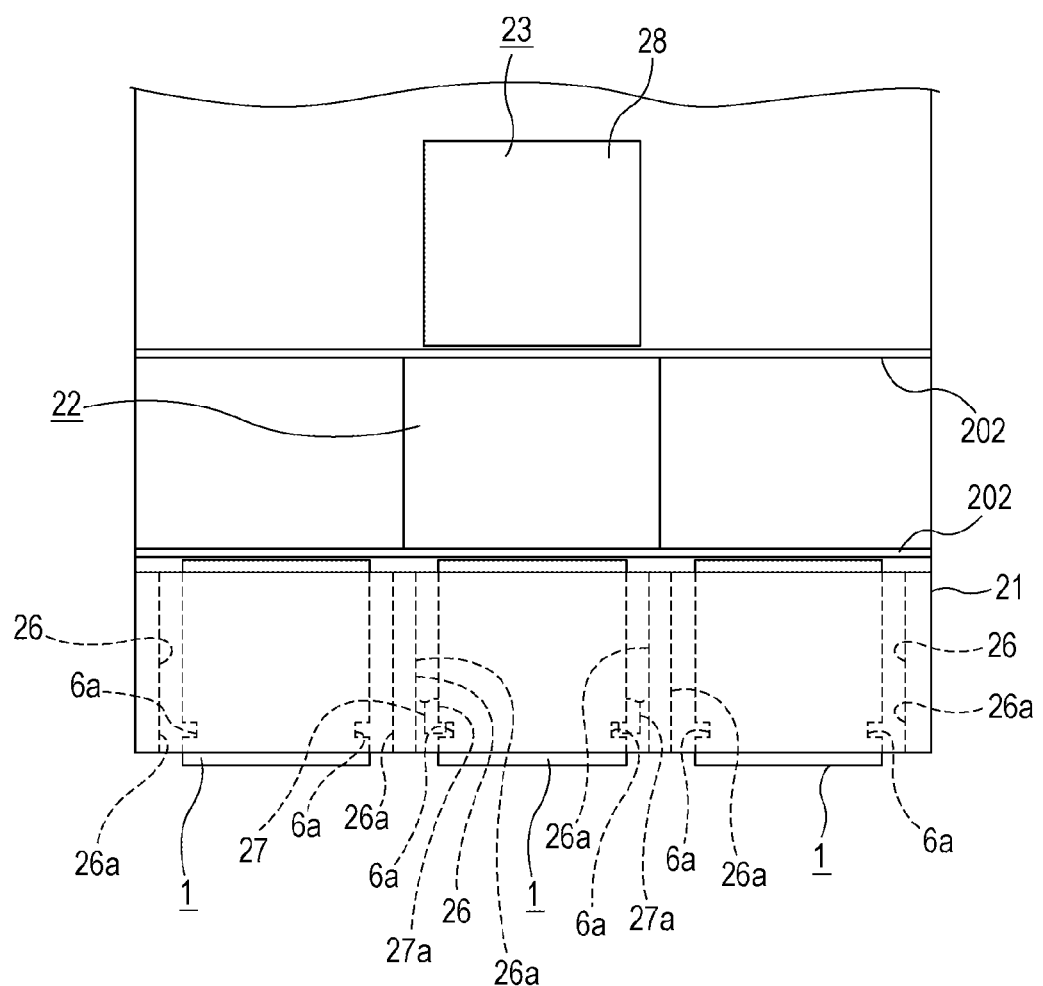
FIG. 17 is a view illustrating the operation of the disk storage system with FIGS. 18 to 43, and is a conceptual view illustrating a state where an engaging claw is engaged with the disk cartridge.
Figure 18:
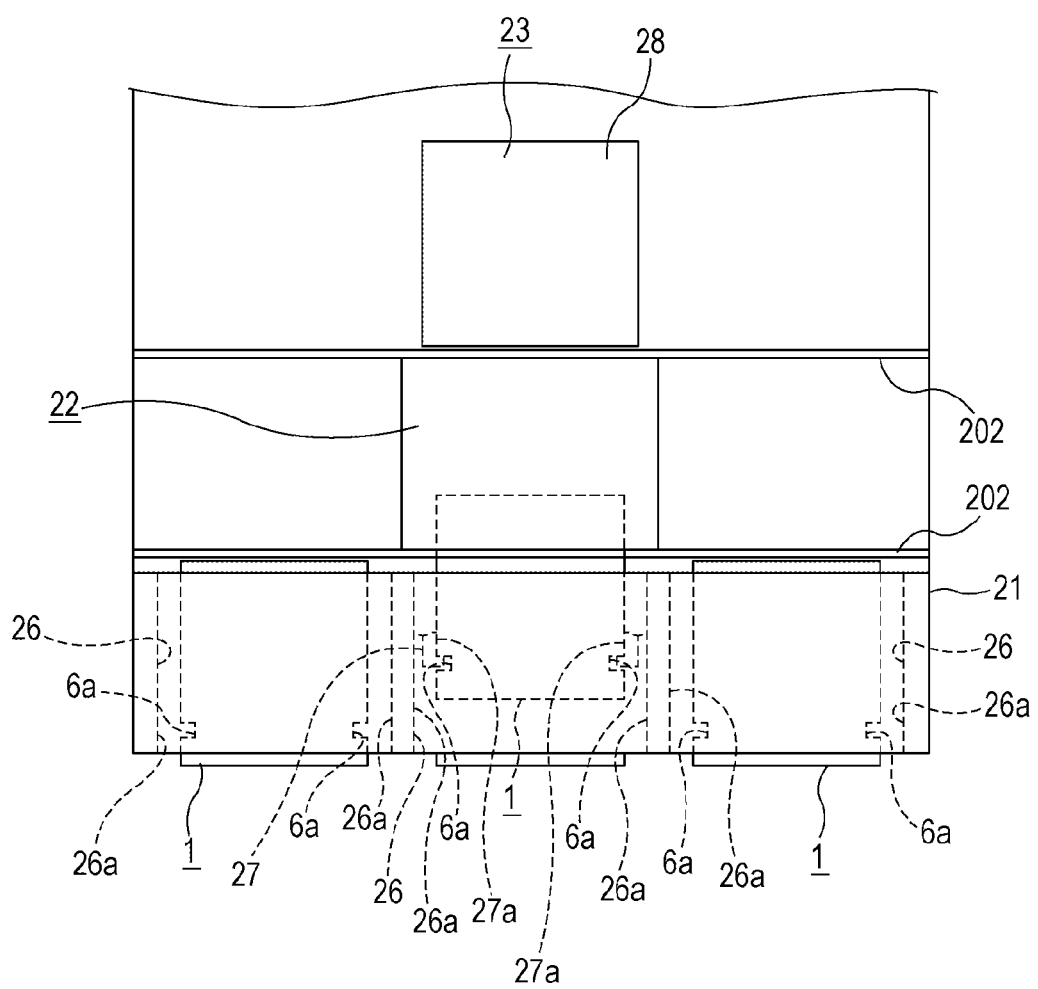
FIG. 18 is a conceptual view illustrating a state where the engaging claw is engaged with the disk cartridge and then drawn out from the storage section.

Subsequently, the engaging claws 27*a* and 27*a* are moved close to each other and are then engaged by insertion into the grip sections 6*a* and 6*a* respectively (see FIG. 17). Accordingly, the disk cartridge 1 is gripped by the disk grip mechanism 27.

Next, the engaging claws 27*a* and 27*a* are moved to the front side (see FIG. 18), the disk cartridge 1 is drawn out from the storage section 26 and then held at the inside of the cartridge delivery device 22.

Figure 19:
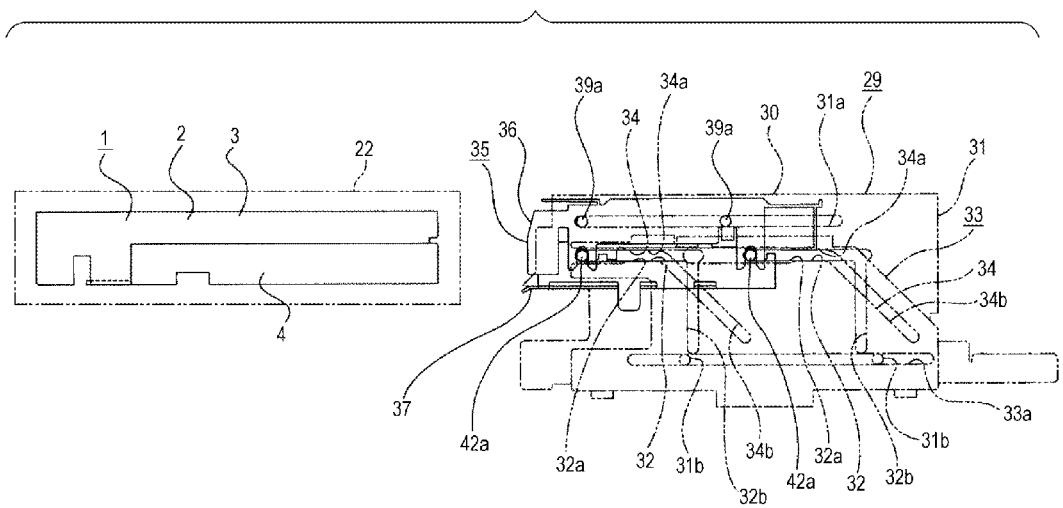
FIG. 19 is a schematic side view illustrating a state before the disk cartridge is inserted into the disk changer.

Subsequently, the cartridge delivery device 22 is moved in the lateral direction and the disk grip mechanism 27 is moved in the vertical direction so that the disk cartridge 1 is positioned immediately behind the disk changer 23 (see FIG. 19). At this time, the disk changer 23 is initial state.

In the initial state, the slider 33 is positioned at the movement end of the front side, and the disk holder 35 is positioned at the movement end of the rear side.

At this time, the upper holder 36 is configured such that the rear side sliding pin 39*a* is engaged to the rear end of the support hole 31a in the holder cover 29. The lower holder 37 is configured such that the sliding pin 42a is engaged to the rear end of the horizontal section 32a of the cam support hole 32 in the holder cover 29 and to the rear end of the linear section 34a of the cam hole 34 in the slider 33.

In the initial state, the discharge lever 45 supported at the upper end of the support member 44 is held in extending state substantially in the lateral direction.

Figure 20:
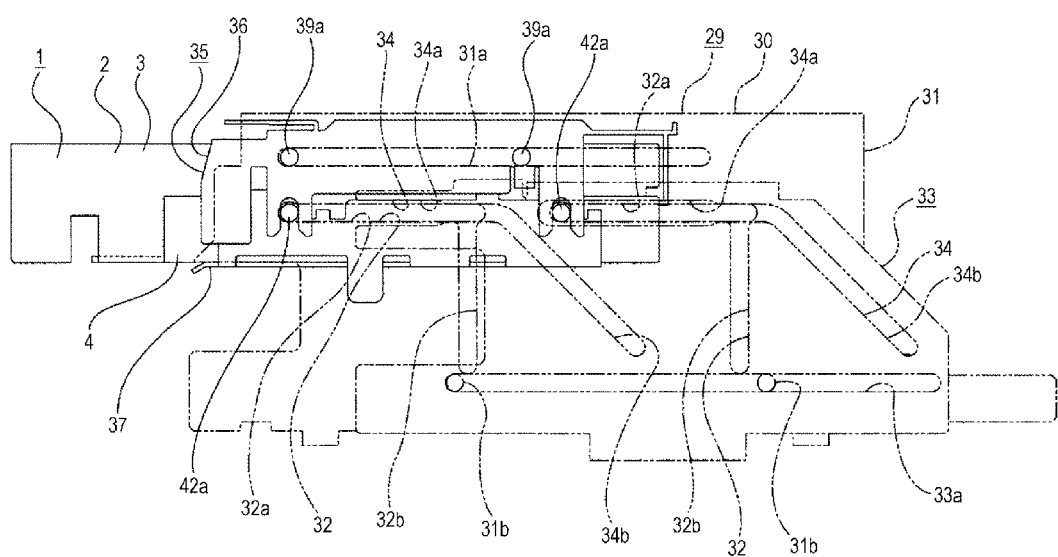
FIG. 20 is a schematic side view illustrating a state where the disk cartridge is inserted into the disk changer.

Next, the engaging claws 27a and 27a of the disk grip mechanism 27 are moved to the front, the disk cartridge 1 is inserted from the cartridge insertion port of the panel 28b of the disk changer 23, and the disk cartridge 1 is inserted into the disk holder 35 (see FIG. 20). When the disk cartridge 1 inserted from the cartridge insertion port of the panel 28b, the shutter 28d is rotated and pressed to the disk cartridge 1.

When the disk cartridge 1 is inserted into the disk holder 35, the engaging claws 27a and 27a are moved in a direction separated from each other and the gripping state with respect to the disk cartridge 1 is released, and continuously, the engaging claws 27a and 27a are moved backwards and thereby returns to the original position in the cartridge delivery device 22.

Figure 21:
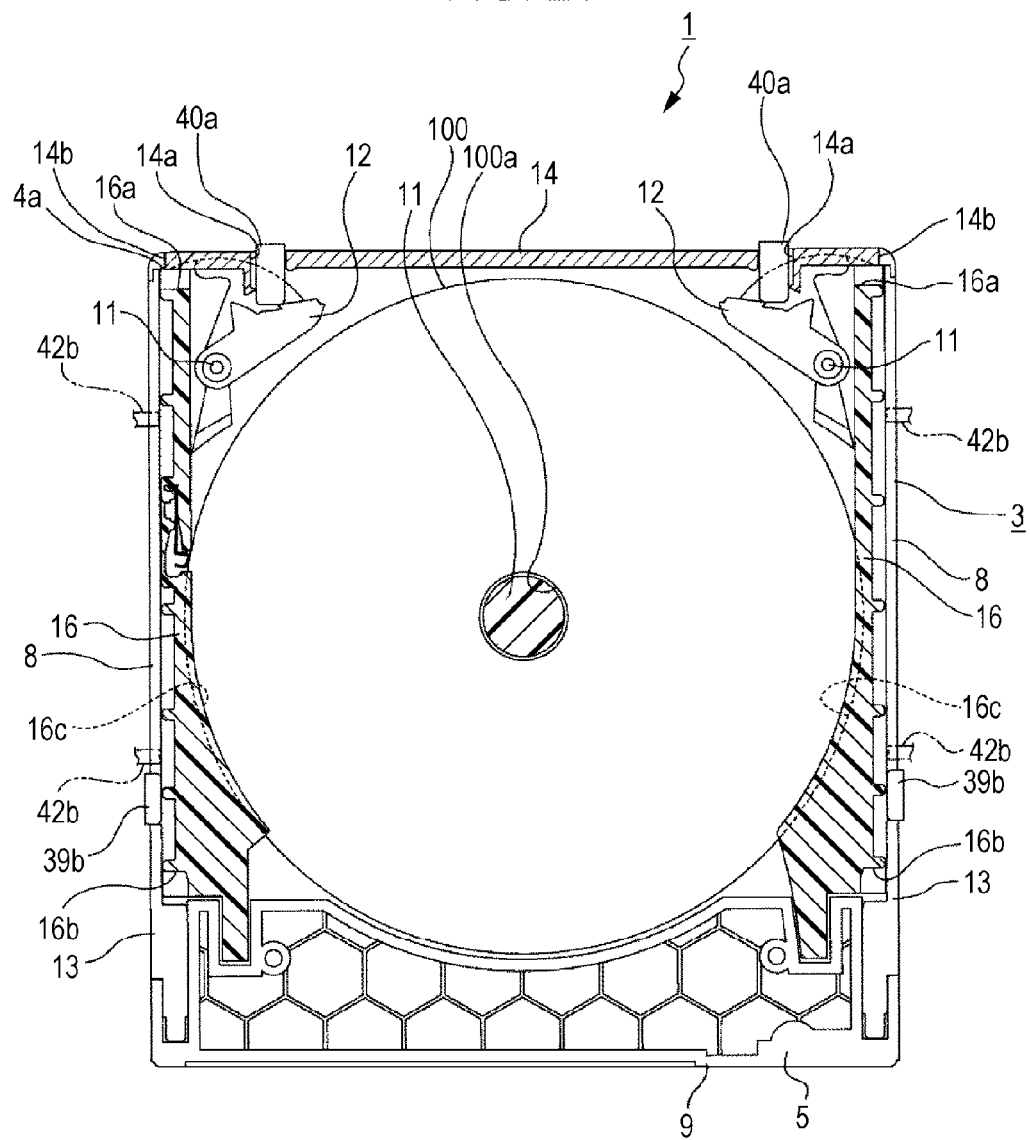
FIG. 21 is a cross-sectional view illustrating a state where the lock of the first shell and the second shell is released.

When the disk cartridge 1 is inserted from the rear side into the disk holder 35, the releasing pieces 39b and 39b of the upper holder 36 and the holding pieces 42b, 42b, . . . of the lower holder 37 are inserted into the insertion grooves 2a and 2a formed at the case 2 respectively (see FIG. 21).

If the releasing pieces 39b and 39b are inserted into the insertion grooves 2a and 2a respectively, the lock sliders 13 and 13 are pressed backwards by the releasing pieces 39b and 39b when the disk cartridge 1 is moved to the back side of the disk holder 35. When the lock sliders 13 and 13 are pressed backwards by the releasing pieces 39b and 39b respectively, the lock sliders 13 and 13 are moved to rear side against the biasing force of the coil spring respectively and the lock sections 13a and 13a are drawn out from the second locking recesses 16b and 16b of the second shell 4 respectively. When the lock sections 13a and 13a are drawn out from the second locking recesses 16b and 16b respectively, the lock between the first shell 3 and the second shell 4 is released by the lock sliders 13 and 13.

In addition, at this time, the lock releasing pieces 40a and 40a disposed at the disk holder 35 are inserted into the insertion holes 14a and 14a of the openable and closable panel 14 respectively. When the lock releasing pieces 40a and 40a are inserted into the insertion holes 14a and 14a respectively, the lock levers 12 and 12 are pressed backwards by the lock releasing pieces 40a and 40a respectively. When the lock levers 12 and 12 are pressed backwards by the lock releasing pieces 40a and 40a respectively, the lock levers 12 and 12 are rotated against the biasing force of the biasing spring respectively, and the locking protrusion sections 12a and 12a are drawn out from the first locking recesses 16a and 16a of the second shell 4 respectively. When the locking protrusion sections 12a and 12a are drawn out from the first locking recesses 16a and 16a respectively, the lock between the first shell 3 and the second shell 4 is released by the lock levers 12 and 12.

The release of the lock between the first shell 3 and the second shell 4 by the lock levers 12 and 12 is performed at the same time the release of the lock between the first shell 3 and the second shell 4 by the lock sliders 13 and 13.

When the lock between the first shell 3 and the second shell 4 is released by the lock levers 12 and 12 and the lock sliders 13 and 13, the first shell 3 and the second shell 4 are a separated state in the vertical direction.

When the first shell 3 and the second shell 4 are the separated state in the vertical direction, a switch (not shown) is operated by the disk cartridge 1 and the disk holder 35 and the disk cartridge 1 are integrally formed by the cartridge moving mechanism and then are moved to the front side.

Figure 22:
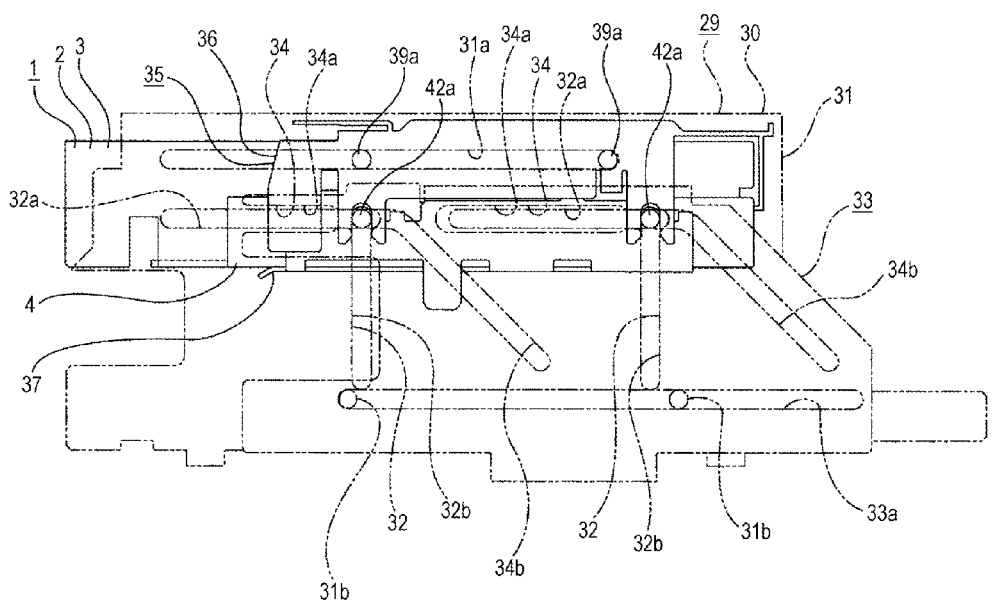
FIG. 22 is a schematic side view illustrating a state where the disk holder is moved to a separable position.
Figure 23:
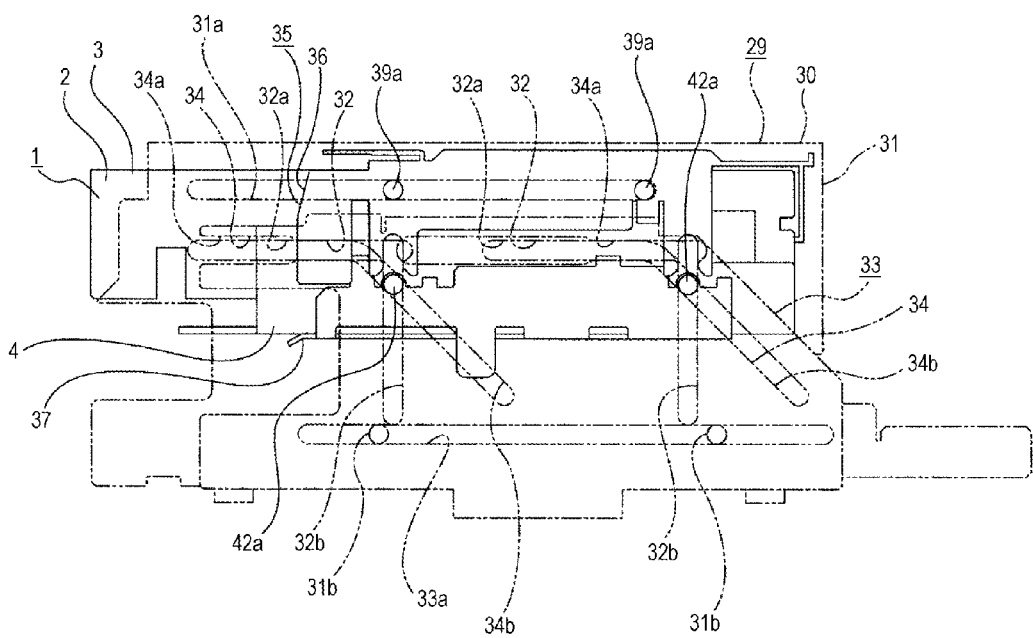
FIG. 23 is a schematic side view illustrating a state during a lower holder of the disk holder is moved in the vertical direction.

The disk holder 35 is configured such that the sliding pin 39a of front side of the upper holder 36 is moved to the front end of the support hole 31a in the holder cover 29 and the lower holder 37 is configured such that the sliding pin 42a is moved to the front end of the horizontal section 32a of the cam support hole 32 in the holder cover 29 and to the front end of the linear section 34a of the cam hole 34 in the slider 33 (see FIG. 22). The position, where the sliding pin 39a of the front side of the upper holder 36 is engaged with the front end of the support hole 31a, and the sliding pin 42a of the lower holder 37 is engaged with the front end of the linear section 34a of the cam hole 34, is a separation start position, where the separation between the upper holder 36 and the lower holder 37 of the disk holder 35 is started.

When the disk holder 35 is moved to the separation start position, the entirety of the disk cartridge 1 is stored inside of the outer case 28, the cartridge insertion port of the panel 28b is closed again by the shutter 28d.

When the disk holder 35 is moved to the separation start position, the disk holder 35 is positioned at the movement end of the upper side.

When the disk holder 35 is moved to the separation start position, the information input in the information input sheet 18 attached in the disk cartridge 1 is read by a reader (not shown). Accordingly, the information regarding the pitch between the disk-shaped recording media 100, 100, . . . stored inside of the case 2 and the number of disk-shaped recording media 100, 100, . . . stored is read by the reader.

When the disk holder 35 is moved to the separation start position, the rotation of the second actuation motor 51 is started and the driving force of the second actuation motor 51 is transmitted to the sliders 33 and 33 via rack gear so that the sliders 33 and 33 are moved backwards with respect to the holder cover 29. The supported hole 33a is guided to the support projection pins 31b and 31b of the holder cover 29 and thereby the slider 33 is moved backwards.

When the slider 33 is moved backwards, the sliding pin 42a of the lower holder 37 in the disk holder 35 moves the slope section 34b of the cam hole 34 downwards and moves the vertical section 32b of the cam support hole 32 in the holder cover 29 downwards, and thereby the lower holder 37 is moved downwards. At this time, in the disk cartridge 1, the first shell 3 is held by the lock releasing pieces 40a and 40a of the upper holder 36 and the releasing pieces 39b and 39b and the second shell 4 is held by the holding pieces 42b and 42b, . . . of the lower holder 37, and the first shell 3 is not moved downwards and the second shell 4 is integrally formed with the lower holder 37 and moved downwards (see FIG. 23). Accordingly, the first shell 3 and the second shell 4 are separated.

Figure 24:
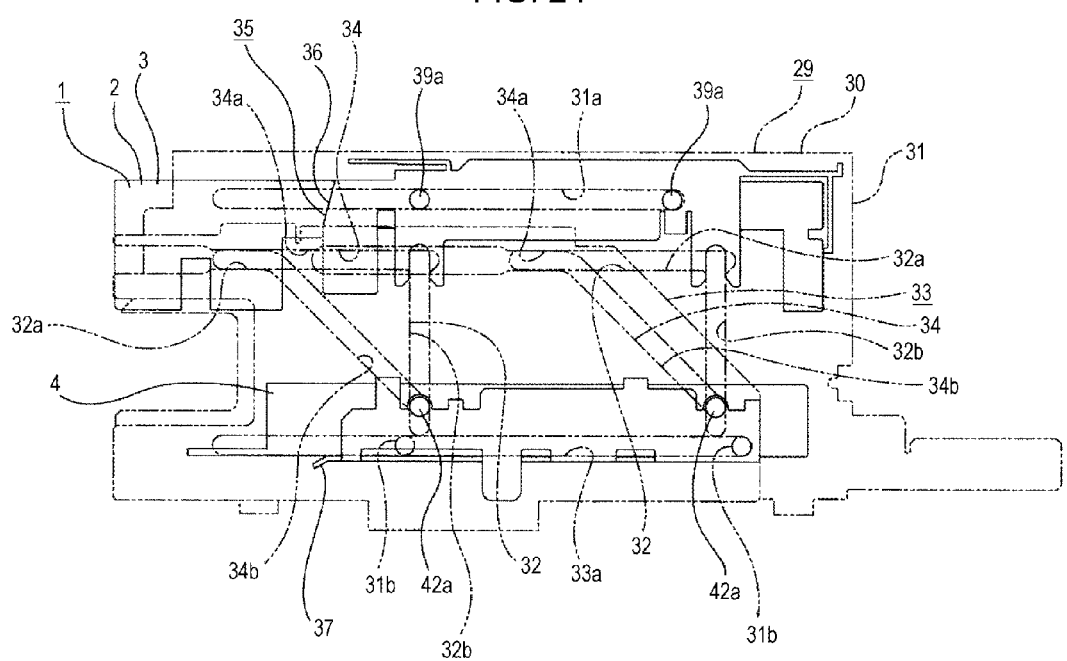
FIG. 24 is a schematic side view illustrating a state where the lower holder of the disk holder is moved to a movement end of the lower side.

Subsequently, the slider 33 is moved backwards by the driving force of the second actuation motor 51, and the lower holder 37 is moved for example, to the movement end of the lower side (see FIG. 24). In a state where the lower holder 37 is moved to the movement end downwards, the sliding pin 42a of the lower holder 37 is engaged with the lower end of the slope section 34b of the cam hole 34 and the lower end of the vertical section 32b of the cam support hole 32.

Figure 25:
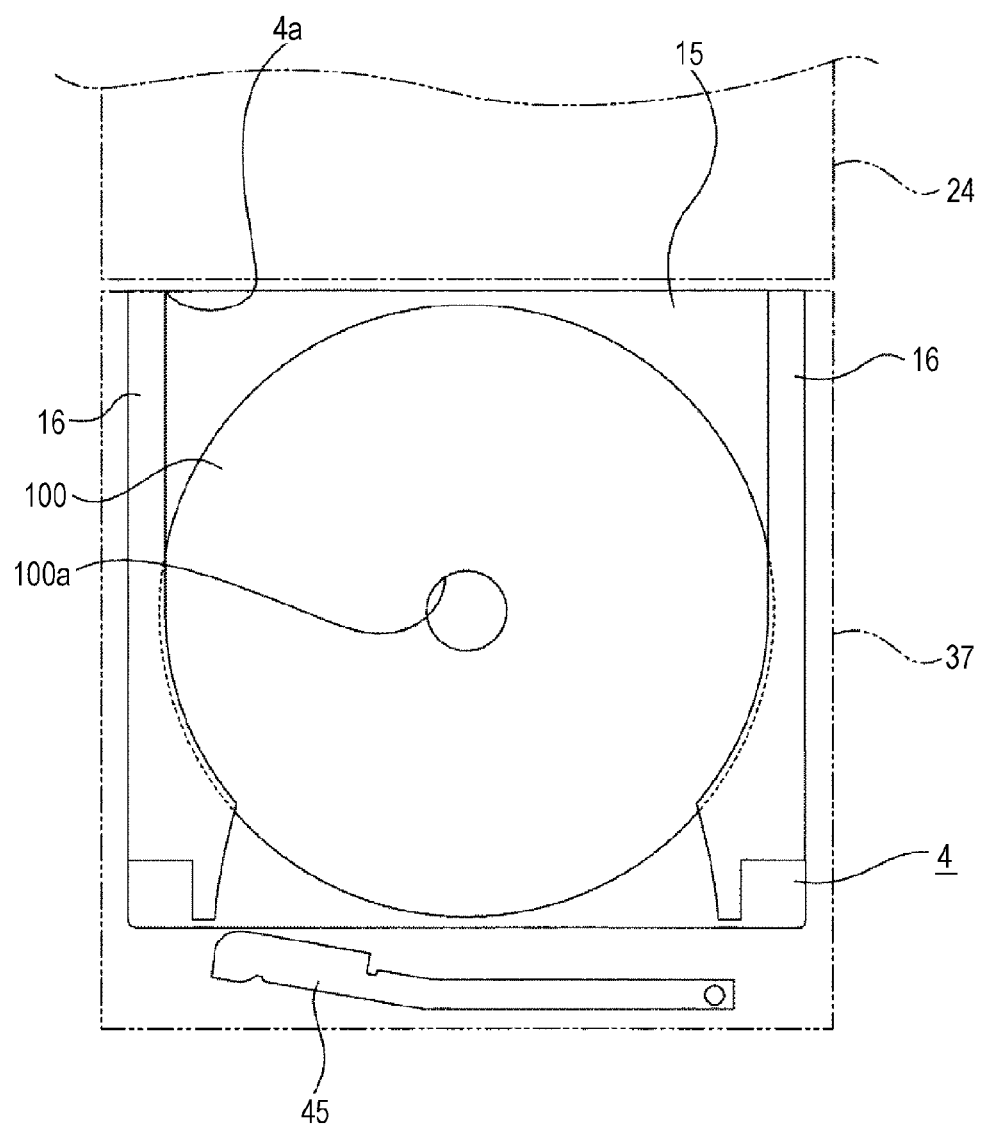
FIG. 25 is a schematic plan view illustrating a state before the disk-shaped recording medium is discharged from the second shell by a discharge lever.

The discharge lever 45 is positioned to the rear of the second shell 4 held at the lower holder 37 during the movement of the lower holder 37 (see FIG. 25).

When the lower holder 37 is moved and stopped by the movement of the slider 33, the rotation of the first actuation motor 47 is started and the discharge lever 45 is rotated.

Figure 26:
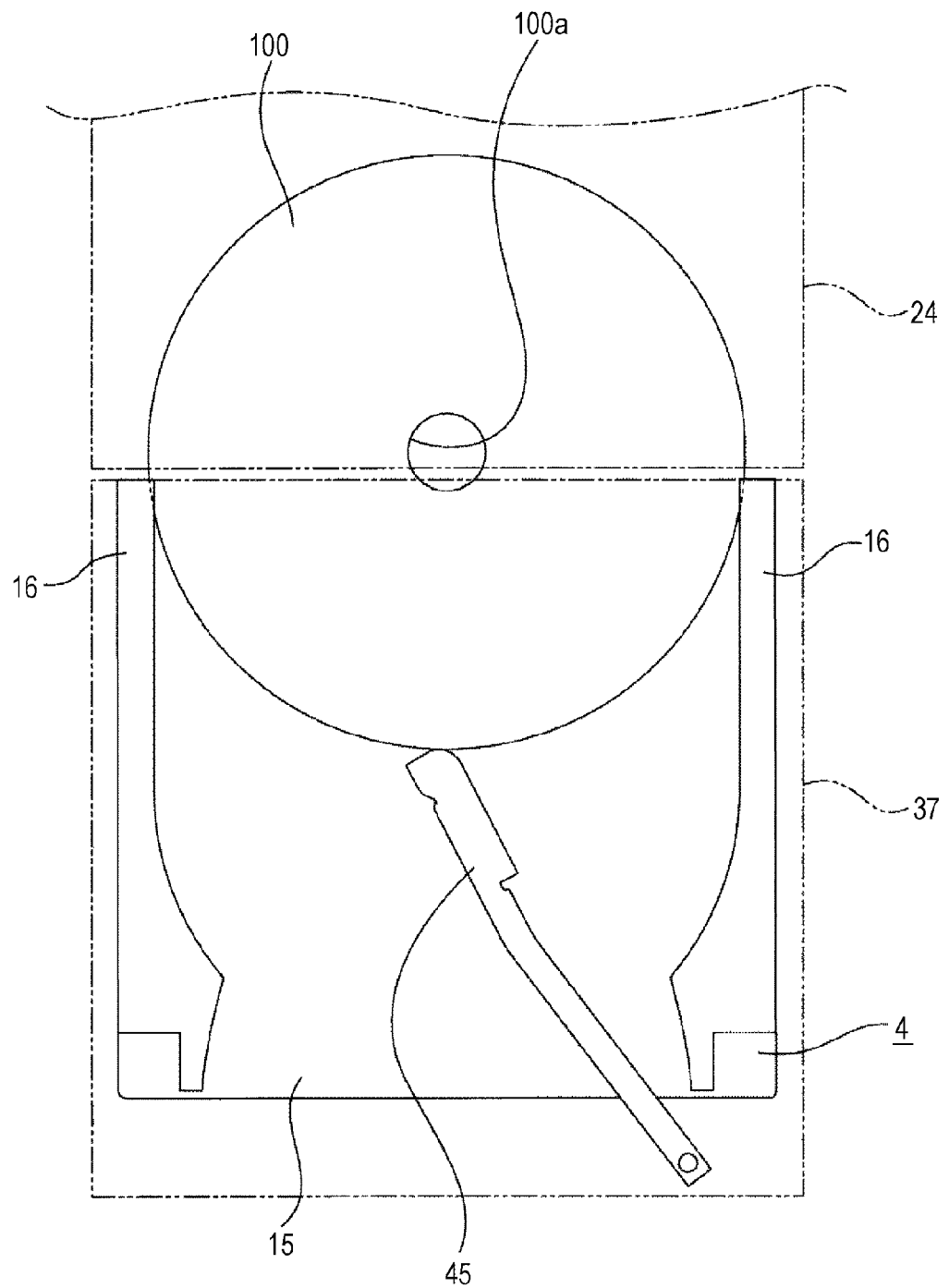
FIG. 26 is a schematic plan view illustrating a state where the disk-shaped recording medium is discharged from the second shell by the discharge lever.

As described above, when the discharge lever 45 is rotated, the outer peripheral surface of the disk-shaped recording medium 100 that is existed in a height according to the stop position of the lower holder 37 is pressed to the front side by the discharge lever 45, and the pressed disk-shaped recording medium 100 is discharged from the second shell 4 to the disk transportation device 24 (see FIG. 26).

When a portion of the disk-shaped recording medium 100 is discharged to the disk transportation device 24 by the discharge lever 45 and the disk-shaped recording medium 100 is discharged from the second shell 4 by the discharge lever 45, the first actuation motor 47 is inverted and then the discharge lever 45 is rotated to the original position.

Figure 27:
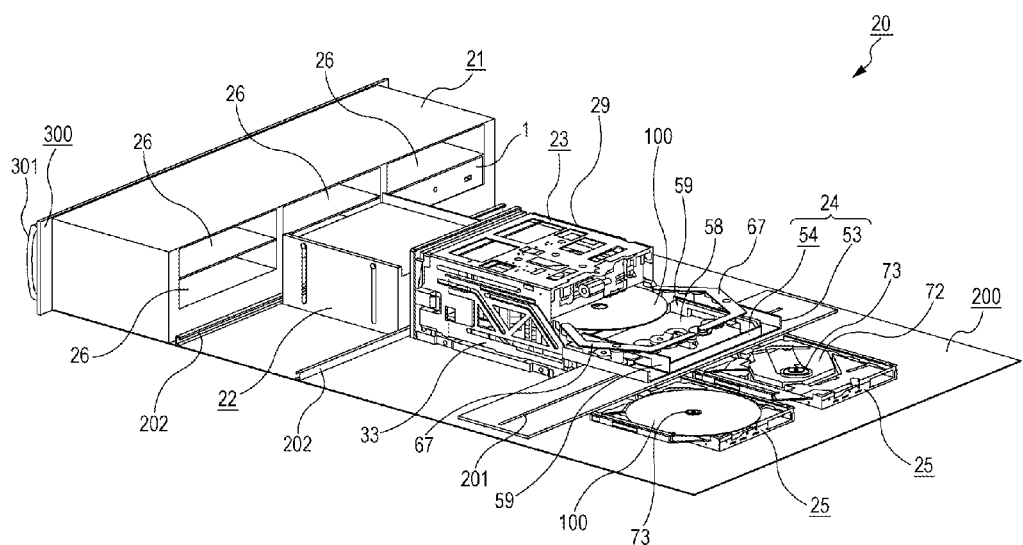
FIG. 27 is a view illustrating the operation of the disk transportation device with FIGS. 28 to 43, and is a perspective view illustrating immediately after the transportation operation is started by the disk transportation device.
Figure 28:
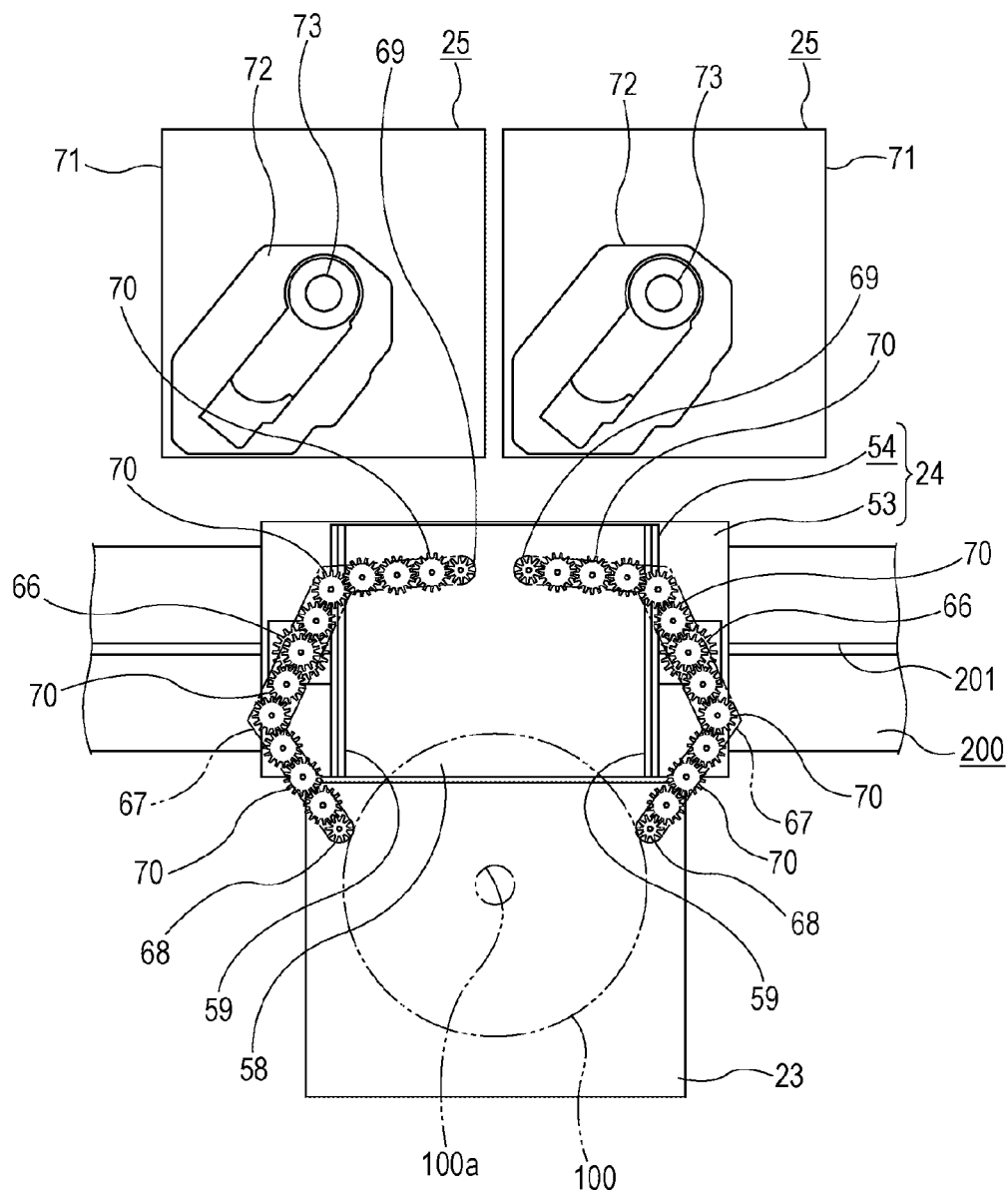
FIG. 28 is a schematic plan view illustrating immediately after the transportation operation is started by the disk transportation device.

When the disk-shaped recording medium 100 is discharged from the disk cartridge 1 to the disk transportation device 24, the rotation arms 67 and 67 of the disk transportation device 24 are rotated from the initial position where the distance between the first transportation rollers 68 and 68 and the distance between the second transportation rollers 69 and 69 are the same distance to a position where the first transportation rollers 68 and 68 are separated more than the second transportation rollers 69 and 69 (see FIGS. 27 and 28).

The outer peripheral surface of the disk-shaped recording medium 100 projected to the disk transportation device 24 contacts the disk action sections 68b and 68b of the first transportation rollers 68 and 68. At this time, a portion of the first transportation rollers 68 and 68 and the rotation arms 67 and 67 are positioned inside of the side plates 31 and 31 via the notch of the outer case 28 of the disk changer 23 and the notches 31c and 31c of the holder cover 29, and the portion of the front side from the middle portion of the outer peripheral surface of the disk-shaped recording medium 100 in the longitudinal direction is made to contact the disk action sections 68b and 68b.

When the outer peripheral surface of the disk-shaped recording medium 100 is made to contact the disk action sections 68b and 68b of the first transportation rollers 68 and 68, the driving motor 63 is rotated in one direction and then the first transportation rollers 68 and 68 and the second transportation rollers 69 and 69 are rotated in one direction respectively, so that the rotational force in one direction is applied to the rotation arms 67 and 67 respectively, in other words, the rotational force to the direction in which the first transportation rollers 68 and 68 are pressed to the outer peripheral surface of the disk-shaped recording medium 100 is applied.

When the rotational force is applied to the rotation arms 67 and 67 while the first transportation rollers 68 and 68 are rotated, the first transportation rollers 68 and 68 are rolled on the outer peripheral surface of the disk-shaped recording medium 100 and the disk-shaped recording medium 100 is transported to the front side by the rotation of the first transportation rollers 68 and 68.

As described above, in the disk transportation device 24, the disk-shaped recording medium 100 is transported from the state that the front portion from the middle portion of the outer peripheral surface of the disk-shaped recording medium 100 in the longitudinal direction is made to contact the disk action sections 68b and 68b.

Accordingly, even though the projection amount of the disk-shaped recording medium 100 from the disk changer 23 to the disk transportation device 24 is small, the disk-shaped recording medium 100 can be transported and the reliability in the transportation operation of the disk-shaped recording medium 100 by the disk transportation device 24 can be improved.

At this time, although the rotational force to the direction in which the first transportation rollers 68 and 68 are pressed to the outer peripheral surface of the disk-shaped recording medium 100, is applied to the rotation arms 67 and 67, the rotation arms 67 and 67 are rotated opposite to the direction in which the rotational force is applied, in other words, to the direction in which the first transportation rollers 68 and 68 are separated from each other, according to the movement to the front side of the disk-shaped recording medium 100.

The rotation opposite to the direction in which the rotational force of the rotation arms 67 and 67 is applied may be configured such that the rotation arms 67 and 67 are rotated by the friction force between the fulcrum shafts 66 and 66.

Accordingly, the rotation arms 67 and 67 are configured to rotate by the friction force between the fulcrum shafts 66 and 66 so that the load that is applied from the first transportation rollers 68 and 68 with respect to the disk-shaped recording medium 100 is small, the load with respect to the disk-shaped recording medium 100 is decreased and then the disk-shaped recording medium 100 can be smoothly transported.

In addition, in the configuration that the intermediate gears 70, 70, . . . are meshed with the driven gears 68a, 68a, 69a and 69a and the driving gears 66c and 66c, the disk transportation device 24 is configured such that the rotation arms 67 and 67 are rotated by the friction force between the fulcrum shafts 66 and 66.

Accordingly, the rotation arms 67 and 67, the first transportation rollers 68 and 68 and the second transportation rollers 69 and 69 can be rotated by one driving motor 63, so that the decrease of the number of parts of the disk transportation device 24, and the simplification of the configuration thereof can be achieved.

Furthermore, the disk transportation device 24 is configured of the driving motor 63 and a pair of the transfer mechanisms 65 and 65 so as to apply the rotational force to the pair of the rotation arms 67 and 67 respectively.

Accordingly, the rotational force is applied to the rotation arms 67 and 67 by one driving motor 63 respectively, so that the decrease of the number of parts and the simplification of the configuration thereof can be achieved.

Figure 29:
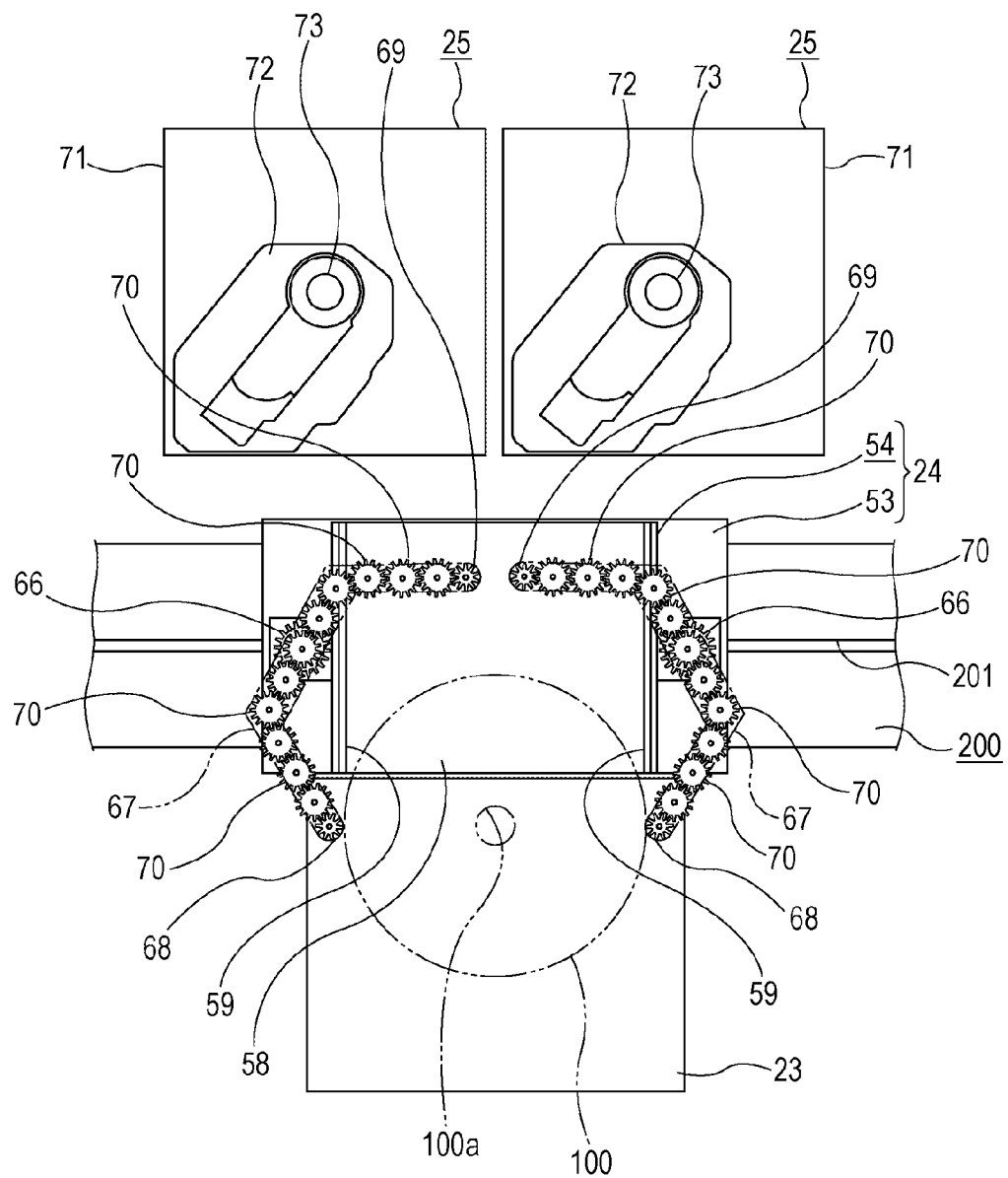
FIG. 29 is a schematic plan view illustrating a state where the disk-shaped recording medium is transported continuing from FIG. 28.

When the disk-shaped recording medium 100 is transported to the front side and the center of the first transportation rollers 68 and 68 is positioned on the straight line with the center of the disk-shaped recording medium 100, the rotation of the rotation arms 67 and 67 opposite to the direction in which the rotational force is applied is stopped (see FIG. 29).

Figure 30:
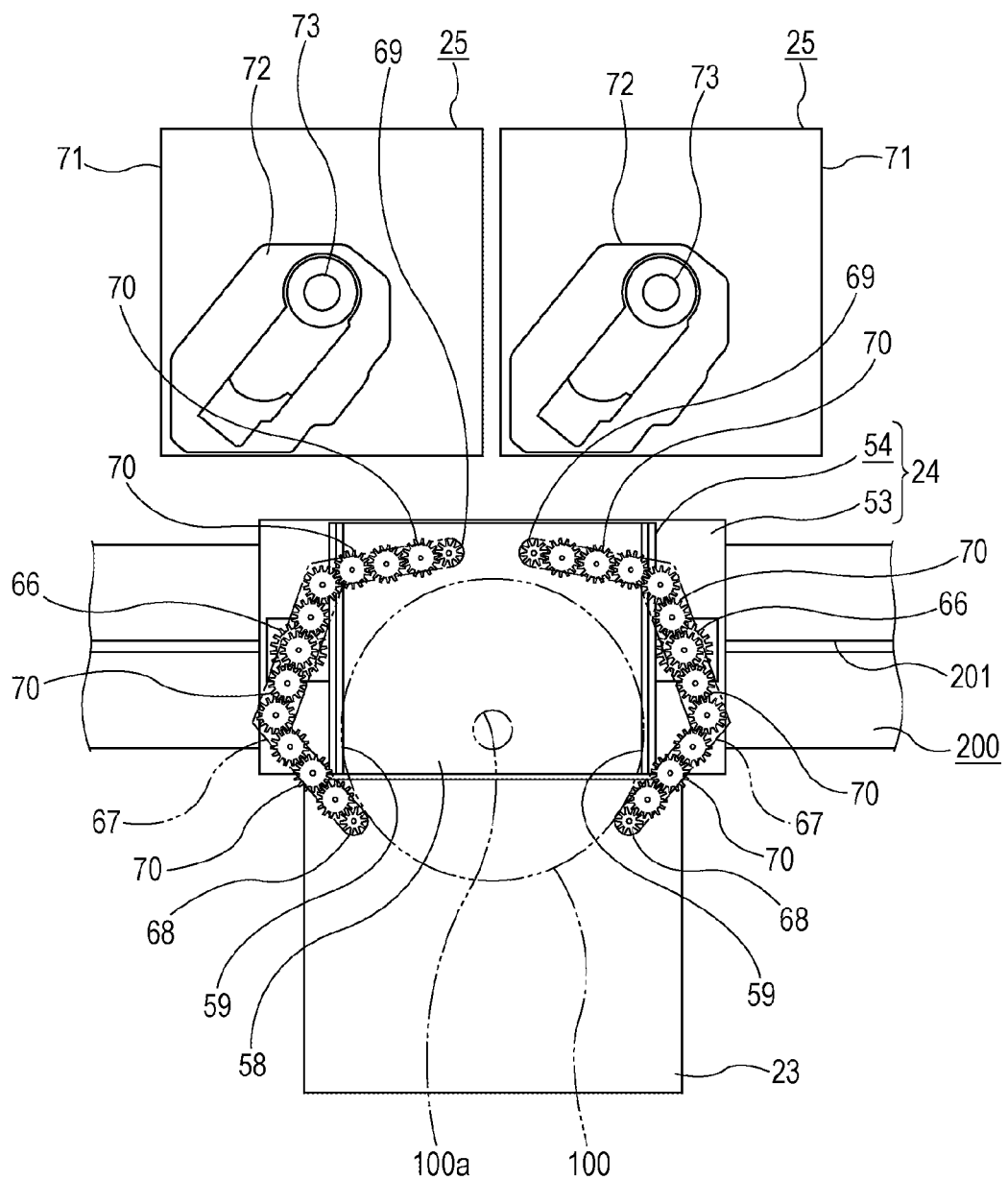
FIG. 30 is a schematic plan view illustrating a state where the disk-shaped recording medium is transported continuing from FIG. 29.

The first transportation rollers 68 and 68 and the second transportation rollers 69 and 69 are continuously rotated, the first transportation rollers 68 and 68 are rolled on the outer peripheral surface of the disk-shaped recording medium 100 and the disk-shaped recording medium 100 is further transported to the front side by the rotation of the first transportation rollers 68 and 68 (see FIG. 30). At this time, the outer peripheral portion of the disk-shaped recording medium 100 is slid on the sliding surfaces 62 and 62 of the guide members 59 and 59 which is installed at the base plate 58 and is guided and moved to the front side by the guide surfaces 60a and 60a. Immediately after the outer peripheral portion of the disk-shaped recording medium 100 is made to contact the sliding surfaces 62 and 62, the outer peripheral portion of the disk-shaped recording medium 100 is guided to the planes 62a and 62a by the slope surface 62b and 62b positioned at the rear side and then the disk-shaped recording medium 100 is transported to the front side in the horizontal state.

Since the rotational force in the direction, in which the first transportation rollers 68 and 68 are pressed to the outer peripheral surface of the disk-shaped recording medium 100, is applied to the rotation arms 67 and 67, the rotation arms 67 and 67 are rotated in the direction in which the rotational force is applied.

Subsequently, when the first transportation rollers 68 and 68 and the second transportation rollers 69 and 69 are rotated and then the first transportation rollers 68 and 68 are rolled on the outer peripheral surface of the disk-shaped recording medium 100, the disk-shaped recording medium 100 is further transported to the front side by the rotation of the first transportation rollers 68 and 68. At this time, the rotation arms 67 and 67 are further rotated in the direction in which the rotational force is applied.

When the first transportation rollers 68 and 68 and the second transportation rollers 69 and 69 are made to contact the outer peripheral surface of the disk-shaped recording medium 100 by the rotation of the rotation arms 67 and 67, the disk-shaped recording medium 100 is held by the first transportation rollers 68 and 68 and the second transportation rollers 69 and 69 (see FIG. 31), and the rotation of the driving motor 63 is stopped once.

Figure 32:
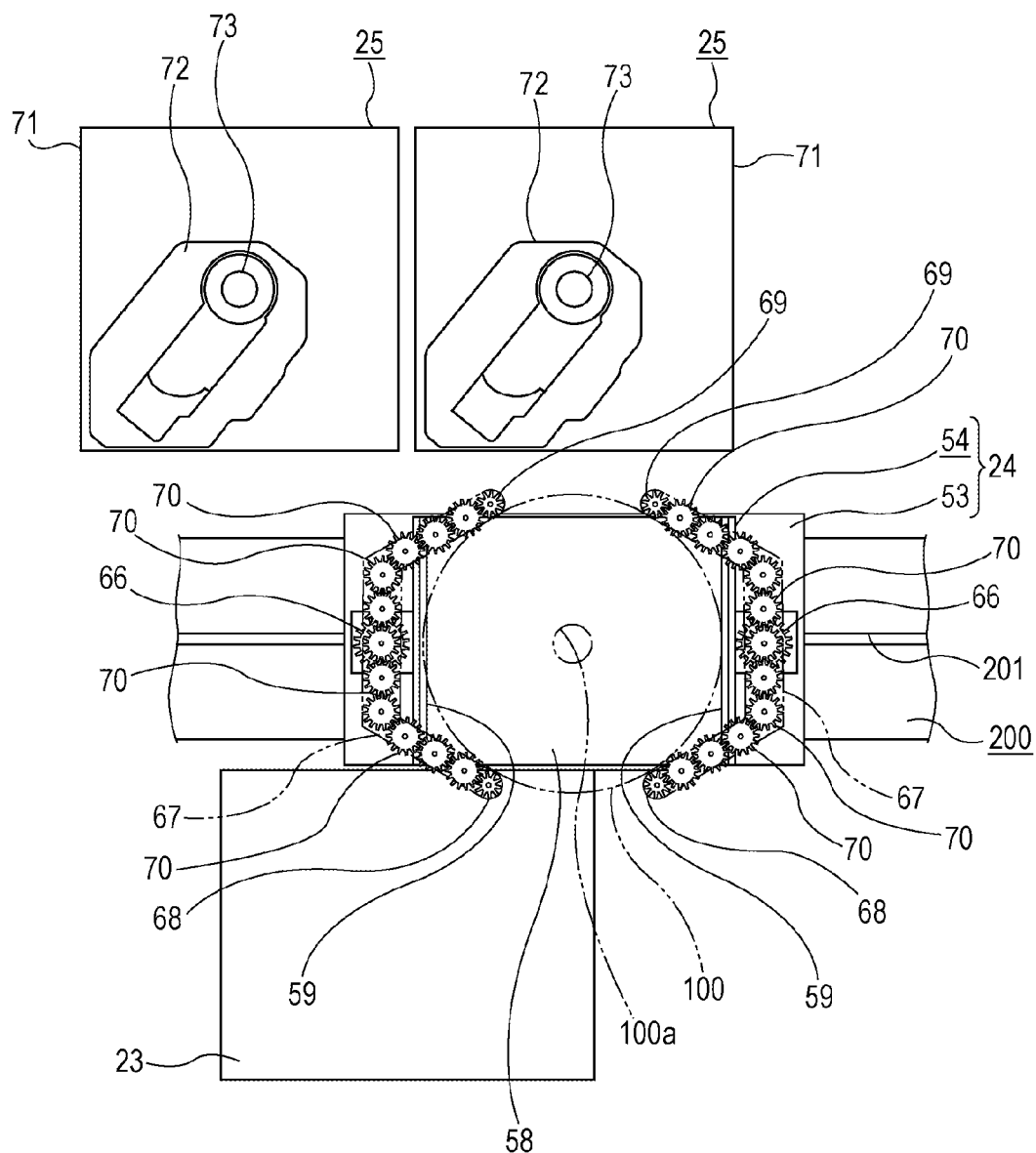
FIG. 32 is a schematic plan view illustrating a state where the disk transportation device is moved continuing from FIG. 31.

Subsequently, the disk transportation device 24 is guided by the guide section 201 and moved laterally direction, and is stopped immediately behind one side of the disk drive device 25 (see FIG. 32).

When the disk transportation device 24 is stopped immediately behind the disk drive device 25, the driving motor 63 is rotated again in one direction.

When the driving motor 63 is rotated in one direction, the first transportation rollers 68 and 68 and the second transportation rollers 69 and 69 are rotated in one direction respectively and the rotational force in one direction is applied to the rotation arms 67 and 67 respectively.

Figure 33:
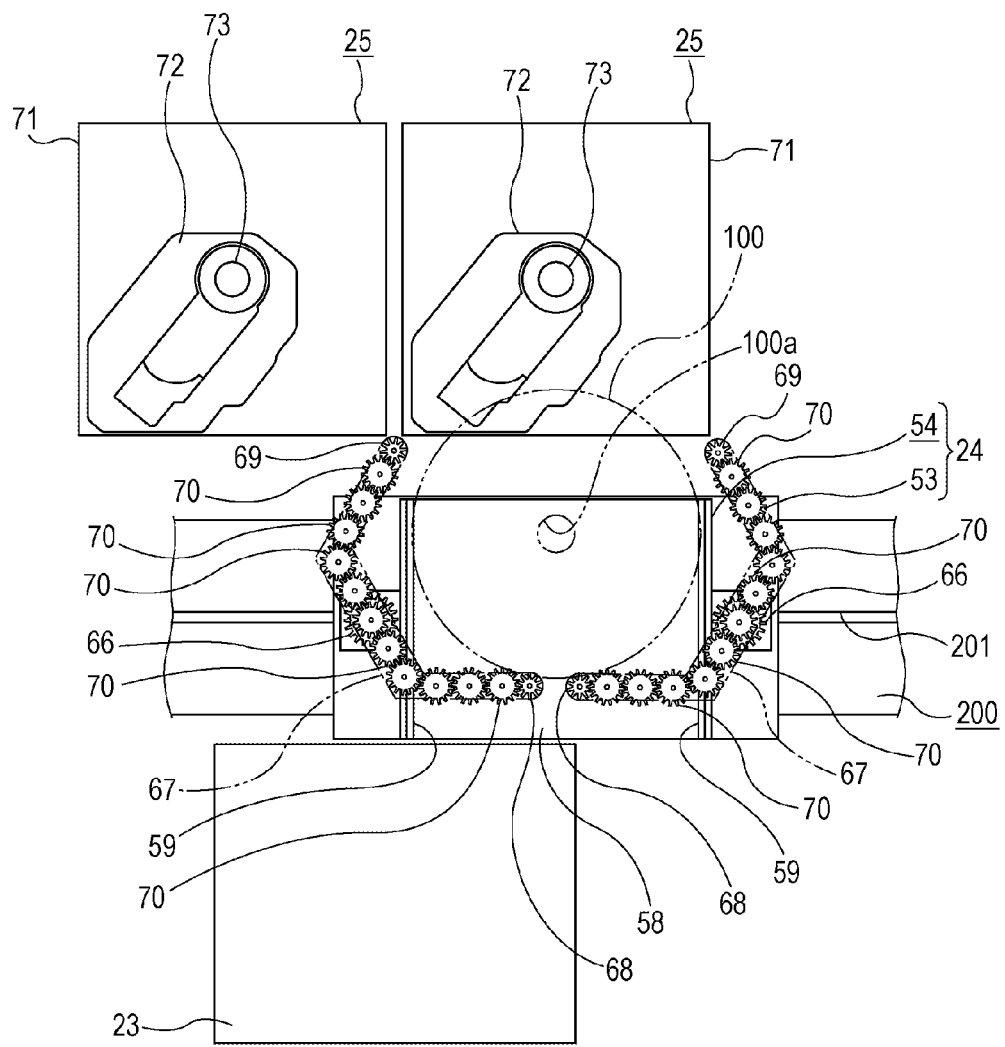
FIG. 33 is a schematic plan view illustrating a state where the disk-shaped recording medium is inserted into the disk drive device continuing from FIG. 32.
Figure 34:
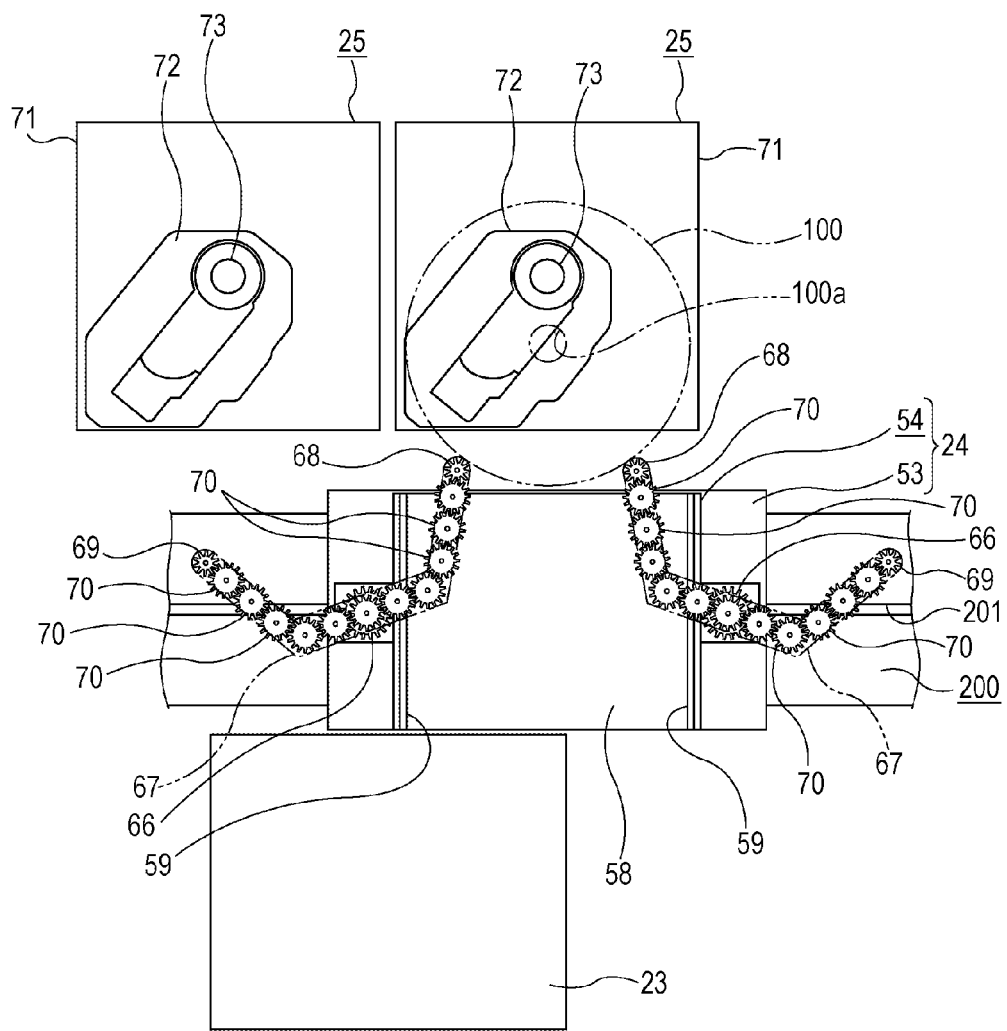
FIG. 34 is a schematic plan view illustrating a state where the disk-shaped recording medium is inserted into the disk drive device continuing from FIG. 33.

When the rotational force is applied to the rotation arms 67 and 67 while the first transportation rollers 68 and 68 are rotated, the second transportation rollers 69 and 69 are separated from the outer peripheral surface of the disk-shaped recording medium 100 while the first transportation rollers 68 and 68 are rolled on the outer peripheral surface of the disk-shaped recording medium 100, and then the disk-shaped recording medium 100 is transported to the front side by the rotation of the first transportation rollers 68 and 68 (see FIG. 33). At this time, the rotation arms 67 and 67 are rotated in the direction in which the rotational force is applied. The disk-shaped recording medium 100 transported to the front side is inserted from the disk insertion hole 71a into the inside of the disk drive device 25.

Subsequently, when the rotation arms 67 and 67 are rotated, the outer peripheral surface of the disk-shaped recording medium 100 is pressed by the first transportation rollers 68 and 68 and then transported further to front side. At this time, the first transportation rollers 68 and 68 are moved to the direction in which they are separated from each other so as to rotate in a contact state with the outer peripheral surface of the disk-shaped recording medium 100 without rolling on the outer peripheral surface of the disk-shaped recording medium 100. When the first transportation rollers 68 and 68 are positioned by contacting the rear surface of the disk drive device 25, the rotation of the driving motor 63 is stopped, and the rotation of the rotation arms 67 and 67 and the rotation of the first transportation rollers 68 and 68 and the second transportation rollers 69 and 69 are stopped according to the stop of the rotation of the driving motor 63, and thereby the transportation of the disk-shaped recording medium 100 to the front side by the disk transportation device 24 is finished (see FIG. 34).

When the transportation of the disk-shaped recording medium 100 to the front side is finished, the driving motor 63 is rotated to the opposite side and the rotation arms 67 and 67 are rotated to the initial position where the distance between the first transportation rollers 68 and 68 and the distance between the second transportation rollers 69 and 69 are the same distance.

Figure 35:
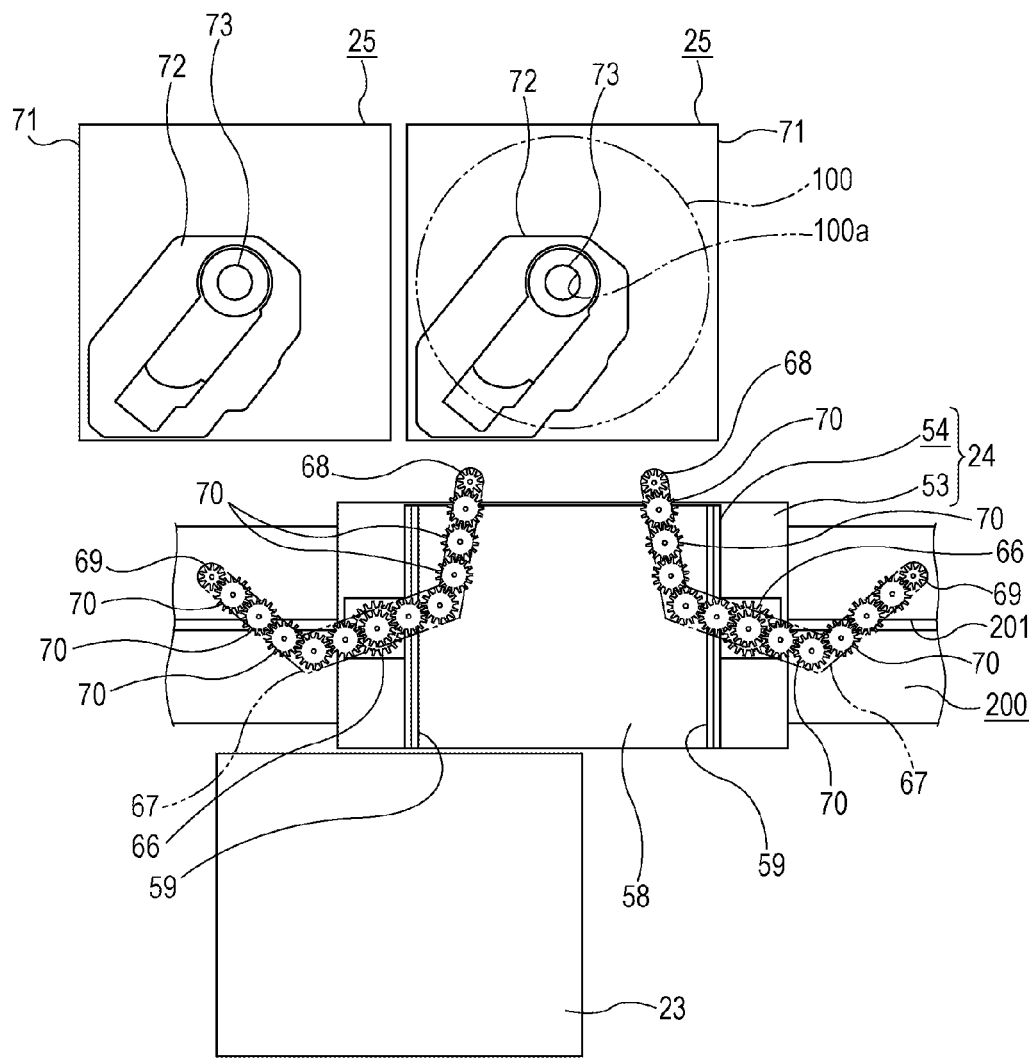
FIG. 35 is a schematic plan view illustrating a state where the disk-shaped recording medium is loaded on the disk drive device continuing from FIG. 34 by an automatic transportation mechanism.

When the transportation of the disk-shaped recording medium 100 to the front side by the disk transportation device 24 is finished, continuously, the disk-shaped recording medium 100 is drawn in and loaded by the automatic transportation mechanism disposed at the disk drive device 25 and the disk-shaped recording medium 100 is mounted on the disk table 73 (see FIG. 35).

When the disk-shaped recording medium 100 is loaded and mounted on the disk table 73, the recording or the reproduction of the information signal with respect to the disk-shaped recording medium 100 is performed.

When the recording or the reproduction of the information signal is finished, the disk-shaped recording medium 100 is ejected by the automatic transportation mechanism and a portion of the disk-shaped recording medium 100 is projected from the disk insertion hole 71a backwards.

Figure 36:
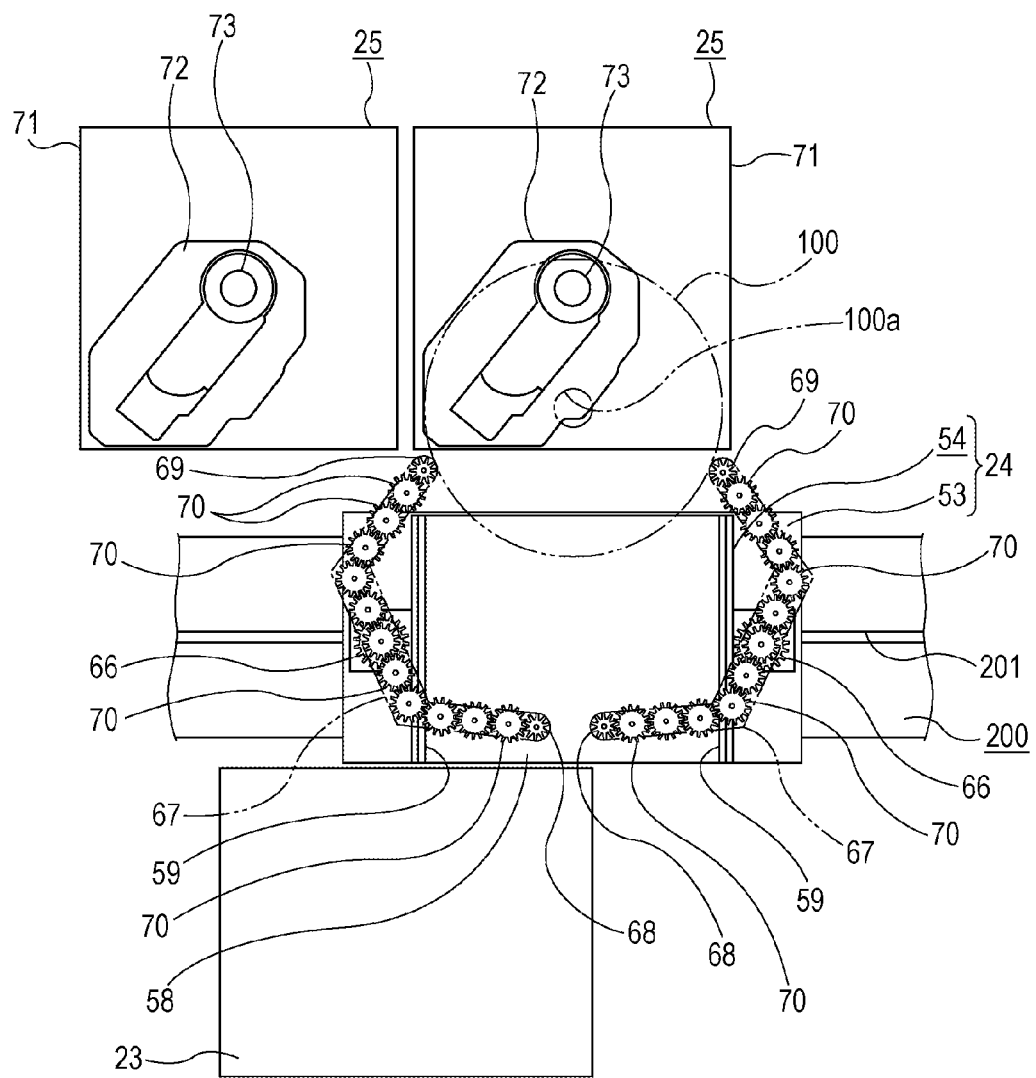
FIG. 36 is a schematic plan view illustrating a state where the disk-shaped recording medium is discharged from the disk drive device by the automatic transportation mechanism and the disk-shaped recording medium contacts a transportation roller continuing from FIG. 35.

At this time, the rotation arms 67 and 67 of the disk transportation device 24 are rotated from the initial position where the distance between the first transportation rollers 68 and 68 and the distance between the second transportation rollers 69 and 69 are the same distance to the position where the second transportation rollers 69 and 69 are separated more than the first transportation rollers 68 and 68 (see FIG. 36).

The outer peripheral surface of the disk-shaped recording medium 100 projected to the disk transportation device 24 is made to contact the disk action sections 69b and 69b of the second transportation rollers 69 and 69. At this time, the rear portion from the middle portion of the outer peripheral surface of the disk-shaped recording medium 100 in the longitudinal direction is made to contact the disk action sections 69b and 69b.

When the outer peripheral surface of the disk-shaped recording medium 100 is made to contact the disk action sections 69b and 69b of the second transportation rollers 69 and 69, the driving motor 63 is rotated in the other direction and then the first transportation rollers 68 and 68 and the second transportation rollers 69 and 69 are rotated in the other direction respectively, the rotational force in the other direction, in other words, the rotational force in the direction in which the second transportation rollers 69 and 69 are pressed to the outer peripheral surface of the disk-shaped recording medium 100 is applied to the rotation arms 67 and 67 respectively.

When the rotational force is applied to the rotation arms 67 and 67 while the first transportation rollers 68 and 68 are rotated, the second transportation rollers 69 and 69 are rolled on the outer peripheral surface of the disk-shaped recording medium 100 and the disk-shaped recording medium 100 is transported backwards by the rotation of the second transportation rollers 69 and 69.

As described above, in the disk transportation device 24, the disk-shaped recording medium 100 is transported from a state where the rear portion from the middle portion of the outer peripheral surface of the disk-shaped recording medium 100 in the longitudinal direction is made to contact the disk action sections 69b and 69b.

Accordingly, even though the projection amount of the disk-shaped recording medium 100 from the disk drive device 25 to the disk transportation device 24 is small, the disk-shaped recording medium 100 can be transported and the reliability in the transportation operation of the disk-shaped recording medium 100 by the disk transportation device 24 can be improved.

At this time, although the rotational force in the direction in which the second transportation rollers 69 and 69 are pressed to the outer peripheral surface of the disk-shaped recording medium 100 is applied to the rotation arms 67 and 67, the rotation arms 67 and 67 are rotated opposite to the direction in which the rotational force is applied, in other words, to the direction in which the second transportation rollers 69 and 69 are separated from each other according to the movement backwards of the disk-shaped recording medium 100.

As described above, the rotation opposite to the direction in which the rotational force of the rotation arms 67 and 67 is applied, can be configured such that the rotation arms 67 and 67 are rotated by the friction force between the fulcrum shafts 66 and 66.

Accordingly, the rotation arms 67 and 67 are configured to rotate by the friction force between the fulcrum shafts 66 and 66 so that the load that is applied from the second transportation rollers 69 and 69 with respect to the disk-shaped recording medium 100 is small, the load with respect to the disk-shaped recording medium 100 is decreased and then the disk-shaped recording medium 100 can be smoothly transported.

Figure 37:
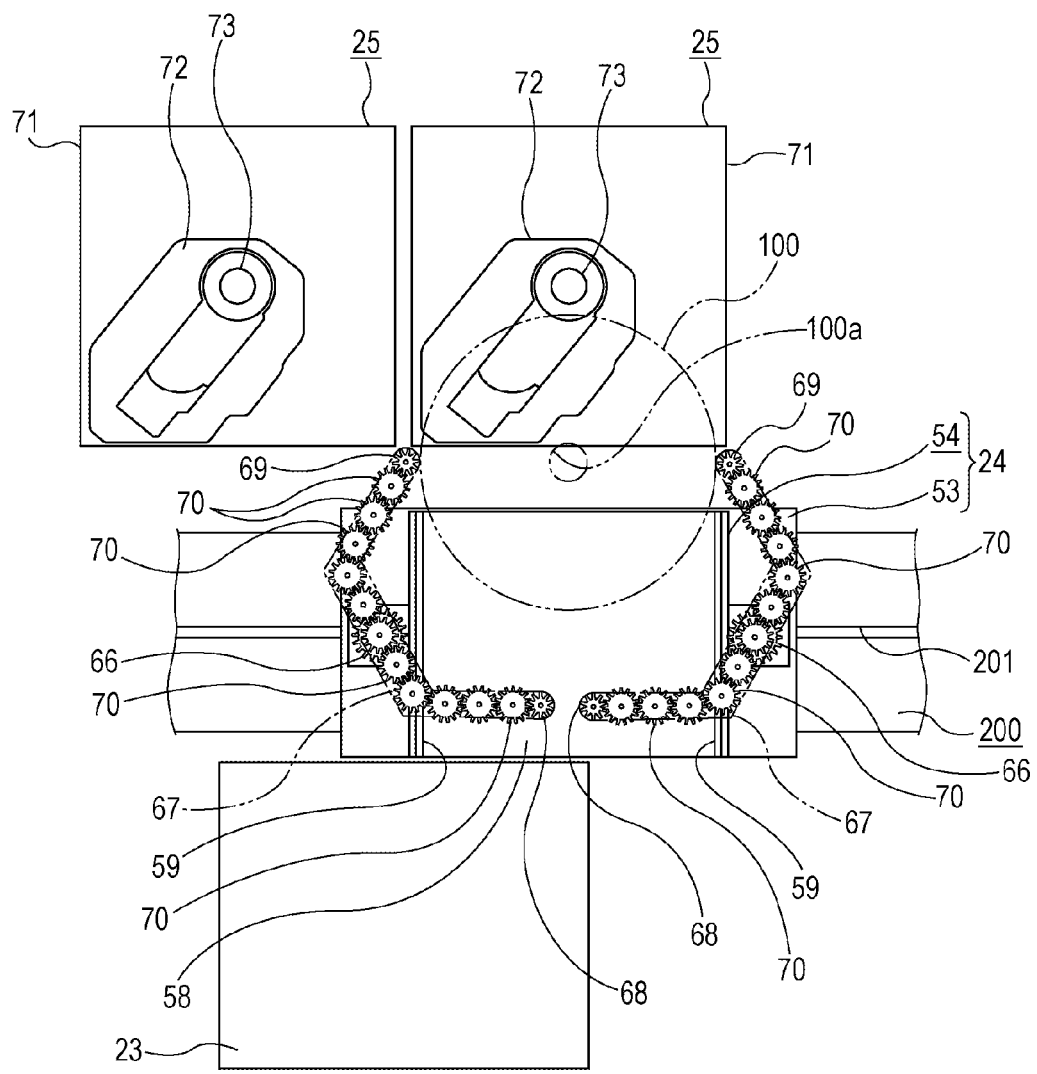
FIG. 37 is a schematic plan view illustrating a state where the disk-shaped recording medium is transported continuing from FIG. 36.

When the disk-shaped recording medium 100 is transported backwards and the center of the second transportation rollers 69 and 69 is positioned on the straight line with the center of the disk-shaped recording medium 100, the rotation of the rotation arms 67 and 67 opposite to the direction in which the rotational force is applied is stopped (see FIG. 37).

Figure 38:
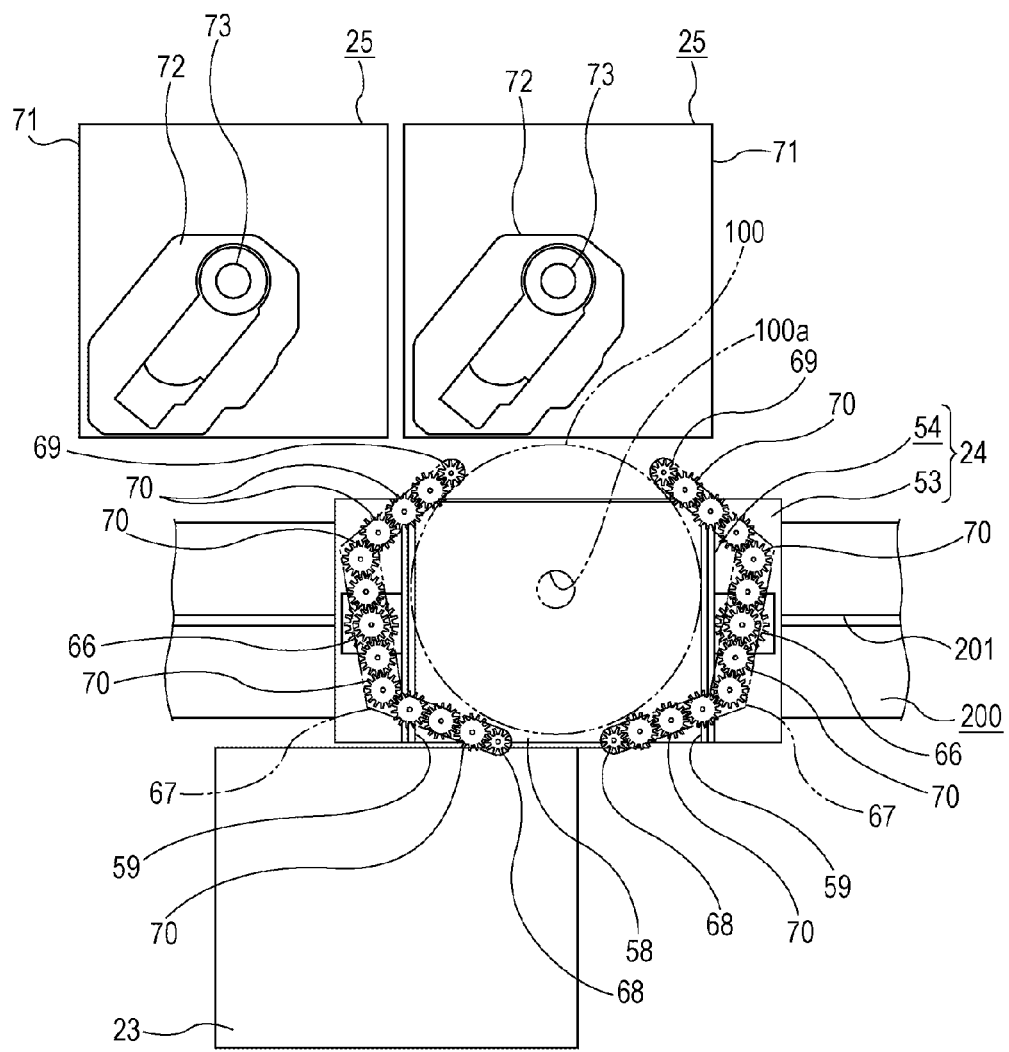
FIG. 38 is a schematic plan view illustrating a state where the disk-shaped recording medium is transported continuing from FIG. 37.

The first transportation rollers 68 and 68 and the second transportation rollers 69 and 69 are continuously rotated, the second transportation rollers 69 and 69 are rolled on the outer peripheral surface of the disk-shaped recording medium 100 and the disk-shaped recording medium 100 is further transported backwards by the rotation of the second transportation rollers 69 and 69 (see FIG. 38). At this time, the outer peripheral portion of the disk-shaped recording medium 100 is slid on the sliding surfaces 62 and 62 of the guide members 59 and 59 which is installed at the base plate 58 and is guided and moved backwards by the guide surfaces 60a and 60a. Immediately after the outer peripheral portion of the disk-shaped recording medium 100 is made to contact the sliding surfaces 62 and 62, the outer peripheral portion of the disk-shaped recording medium 100 is guided to the planes 62a and 62a by the slope surfaces 62b and 62b positioned at the front side and then the disk-shaped recording medium 100 is transported backwards in the horizontal state.

Since the rotational force in the direction, in which the second transportation rollers 69 and 69 are pressed to the outer peripheral surface of the disk-shaped recording medium 100, is applied to the rotation arms 67 and 67, the rotation arms 67 and 67 are rotated in the direction in which the rotational force is applied.

Subsequently, when the first transportation rollers 68 and 68 and the second transportation rollers 69 and 69 are rotated and then the second transportation rollers 69 and 69 are rolled on the outer peripheral surface of the disk-shaped recording medium 100, the disk-shaped recording medium 100 is further transported backwards by the rotation of the second transportation rollers 69 and 69. At this time, the rotation arms 67 and 67 are further rotated in the direction in which the rotational force is applied.

When the first transportation rollers 68 and 68 and the second transportation rollers 69 and 69 are made to contact the outer peripheral surface of the disk-shaped recording medium 100 by the rotation of the rotation arms 67 and 67, the disk-shaped recording medium 100 is held by the first transportation rollers 68 and 68 and the second transportation rollers 69 and 69 (see FIG. 32), and the rotation of the driving motor 63 is stopped once.

Figure 31:
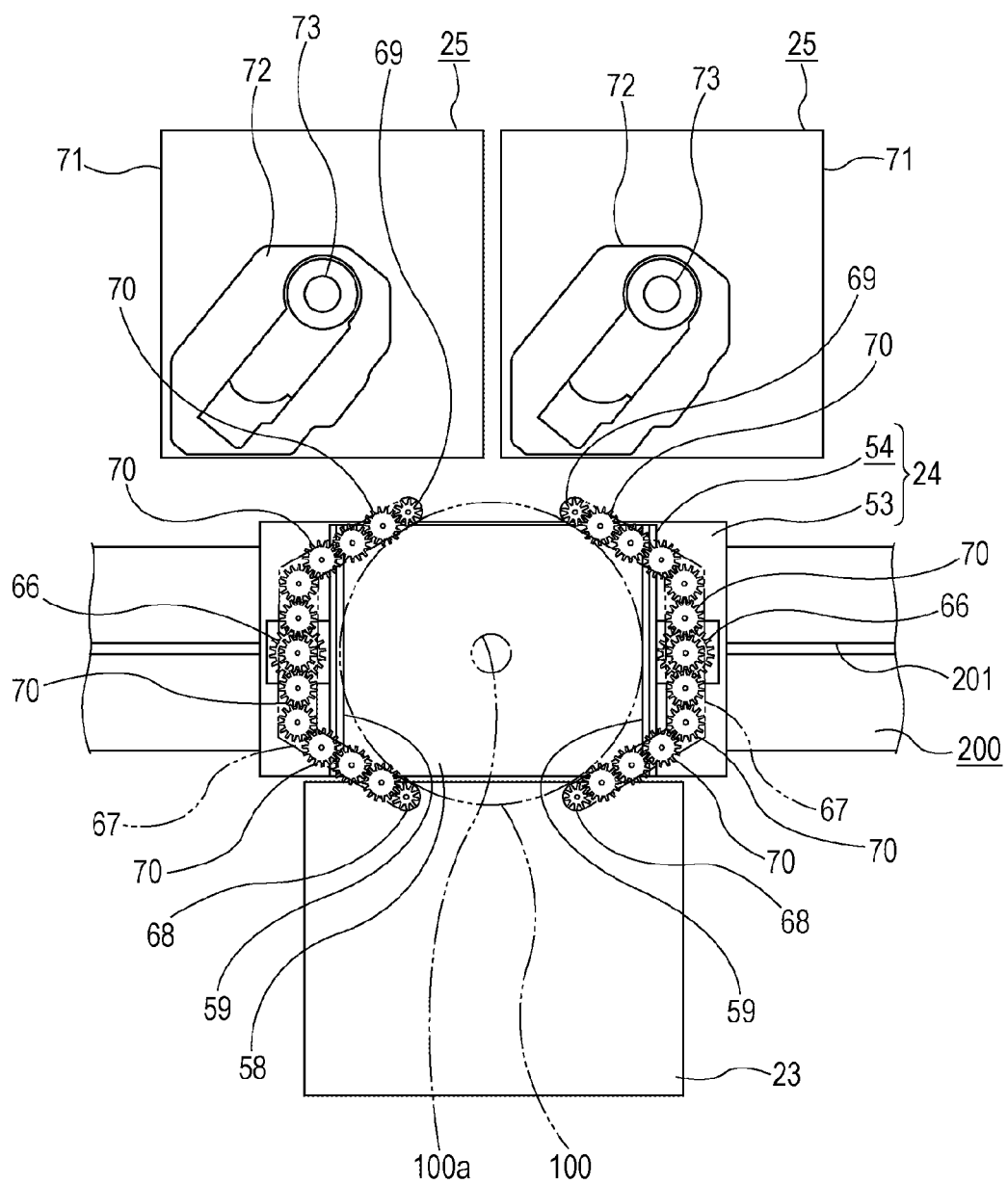
FIG. 31 is a schematic plan view illustrating a state where the disk-shaped recording medium is transported and the disk-shaped recording medium is held on the disk transportation device continuing from FIG. 30.

Subsequently, the disk transportation device 24 is guided by the guide section 201 and moved laterally and is stopped at the right front of the disk changer 23 (see FIG. 31).

When the disk transportation device 24 is stopped at the right front of the disk changer 23, the driving motor 63 is rotated again in the other direction.

When the driving motor 63 is rotated in the other direction, the first transportation rollers 68 and 68 and the second transportation rollers 69 and 69 are rotated in the other direction respectively and the rotational force in the other direction is applied to the rotation arms 67 and 67 respectively.

Figure 39:
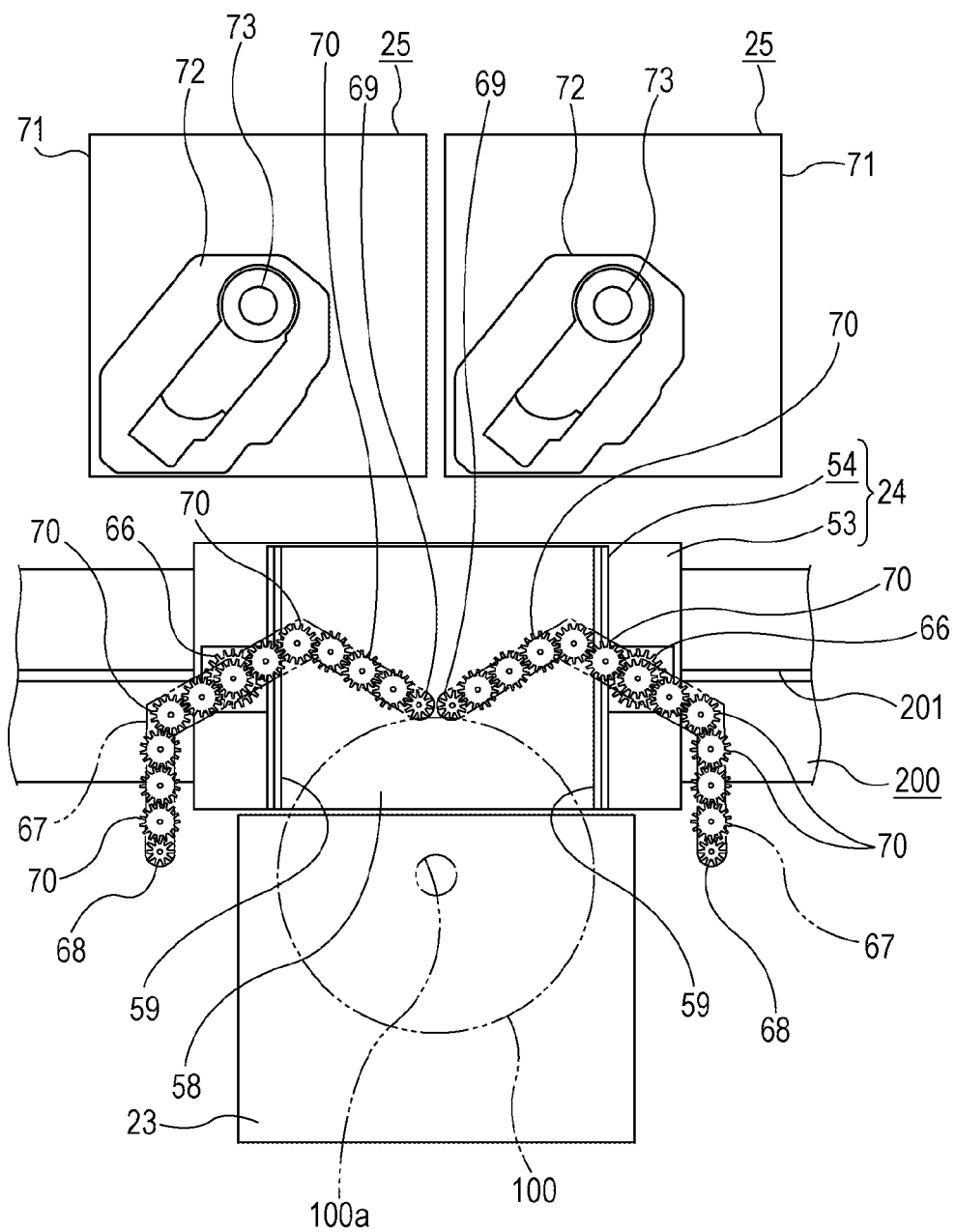
FIG. 39 is a schematic plan view illustrating a state where the disk-shaped recording medium is inserted into the disk changer.

When the rotational force is applied to the rotation arms 67 and 67 while the second transportation rollers 69 and 69 are rotated, the first transportation rollers 68 and 68 are separated from the outer peripheral surface of the disk-shaped recording medium 100 while the second transportation rollers 69 and 69 are rolled on the outer peripheral surface of the disk-shaped recording medium 100, and then the disk-shaped recording medium 100 is transported backwards by the rotation of the second transportation rollers 69 and 69 (see FIG. 39). At this time, the rotation arms 67 and 67 are rotated in the direction in which the rotational force is applied. The disk-shaped recording medium 100 transported backwards is inserted from the disk insertion hole 71a into the inside of the second shell 4 of the disk cartridge 1 held by the disk changer 23.

Figure 40:
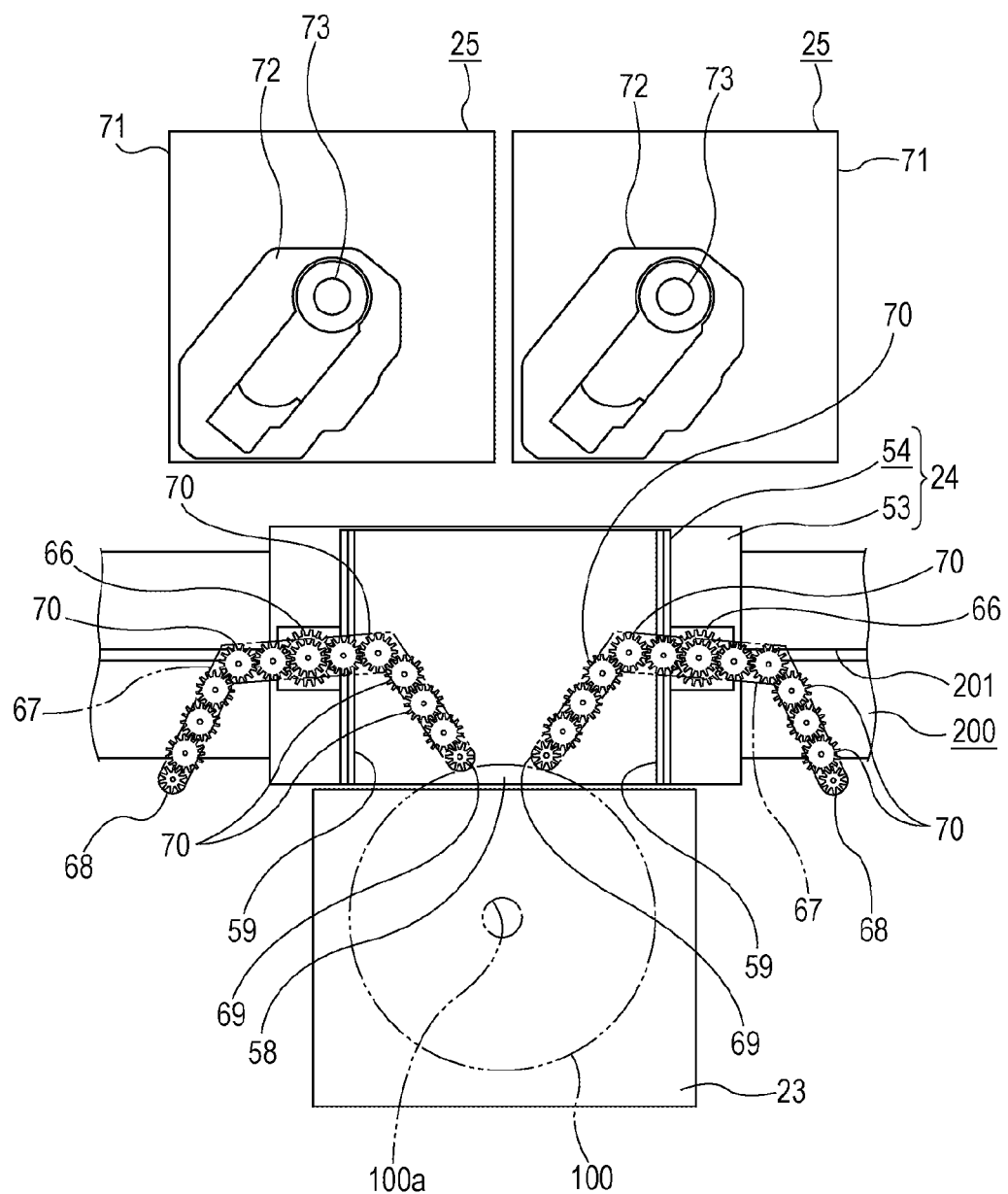
FIG. 40 is a schematic plan view illustrating a state where the disk-shaped recording medium is held at the disk changer and inserted into the disk cartridge continuing from FIG. 39.

Subsequently, when the rotation arms 67 and 67 are rotated, the outer peripheral surface of the disk-shaped recording medium 100 is pressed by the second transportation rollers 69 and 69 and then transported further to rear side (see FIG. 40). At this time, the second transportation rollers 69 and 69 are moved to the direction in which they are separated from each other and rotated in a contact state with the outer peripheral surface of the disk-shaped recording medium 100 without rolling on the outer peripheral surface of the disk-shaped recording medium 100.

Figure 41:
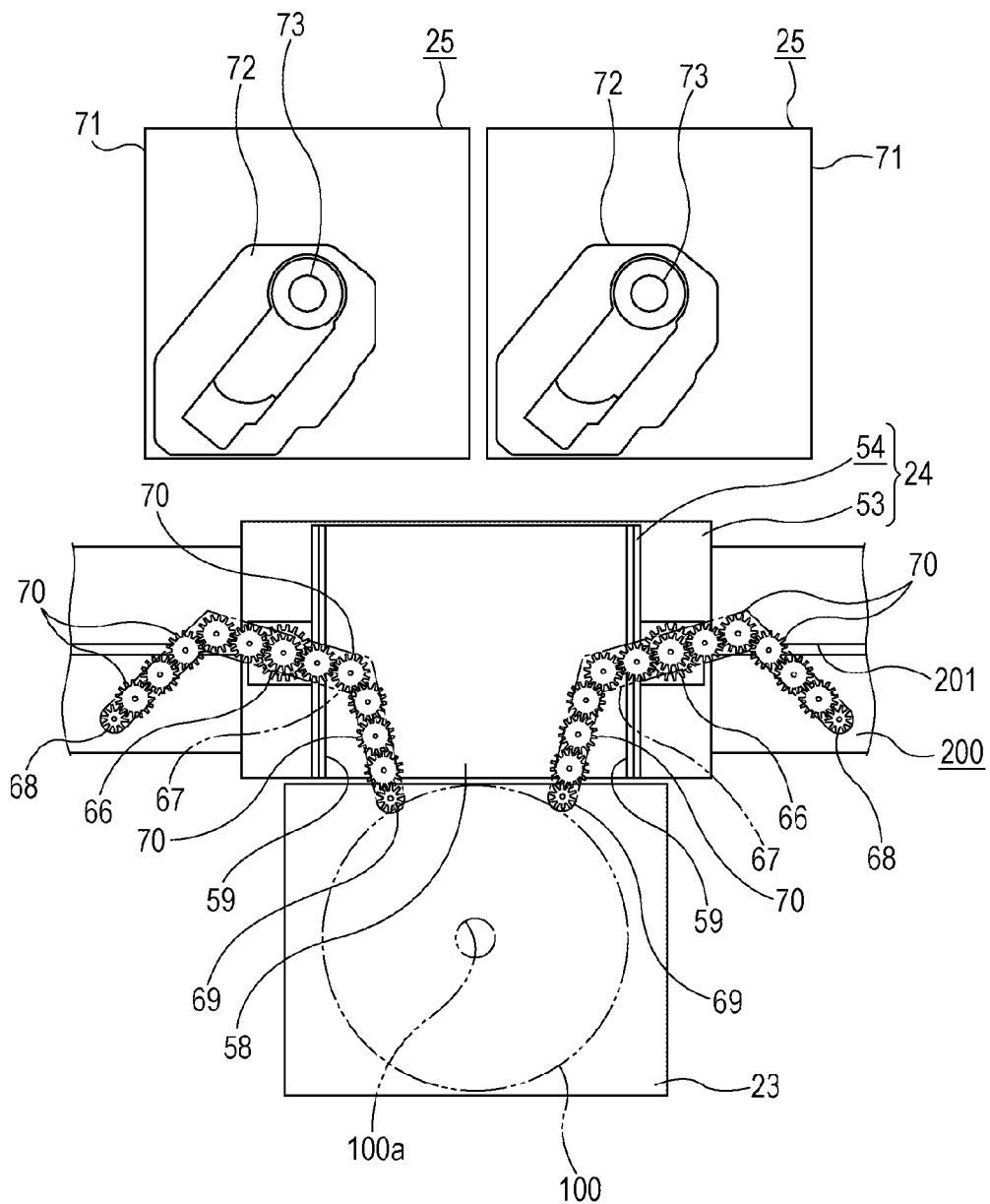
FIG. 41 is a schematic plan view illustrating a state where the disk-shaped recording medium is inserted into the disk cartridge continuing from FIG. 40.

When the entirety of the disk-shaped recording medium 100 is inserted into the inside of the second shell 4 of the disk cartridge 1 by the second transportation rollers 69 and 69, the rotation of the driving motor 63 is stopped, and the rotation of the rotation arms 67 and 67 and the rotation of the first transportation rollers 68 and 68 and the second transportation rollers 69 and 69 are stopped according to the stop of the rotation of the driving motor 63, and thereby the transportation of the disk-shaped recording medium 100 backwards by the disk transportation device 24 is finished (see FIG. 41).

When the transportation of the disk-shaped recording medium 100 backwards is finished, the driving motor 63 is rotated to the opposite side and the rotation arms 67 and 67 are rotated to the initial position where the distance between the first transportation rollers 68 and 68 and the distance between the second transportation rollers 69 and 69 are the same distance.

When the disk-shaped recording medium 100 is held by inserting into the inside of the second shell 4, the inversion of the second actuation motor 51 is started and then the sliders 33 and 33 are moved to the front side with respect to the holder cover 29.

When the slider 33 is moved to the front side, the sliding pin 42a of the lower holder 37 moves the slope section 34b of the cam hole 34 to the upper side and moves the vertical section 32b of the cam support hole 32 in the holder cover 29 to the upper side, and the lower holder 37 is integrally formed with the second shell 4 so as to move to the upper side.

The lower holder 37 is moved to for example, the movement end of the upper side and the second shell 4 is combined to the first shell 3 (see FIG. 22). In a state where the lower holder 37 is moved to the movement end of the upper side, the sliding pin 42a of the lower holder 37 is engaged with the front end of the linear section 34a of the cam hole 34 and the upper end of the vertical section 32b of the cam support hole 32 in the holder cover 29.

When the lower holder 37 is moved from the movement end of the lower side to the movement end of the upper side, the upper holder 36 is positioned at the movement end of the front side.

When the lower holder 37 is moved from the movement end of the lower side to the movement end of the upper side and the second shell 4 is combined to the first shell 3, the disk holder 35 is integrally formed with the disk cartridge 1 and moved backwards by the cartridge moving mechanism.

The disk holder 35 is moved to the movement end of the rear side by the cartridge moving mechanism (see FIG. 20) and a portion of the disk cartridge 1 is projected from the cartridge insertion port of the panel 28b backwards.

When a portion of the disk cartridge 1 is projected from the cartridge insertion port of the panel 28b backwards, the engaging claws 27a and 27a of the disk grip mechanism 27 are moved to the front side and then the movement thereof are stopped respectively to the front of the grip sections 6a and 6a of the disk cartridge 1.

Subsequently, the engaging claws 27a and 27a are moved to the direction close to each other and then engaged by inserting into the grip sections 6a and 6a respectively. Accordingly, the disk cartridge 1 is gripped by the disk grip mechanism 27.

Next, the engaging claws 27a and 27a are moved backwards, and the disk cartridge 1 is drawn out from the disk holder 35 so as to hold inside the cartridge delivery device 22.

When the disk cartridge 1 is drawn out from the disk holder 35, the lock releasing pieces 40a and 40a disposed at the upper holder 36 are drawn out from the insertion holes 14a and 14a of the openable and closable panel 14 respectively. When the lock releasing pieces 40a and 40a are drawn out from the insertion holes 14a and 14a respectively, the lock levers 12 and 12 are rotated by the biasing force of the biasing spring and the locking protrusion sections 12a and 12a are engaged by inserting into the first locking recesses 16a and 16a of the second shell 4 respectively, and then the first shell 3 and the second shell 4 are locked in a combined state.

At the same time, according to the movement backwards with respect to the disk holder 35 of the disk cartridge 1, the pressing with respect to the lock sliders 13 and 13 is released by the releasing pieces 39b and 39b disposed at the upper holder 36. When the pressing with respect to the lock sliders 13 and 13 is released by the releasing pieces 39b and 39b, the lock sliders 13 and 13 are moved to the front side by the biasing force of the coil spring and the lock sections 13a and 13a are engaged by inserting into the second locking recesses 16b and 16b of the second shell 4 respectively and then the first shell 3 and the second shell 4 are locked in a combined state.

Subsequently, the cartridge delivery device 22 is moved laterally direction, the disk grip mechanism 27 is moved in the vertical direction in the inside of the cartridge delivery device 22, and the cartridge delivery device 22 is positioned at the right front of the storage section 26 that performs accommodation of the storage sections 26, 26, . . . of the rack 21.

Next, the engaging claws 27a and 27a of the disk grip mechanism 27 are moved backwards and inserted from the front side into the insertion spaces 26a and 26a of the storage section 26, and the engaging claws 27a and 27a are moved to the direction in which the engaging claws 27a and 27a are separated from each other so that the gripping state with respect to the disk cartridge 1 is released and then the disk cartridge 1 is stored in the storage section 26.

When the disk cartridge 1 is stored in the storage section 26, the engaging claws 27a and 27a are moved to the front side and then return to the original position in the cartridge delivery device 22.

Others

In the above description, in the disk transportation device 24, the example, in which in a state where the driving section 54 is not moved with respect to the support base 53 in the longitudinal direction, the transportation of the disk-shaped recording medium 100 between the disk changer 23 and the disk drive device 25 is performed, is illustrated.

Figure 42:
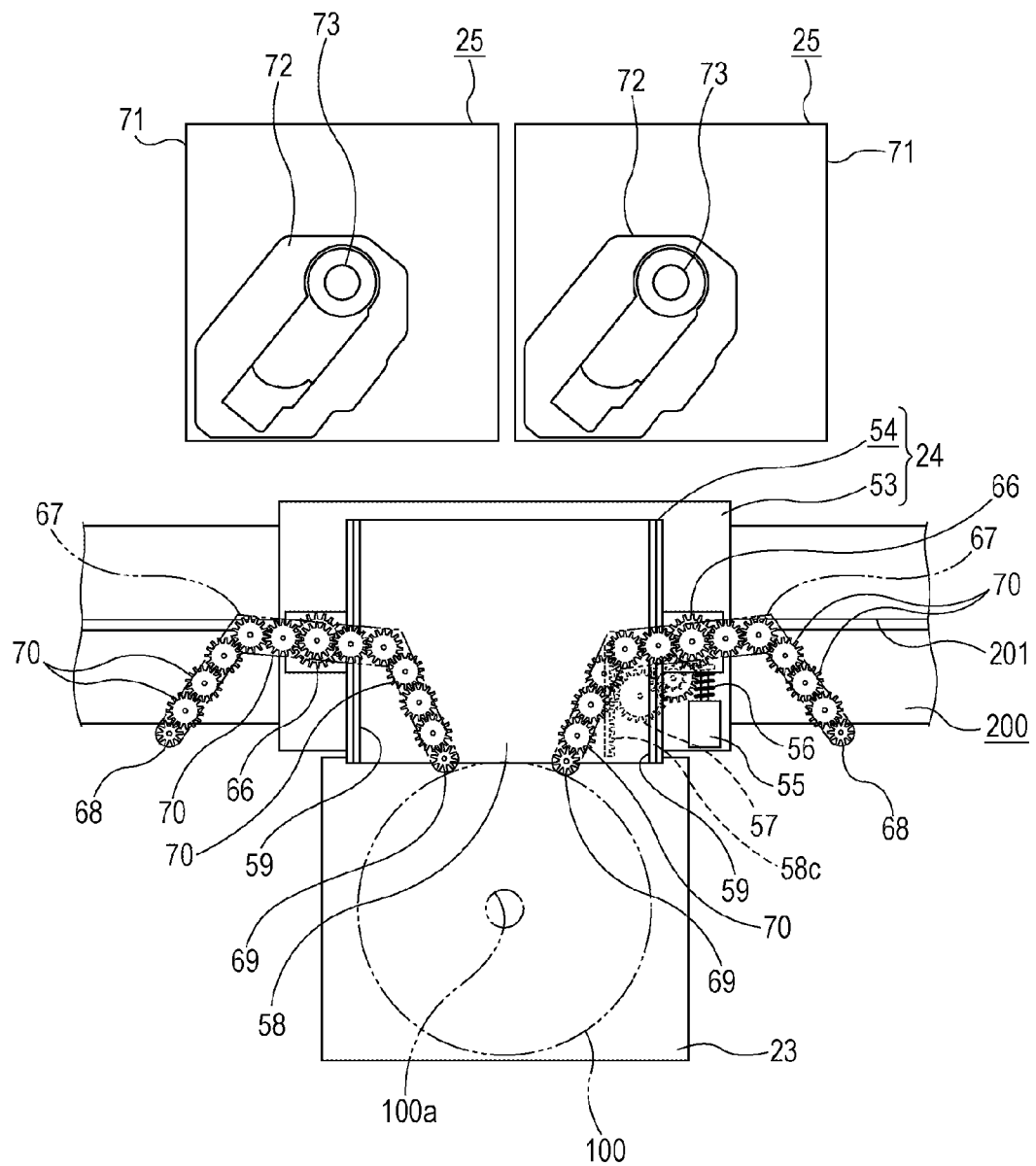
FIG. 42 is a schematic plan view illustrating a state where the transportation of the disk-shaped recording medium with respect to the disk changer is performed in a state where the disk transportation device is moved in the longitudinal direction.
Figure 43:
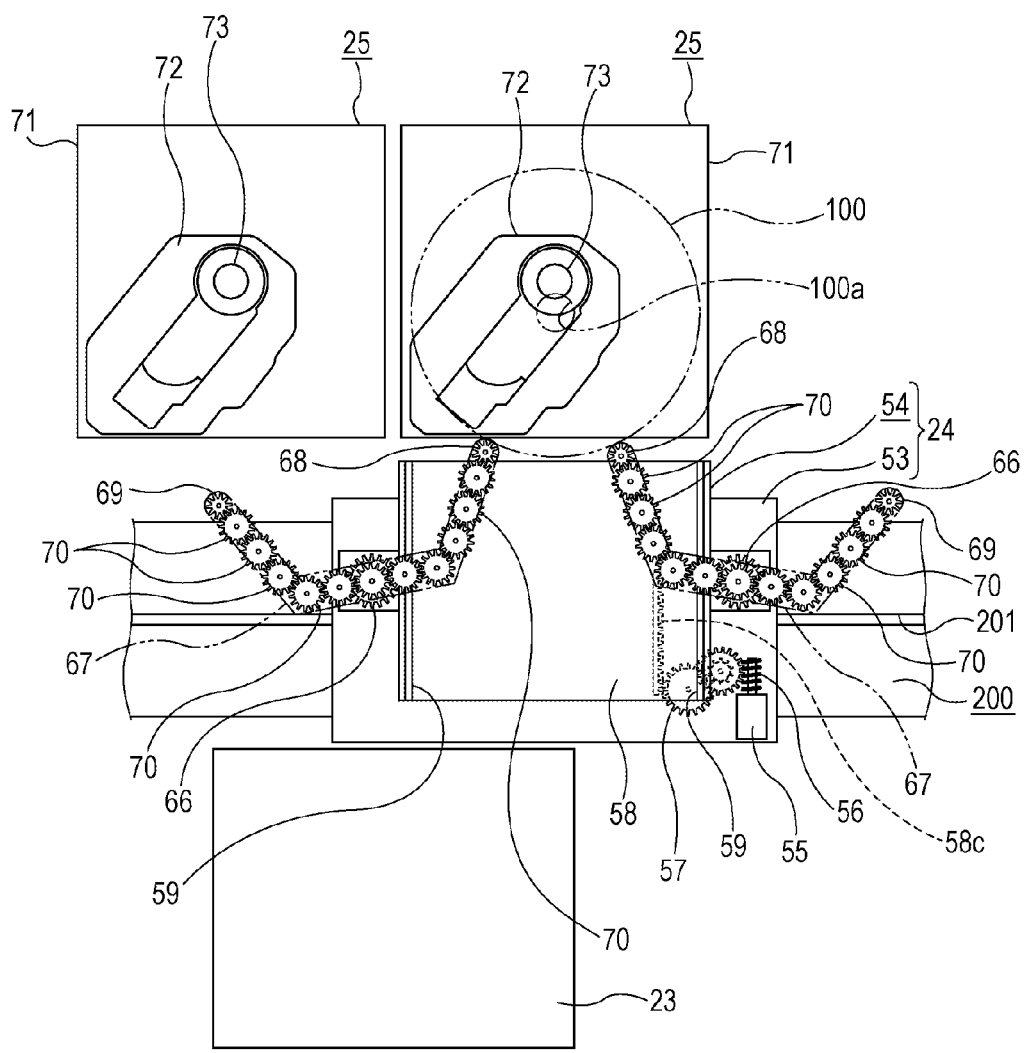
FIG. 43 is a schematic plan view illustrating a state where the transportation of the disk-shaped recording medium with respect to the disk drive device is performed in a state where the disk transportation device is moved in the longitudinal direction.

However, in the disk transportation device 24, the driving section 54 is moved with respect to the support base 53 in the longitudinal direction and the rotation arms 67 and 67 are moved in the longitudinal direction, and then the transportation of the disk-shaped recording medium 100 between the disk changer 23 and the disk drive device 25 can be performed (see FIGS. 42 and 43). The movement of the driving section 54 with respect to the support base 53 in the longitudinal direction can be performed by transmitting the rack section 58c disposed at the base plate 58 by the rotation of the motor 55 in the direction according to the rotation direction of the motor 55.

As described above, the driving section 54 is moved with respect to the support base 53 in the longitudinal direction and the rotation arms 67 and 67 are moved in the longitudinal direction so that the transportation distance of the disk-shaped recording medium 100 can be increased and the disk-shaped recording medium 100 can be reliably transported by the disk changer 23 and the disk drive device 25.

In addition, the disk transportation device 24 can be decreased in size by the extent to which the rotation range of the rotation arms 67 and 67 can be decreased.

In addition, in the above description, the example in which one the disk changer 23 and two the disk drive devices 25 and 25 are disposed is illustrated, however, if the disk changer 23 and the disk drive device 25 are arranged side by side in the lateral direction or in the vertical direction, the number thereof can be arbitrary.

In addition, in a case where the disk changers 23, 23, . . . or the disk drive devices 25, 25, . . . are arranged side by side in the vertical direction, it is necessary to configure the cartridge delivery device 22 or the disk transportation device 24 to be movable in the vertical direction. In this case, for example, the guide shaft extending vertically, and the movement mechanism for moving in the vertical direction are disposed, and the cartridge delivery device 22 or the disk transportation device 24 is guided to the guide shaft by the movement mechanism so as to be movable in the vertical direction.

Conclusion

As described above, in the disk transportation device 24, a pair of the rotation arms 67 and 67, the first transportation rollers 68 and 68 and the second transportation rollers 69 and 69 supported at the rotation arms 67 and 67 are included and the rotation arms 67 and 67 are rotated so that the disk-shaped recording medium 100 is transported.

In the disk transportation device 24, since in a state where the first transportation rollers 68 and 68 and the second transportation rollers 69 and 69 are made to contact the outer peripheral surface of the disk-shaped recording medium 100, the rotation arms 67 and 67 are rotated, the first transportation rollers 68 and 68 and the second transportation rollers 69 and 69 are rolled on the outer peripheral surface of the disk-shaped recording medium 100, or the disk-shaped recording medium 100 is pressed by the first transportation rollers 68 and 68 and the second transportation rollers 69 and 69 so that the disk-shaped recording medium 100 is transported.

Accordingly, since a large transportation distance for the disk-shaped recording medium 100 can be secured without large load being applied to the disk-shaped recording medium 100, the transportation performance with respect to the disk-shaped recording medium 100 can be improved.

In addition, in the disk transportation device 24, the rotation direction at the time of the rotation of the rotation arms 67 and 67 and the rotation direction of the first transportation rollers 68 and 68 and the second transportation rollers 69 and 69 are the same direction.

Accordingly, the first transportation rollers 68 and 68 and the second transportation rollers 69 and 69 can be rolled on the outer peripheral surface of the disk-shaped recording medium 100 according to the rotation of the rotation arms 67 and 67, and the disk-shaped recording medium 100 can smoothly transported according to the rotation of the rotation arms 67 and 67.

Furthermore, the driven gears 68a, 68a, 69a and 69a are disposed at the first transportation rollers 68 and 68 and the second transportation rollers 69 and 69 respectively, and the driving gears 66c and 66c are disposed at the fulcrum shafts 66 and 66 respectively, the intermediate gears 70, 70, . . . are meshed with the driven gears 68a, 68a, 69a and 69a and the driving gears 66c and 66c.

Accordingly, the rotation mechanism for rotating the rotation arms 67 and 67, the first transportation rollers 68 and 68 and the second transportation rollers 69 and 69 in the same direction is configured by simple structure, and the simplification of the structure can be achieved in the disk transportation device 24.

In addition, in the above description, for example, the configuration is illustrated such that the driving force of the driving motor 63 is transported to the first transportation rollers 68 and 68 and the second transportation rollers 69 and 69 by the driven gears 68a, 68a, 69a and 69a, the driving gears 66c and 66c and the intermediate gears 70, 70, . . . .

However, the configuration in which the driving force of the driving motor 63 is transported to the first transportation rollers 68 and 68 and the second transportation rollers 69 and 69 is not limited to the above described configuration. For example, the fulcrum shafts 66 and 66, are made to contact the first transportation rollers 68 and 68 and the second transportation rollers 69 and 69 by a belt so that the driving force of the driving motor 63 can be transported to the first transportation rollers 68 and 68 and the second transportation rollers 69 and 69.

In addition, when transporting the disk-shaped recording medium 100 described above, the disk action sections 68b, 68b, 69b and 69b formed by the rubber material in the first transportation rollers 68 and 68 and the second transportation rollers 69 and 69 are made to contact the outer peripheral surface of the disk-shaped recording medium 100.

Accordingly, good adhesion of the first transportation rollers 68 and 68 and the second transportation rollers 69 and 69 with respect to the disk-shaped recording medium 100 is secured and the disk-shaped recording medium 100 can be smoothly transported.

Furthermore, the rotation arm 67 is configured of a pair of the projection-shaped sections 67b and 67b projected respectively from both ends of the base 67a and the base 67a extending in one direction where the fulcrum shaft 66 is connected to the center, and the projection-shaped sections 67b and 67b are separated from each other according to separating from the base 67a.

Accordingly, the rotation arms 67 and 67 are optimal shape as the shape for holding and transporting of the disk-shaped recording medium 100 and good holding state of the disk-shaped recording medium 100, and smooth transportation operation of the disk-shaped recording medium 100 can be secured.

Furthermore, since the rotation arms 67 and 67 are movable side by side in the direction of the disk drive devices 25 and 25, the transportation of the disk-shaped recording medium 100 with respect to the disk drive devices 25 and 25 can be smoothly performed.

Present Disclosure

The present disclosure can be configured of as described below.

(1) A disk transportation device including: a pair of rotation arms that are rotatable respectively about a fulcrum shaft extending in the same direction as the axial direction of a center shaft of a disk-shaped recording medium in both sides thereof that pinch the transportation passage of the disk-shaped recording medium transported between a disk changer where a plurality of the disk-shaped recording media can be stored and a disk drive device where recording or reproduction of the information signal with respect to the disk-shaped recording medium can be performed; and four transportation rollers of which two at a time are rotatably supported on the pair of rotation arms respectively, wherein the four transportation rollers contact the outer peripheral surface of the disk-shaped recording medium respectively and thereby the disk-shaped recording medium is held, and the pair of rotation arms are rotated in opposite directions to each other in a state where one of the transportation rollers at a time is supported at the pair of the rotation arms respectively contact the outer peripheral surface of the disk-shaped recording medium and thereby the disk-shaped recording medium is transported between the disk changer and the disk drive device.

(2) The disk transportation device according to (1), wherein the rotation direction at the time of rotation of the rotation arm and the rotation direction of the transportation roller are the same direction as each other.

(3) The disk transportation device according to (2), wherein the transportation roller is supported at a tip of the rotation arm, a driven gear is disposed at the transportation roller, a driving gear is disposed at the fulcrum shaft, and a plurality of intermediate gears, which are meshed with the driving gear and the driven gear between the fulcrum shaft and the transportation roller, are rotatably supported at the rotation arm.

(4) The disk transportation device according to (3), wherein the transportation roller includes the driven gear and a disk action section which is contacted with the outer peripheral surface of the disk-shaped recording medium so as to be rotatable, and the disk action section is formed of a rubber material.

(5) The disk transportation device according to any one of (1) to (4), wherein a driving motor is disposed which rotates the fulcrum shaft in the rotation direction of the shaft, the rotation arm is rotatable with respect to the fulcrum shaft, and the rotation arm is rotated in the rotation direction of the fulcrum shaft by the friction force between the rotation arm and the fulcrum shaft when the fulcrum shaft is rotated by the driving force of the driving motor.

(6) The disk transportation device according to any one of (3) or (4), wherein a driving motor is disposed which rotates the fulcrum shaft in the rotation direction of the shaft, the rotation arm is rotatable with respect to the fulcrum shaft, and the rotation arm is rotated in the rotation direction of the fulcrum shaft by the friction force between the rotation arm and the fulcrum shaft when the fulcrum shaft is rotated by the driving force of the driving motor.

(7) The disk transportation device according to any one of (1) to (6), wherein a driving motor is disposed which applies the rotation force to the pair of the rotation arms, and a pair of transmission mechanisms is disposed which transmits the driving force of the driving motor to a pair of rotation arms respectively.

(8) The disk transportation device according to any one of (1) to (7), wherein the two transportation rollers contact the outer peripheral surface positioned at the transportation direction side from the center of the disk-shaped recording medium at the time of the start of the transportation of the disk-shaped recording medium, and the two transportation rollers are rolled on the outer peripheral surface of the disk-shaped recording medium and thereby the disk-shaped recording medium is transported.

(9) The disk transportation device according to any one of (1) to (8), wherein the rotation arm is configured of a base extending in one direction, where the fulcrum shaft is connected at the center thereof, and a pair of projection-shaped sections projecting respectively from both ends of the base in a direction perpendicular to the axial direction of the fulcrum shaft, the rotation arm is formed in a shape symmetrical with respect to the fulcrum shaft, and the pair of the projection-shaped sections is formed so as to separate from each other according to the pair of projection-shaped sections separated from the base.

(10) The disk transportation device according to any one of (1) to (9), wherein a plurality of the disk drive devices is arranged side by side in a predetermined direction, and the pair of the rotation arms is movable in the alignment direction of the plurality of the disk drive devices.

(11) The disk transportation device according to any one of (1) to (10), wherein the pair of the rotation arms is movable in the alignment direction of the disk changer and the disk drive device.

(12) A disk storage system including: a disk changer where a plurality of disk-shaped recording media can be stored; a disk drive device where recording or reproduction of the information signal with respect to the disk-shaped recording medium can be performed; and a disk transportation device that transports the disk-shaped recording medium between the disk changer and the disk drive device, wherein the disk transportation device includes a pair of rotation arms that are rotatable respectively about a fulcrum shaft extending in the same direction as the axial direction of a center shaft of the disk-shaped recording medium in both sides thereof that pinch the transportation passage of the disk-shaped recording medium; and four transportation rollers of which two at a time are rotatably supported on the pair of rotation arms respectively, wherein the four transportation rollers contact the outer peripheral surface of the disk-shaped recording medium respectively and thereby the disk-shaped recording medium is held, and wherein the pair of rotation arms are rotated in opposite directions to each other in a state where one of the transportation rollers at a time is supported at the pair of the rotation arms respectively contact the outer peripheral surface of the disk-shaped recording medium and thereby the disk-shaped recording medium is transported between the disk changer and the disk drive device.

The present disclosure contains subject matter related to that disclosed in Japanese Priority Patent Application JP 2011-110141 filed in the Japan Patent Office on May 17, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disk transportation device comprising:
a pair of rotation arms that are rotatable respectively about a fulcrum shaft extending in the same direction as an axial direction of a center shaft of a disk-shaped recording medium on both sides thereof and that pinch a transportation passage of the disk-shaped recording medium transported between a disk changer where a plurality of the disk-shaped recording media can be stored and a disk drive device where recording or reproduction of an information signal with respect to the disk-shaped recording medium can be performed; and
four transportation rollers of which two at a time are rotatably supported on the pair of rotation arms respectively,
wherein the four transportation rollers contact an outer peripheral surface of the disk-shaped recording medium respectively and thereby the disk-shaped recording medium is held, and
the pair of rotation arms are rotated in opposite directions to each other in a state, where one of the transportation rollers at a time is supported at the pair of rotation arms respectively, and contact the outer peripheral surface of the disk-shaped recording medium and thereby the disk-shaped recording medium is transported between the disk changer and the disk drive device.

2. The disk transportation device according to claim 1, wherein the rotation direction at the time of rotation of the rotation arm and the rotation direction of the transportation roller are the same direction as each other.

3. The disk transportation device according to claim 2, wherein the transportation roller is supported at a tip of the rotation arm,
a driven gear is disposed at the transportation roller,
a driving gear is disposed at the fulcrum shaft, and
a plurality of intermediate gears, which are meshed with the driving gear and the driven gear between the fulcrum shaft and the transportation roller are rotatably supported at the rotation arm.

4. The disk transportation device according to claim 3, wherein the transportation roller includes the driven gear and a disk action section which is contacted with the outer peripheral surface of the disk-shaped recording medium so as to be rotatable, and
wherein the disk action section is formed of a rubber material.

5. The disk transportation device according to claim 3, wherein a driving motor is disposed which rotates the fulcrum shaft in the rotation direction of the shaft, the rotation arm is rotatable with respect to the fulcrum shaft, and the rotation arm is rotated in the rotation direction of the fulcrum shaft by a friction force between the rotation arm and the fulcrum shaft when the fulcrum shaft is rotated by the driving force of the driving motor.

6. The disk transportation device according to claim 1, wherein a driving motor is disposed which rotates the fulcrum shaft in the rotation direction of the shaft, the rotation arm is rotatable with respect to the fulcrum shaft, and the rotation arm is rotated in the rotation direction of the fulcrum shaft by a friction force between the rotation arm and the fulcrum shaft when the fulcrum shaft is rotated by the driving force of the driving motor.

7. The disk transportation device according to claim 1, wherein a driving motor is disposed which applies the rotation force to the pair of the rotation arms, and a pair of transmission mechanisms is disposed which transmits a driving force of the driving motor to the pair of rotation arms respectively.

8. The disk transportation device according to claim 1, wherein the two transportation rollers contacting the outer peripheral surface positioned at the transportation direction side from the center of the disk-shaped recording medium at the time of the start of the transportation of the disk-shaped recording medium, and two transportation rollers are rolled on the outer peripheral surface of the disk-shaped recording medium and thereby the disk-shaped recording medium is transported.

9. The disk transportation device according to claim 1, wherein the rotation arms are configured of a base extending in one direction, where the fulcrum shaft is connected at the center thereof, and a pair of projection-shaped sections projecting respectively from both ends of the base in a direction perpendicular to the axial direction of the fulcrum shaft, the rotation arm is formed in a shape symmetrical with respect to the fulcrum shaft, and the pair of the projection-shaped sections is formed so as to separate from each other according to the pair of projection-shaped sections separated from the base.

10. The disk transportation device according to claim 1, wherein a plurality of the disk drive devices are arranged side by side in a predetermined direction, and the pair of the rotation arms is movable in an alignment direction of the plurality of the disk drive devices.

11. The disk transportation device according to claim 1, wherein the pair of the rotation arms is movable in an alignment direction of the disk changer and the disk drive device.

12. A disk storage system comprising:

a disk changer where a plurality of disk-shaped recording media can be stored;

a disk drive device where recording or reproduction of an information signal with respect to the disk-shaped recording medium can be performed; and a disk transportation device that transports the disk-shaped recording medium between the disk changer and the disk drive device, wherein the disk transportation device includes a pair of rotation arms that are rotatable respectively about a fulcrum shaft extending in the same direction as an axial direction of a center shaft of a disk-shaped recording medium on both sides thereof, and that pinch a transportation passage of the disk-shaped recording medium; and four transportation rollers of which two at a time are rotatably supported on the pair of rotation arms respectively;

wherein the four transportation rollers contact an outer peripheral surface of the disk-shaped recording medium respectively and thereby the disk-shaped recording medium is held, and wherein the pair of rotation arms are rotated in opposite directions to each other in a state, where one of the transportation rollers at a time is supported at the pair of rotation arms respectively, and contact the outer peripheral surface of the disk-shaped recording medium and thereby the disk-shaped recording medium is transported between the disk changer and the disk drive device.

* * * * *